US012459091B2

(12) United States Patent
Julius et al.

(10) Patent No.: US 12,459,091 B2
(45) Date of Patent: Nov. 4, 2025

(54) POWERED FASTENER DRIVER

(71) Applicant: MILWAUKEE ELECTRIC TOOL CORPORATION, Brookfield, WI (US)

(72) Inventors: Jason M. Julius, Waukesha, WI (US); Rosalie C. Phillips, Milwaukee, WI (US); Ivan N. Zozulya, Waukesha, WI (US); Jacob N. Zimmerman, Pewaukee, WI (US); Alex D. Servais, Slinger, WI (US); Mitchell T. Neuhoff, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 141 days.

(21) Appl. No.: 18/178,104

(22) Filed: Mar. 3, 2023

(65) Prior Publication Data

US 2023/0278177 A1 Sep. 7, 2023

Related U.S. Application Data

(60) Provisional application No. 63/391,491, filed on Jul. 22, 2022, provisional application No. 63/316,510, filed on Mar. 4, 2022.

(51) Int. Cl.

*B25C 1/00* (2006.01)
*B25C 1/04* (2006.01)
*B25C 1/06* (2006.01)

(52) U.S. Cl.

CPC .............. *B25C 1/047* (2013.01); *B25C 1/008* (2013.01); *B25C 1/06* (2013.01)

(58) Field of Classification Search

CPC .... B25C 1/04; B25C 5/16; B25C 1/00; B25C 1/006; B25C 1/041; B25C 1/047; B25C 1/06; B25C 1/08; B25C 5/1637

(Continued)

(56) References Cited

U.S. PATENT DOCUMENTS 3,198,412 A 8/1965 Roosa
3,496,840 A 2/1970 Wandel et al.
(Continued)

FOREIGN PATENT DOCUMENTS

CN 2587598 Y 11/2003
CN 109623736 A 4/2019
(Continued)

OTHER PUBLICATIONS

International Search Report and Written Opinion for Application No. PCT/US2023/063668 dated Jun. 14, 2023 (14 pages).

(Continued)

*Primary Examiner* — Jacob A Smith
(74) *Attorney, Agent, or Firm* — Michael Best & Friedrich LLP

(57) ABSTRACT

A powered fastener driver includes a housing defining cylinder support portion, a drive unit support portion, and a handle portion that is spaced apart from the drive unit support portion. The handle portion defines a handle axis. A piston is movable within a cylinder from a TDC position to a driven or BDC position. A driver blade is attached to the piston for movement therewith along a driving axis from the TDC position toward the BDC position for driving a fastener into a workpiece. A lifter is operable to move the piston and driver blade, in unison, from the BDC position toward the TDC position. A drive unit is supported by the drive unit support portion and operably coupled to the lifter. The drive unit includes a motor having first output shaft that extends along a motor axis. The motor is positioned below the handle. The handle axis and the motor axis intersect the driving axis.

6 Claims, 38 Drawing Sheets

(58) Field of Classification Search
USPC ......................................... 227/127, 130, 156
See application file for complete search history.

(56) References Cited

U.S. PATENT DOCUMENTS

| | | | |
|---|---|---|---|
| 3,524,576 A | 8/1970 | Bader | |
| 3,858,780 A | 1/1975 | Perkins et al. | |
| 4,509,669 A | 4/1985 | Elliesen | |
| 4,609,135 A | 9/1986 | Elliesen | |
| 4,932,480 A | 6/1990 | Golsch | |
| 5,025,971 A | 6/1991 | Schafer et al. | |
| 5,441,192 A | 8/1995 | Sugita et al. | |
| 5,626,274 A | 5/1997 | Shkolnikov et al. | |
| 5,683,024 A | 11/1997 | Eminger et al. | |
| 5,772,098 A | 6/1998 | Crutcher | |
| 6,149,046 A | 11/2000 | Ho et al. | |
| 6,199,739 B1 | 3/2001 | Mukoyama et al. | |
| 6,834,788 B2 | 12/2004 | Popovich et al. | |
| 6,899,260 B2 | 5/2005 | Sun | |
| 6,913,179 B1 | 7/2005 | Chen | |
| 6,966,476 B2 | 11/2005 | Jalbert | |
| 6,966,477 B1 | 11/2005 | Chien-Kuo et al. | |
| 7,021,511 B2 | 4/2006 | Popovich et al. | |
| 7,086,573 B1 | 8/2006 | Wen | |
| 7,104,432 B2 | 9/2006 | Sun | |
| 7,131,563 B2 | 11/2006 | Wen | |
| 7,134,586 B2 | 11/2006 | McGee et al. | |
| 7,137,186 B2 | 11/2006 | Wojcicki et al. | |
| 7,455,207 B2 | 11/2008 | Wojcicki et al. | |
| 7,686,199 B2 | 3/2010 | Gross et al. | |
| 7,699,201 B2 | 4/2010 | Hagan et al. | |
| 7,726,536 B2 | 6/2010 | Gross et al. | |
| 7,866,521 B2 | 1/2011 | Gross et al. | |
| 7,896,212 B2 | 3/2011 | Uejima et al. | |
| 7,922,054 B2 | 4/2011 | Cole, Jr. | |
| 7,950,556 B2 | 5/2011 | Hagan | |
| 7,975,777 B2 | 7/2011 | Krondorfer et al. | |
| 7,980,439 B2 | 7/2011 | Akiba et al. | |
| 8,006,881 B2 | 8/2011 | Arata et al. | |
| 8,051,919 B2 | 11/2011 | Hagan et al. | |
| 8,052,021 B2 | 11/2011 | Wu | |
| 8,083,116 B2 | 12/2011 | Liang | |
| 8,104,658 B2 | 1/2012 | Yu | |
| 8,231,039 B2 | 7/2012 | Buck et al. | |
| 8,292,143 B2 | 10/2012 | Lee et al. | |
| 8,336,748 B2 | 12/2012 | Hlinka et al. | |
| 8,393,512 B2 | 3/2013 | Tanimoto et al. | |
| 8,544,561 B2 | 10/2013 | Aihara | |
| 8,746,526 B2 | 6/2014 | Hlinka et al. | |
| D713,705 S | 9/2014 | Mina et al. | |
| 8,833,626 B2 | 9/2014 | Perron et al. | |
| 9,221,161 B2 | 12/2015 | Miller et al. | |
| 9,469,021 B2 | 10/2016 | Gregory et al. | |
| 9,486,904 B2 | 11/2016 | Gregory et al. | |
| 9,498,871 B2 | 11/2016 | Gregory et al. | |
| 9,636,811 B2 | 5/2017 | Segura | |
| 9,643,305 B2 | 5/2017 | Gregory et al. | |
| 9,649,755 B2 | 5/2017 | Gregory et al. | |
| 9,662,777 B2 | 5/2017 | Pomeroy et al. | |
| 9,664,045 B2 | 5/2017 | Mina et al. | |
| 9,701,001 B2 | 7/2017 | Fleischer et al. | |
| 9,724,812 B2 | 8/2017 | Scabin et al. | |
| 9,827,658 B2 | 11/2017 | Gregory et al. | |
| 9,827,659 B2 | 11/2017 | Matsuno | |
| 10,004,503 B2 | 6/2018 | Huang | |
| 10,022,848 B2 * | 7/2018 | Gross | B25F 5/00 |
| 10,173,310 B2 | 1/2019 | Wyler et al. | |
| 10,464,197 B2 | 11/2019 | McNeill et al. | |
| 10,569,403 B2 | 2/2020 | Namouz | |
| 10,589,409 B2 | 3/2020 | Scabin et al. | |
| 10,632,600 B2 | 4/2020 | Pomeroy et al. | |
| 10,632,601 B2 | 4/2020 | Pomeroy et al. | |
| 10,654,154 B2 | 5/2020 | Schnell et al. | |
| 10,710,227 B2 | 7/2020 | Pomeroy et al. | |
| 10,759,029 B2 | 9/2020 | Schnell et al. | |
| 10,800,021 B2 | 10/2020 | Tanaka | |
| 10,821,585 B2 | 11/2020 | Kabbes et al. | |
| 10,843,317 B2 | 11/2020 | Sato et al. | |
| 10,875,166 B2 | 12/2020 | Jeda | |
| 10,888,981 B2 | 1/2021 | Gregory et al. | |
| 10,898,994 B2 | 1/2021 | Carrier et al. | |
| 10,946,506 B1 | 3/2021 | Ueda | |
| 11,072,058 B2 | 7/2021 | Wyler et al. | |
| 11,110,576 B2 | 9/2021 | Namouz | |
| 11,179,836 B2 | 11/2021 | Gregory et al. | |
| 11,224,960 B2 | 1/2022 | Garces et al. | |
| 11,446,802 B2 | 9/2022 | Rux | |
| 2003/0121948 A1 | 7/2003 | Hsien | |
| 2008/0164295 A1 | 7/2008 | Wu et al. | |
| 2010/0243286 A1 | 9/2010 | Hoshino et al. | |
| 2013/0320063 A1 | 12/2013 | Gregory et al. | |
| 2013/0320064 A1 | 12/2013 | Gregory et al. | |
| 2015/0174748 A1 | 6/2015 | Furuta et al. | |
| 2015/0202755 A1 * | 7/2015 | Tanji | B25C 1/04 227/130 |
| 2016/0368126 A1 | 12/2016 | Liu et al. | |
| 2018/0001453 A1 | 1/2018 | Jaskot et al. | |
| 2018/0126527 A1 * | 5/2018 | Pomeroy | B25C 1/04 |
| 2019/0039219 A1 | 2/2019 | Suarez | |
| 2019/0314967 A1 | 10/2019 | Garces et al. | |
| 2019/0375084 A1 | 12/2019 | Bierdeman et al. | |
| 2020/0114500 A1 | 4/2020 | Bierdeman et al. | |
| 2020/0130157 A1 | 4/2020 | Rux | |
| 2020/0164498 A1 | 5/2020 | Wechselberger et al. | |
| 2020/0189081 A1 | 6/2020 | Yang et al. | |
| 2020/0215672 A1 | 7/2020 | Pomeroy et al. | |
| 2020/0230791 A1 | 7/2020 | Pomeroy et al. | |
| 2020/0391365 A1 | 12/2020 | Tanaka | |
| 2020/0398413 A1 | 12/2020 | Tanaka | |
| 2021/0016424 A1 | 1/2021 | Kabbes et al. | |
| 2021/0031347 A1 | 2/2021 | Sato et al. | |
| 2021/0031351 A1 | 2/2021 | Tanaka | |
| 2021/0107125 A1 | 4/2021 | Gregory et al. | |
| 2021/0197352 A1 | 7/2021 | Ueda | |
| 2021/0299833 A1 | 9/2021 | Zimmerman et al. | |
| 2021/0299837 A1 | 9/2021 | Garces et al. | |
| 2021/0347022 A1 | 11/2021 | Leathrum et al. | |
| 2021/0347025 A1 | 11/2021 | Wyler et al. | |
| 2021/0347026 A1 | 11/2021 | Wyler et al. | |
| 2021/0362311 A1 | 11/2021 | Garces et al. | |
| 2021/0387318 A1 | 12/2021 | Ueda | |
| 2022/0388136 A1 | 12/2022 | Rux | |

FOREIGN PATENT DOCUMENTS

| | | |
|---|---|---|
| CN | 110253505 A | 9/2019 |
| CN | 212763319 U | 3/2021 |
| EP | 0100105 A2 | 2/1984 |
| JP | 6852570 B2 | 3/2021 |
| WO | 2010038834 A1 | 4/2010 |
| WO | 2011010634 A1 | 1/2011 |
| WO | 2018056325 A1 | 3/2018 |
| WO | 2020248531 A1 | 12/2020 |

OTHER PUBLICATIONS

Ridgid, "18V Brushless 21 Degree Framing Nailer," available at <https://www.ridgid.com/us/en/18v-brushless-21-degree-framing-nailer> web page visited Mar. 9, 2023 (6 pages).

Nail Gun Depot, "Learn How The Senco Fusion System Operates," video available at <https://www.youtube.com/watch?v=tmJgRfptn40> video published to YouTube Feb. 21, 2017 (1 page).

* cited by examiner

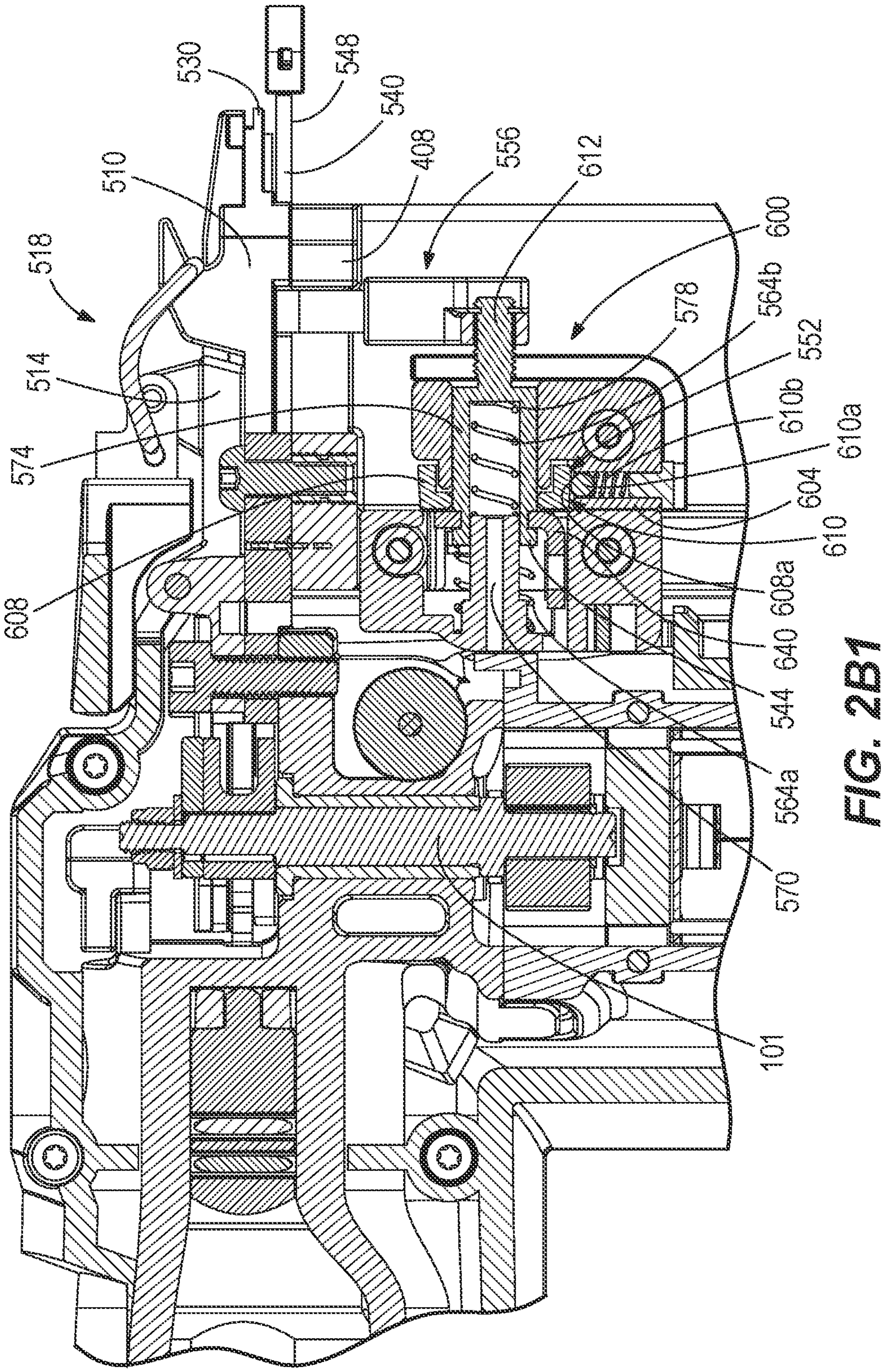
FIG. 2B1

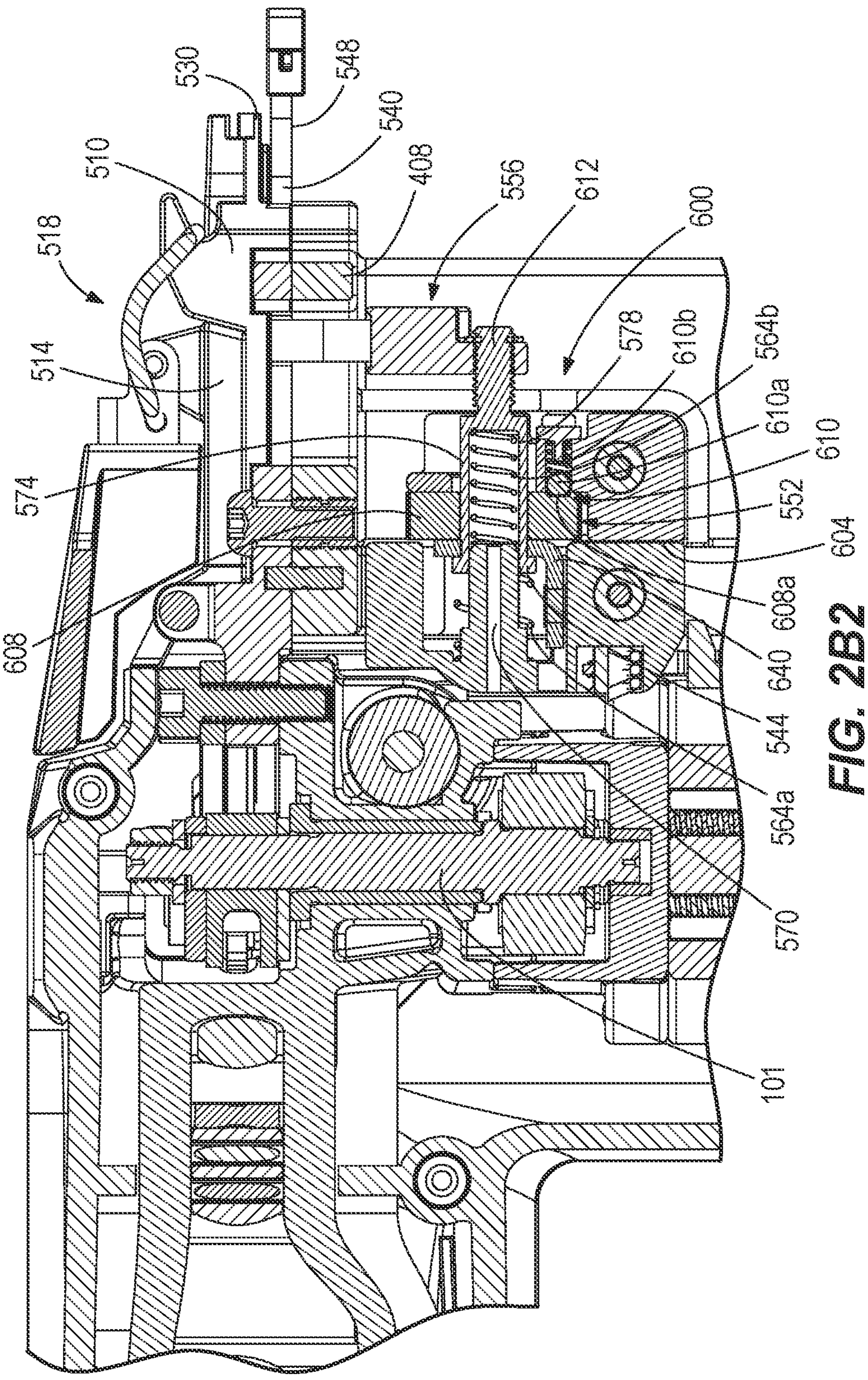
FIG. 2B2

POWERED FASTENER DRIVER

CROSS-REFERENCE TO RELATED APPLICATIONS

This application claims priority to U.S. Provisional Patent Application No. 63/391,491 filed on Jul. 22, 2022, and to U.S. Provisional Patent Application No. 63/316,510 filed on Mar. 4, 2022, the entire contents of each of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

The present invention provides, in one aspect, a powered fastener driver including a housing defining cylinder support portion, a drive unit support portion, and a handle portion that is spaced apart from the drive unit support portion. The handle portion defines a handle axis. A cylinder is positioned within the cylinder support portion. A piston is movable within the cylinder from a top-dead-center (TDC) position to a driven or bottom-dead-center (BDC) position. A driver blade is attached to the piston for movement therewith along a driving axis from the TDC position toward the BDC position for driving a fastener into a workpiece. A lifter is operable to move the piston and driver blade, in unison, from the BDC position toward the TDC position. A drive unit is supported by the drive unit support portion and operably coupled to the lifter. The drive unit includes a motor having first output shaft that extends along a motor axis. The motor is positioned below the handle. The handle axis and the motor axis intersect the driving axis.

The present invention provides, in another aspect, a powered fastener driver including a housing, a cylinder within the housing, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, a lifter operable to move the piston and driver blade from the BDC position toward the TDC position, a drive unit operably coupled to the lifter to provide torque thereto, causing the lifter to rotate, a bumper supported by the housing and configured to stop the piston and driver blade at the BDC position, a key coupled to one of the bumper or the housing, and a keyway coupled to the other of the bumper or the housing. The key is received within the keyway to rotationally index the bumper relative to the housing and to prevent relative rotation between the bumper and the housing.

The present invention provides, in another aspect, a powered fastener driver including a housing, a cylinder within the housing, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, a lifter operable to move the piston and driver blade from the BDC position toward the TDC position, a drive unit operably coupled to the lifter to provide torque thereto, causing the lifter to rotate, and a workpiece contact assembly coupled to the housing and movable from an extended position to a retracted position in response to contact with a workpiece. The workpiece contact assembly includes a stationary post coupled to the housing, an arm including a bore in which the post is received, a first spring surrounding the post and seated between the housing and a first end of the arm, and a second spring within the bore and seated between a distal end of the post and a bottom surface of the bore.

The present invention provides, in another aspect, a powered fastener driver including a magazine assembly configured to receive fasteners, a nosepiece assembly including a channel from which consecutive fasteners from the magazine assembly are driven, and a pusher assembly slidably coupled to the magazine assembly. The pusher assembly is configured to bias the fasteners within the magazine assembly toward the channel, the pusher assembly including a pusher body, and a dry-fire lockout member coupled to the pusher body. The pusher body and the dry-fire lockout member are selectively movable relative to each other. The pusher assembly is adjustable between a first state in which the pusher body and the dry-fire lockout member are configured to move together in unison toward the channel, and a second state in which relative movement between the pusher body and the dry-fire lockout member has occurred. The powered fastener driver further includes a workpiece contact assembly movable relative to the nosepiece assembly between an extended position and a retracted position. In a first position of the dry-fire lockout member relative to the magazine assembly, the workpiece contact element is configured to slide past the dry-fire lockout member in response to movement toward the retracted position, and in a second position, the dry-fire lockout member inhibits movement of the workpiece contact assembly toward the retracted position when a predetermined number of fasteners remain in the magazine assembly. The pusher assembly is configured to transition from the first state to the second state prior to the predetermined number of fasteners in the magazine assembly being reached.

The present invention provides, in another aspect, a powered fastener driver including a housing defining cylinder support portion, a drive unit support portion, and a handle portion that is spaced apart from the drive unit support portion. The handle portion defines a handle axis. A cylinder is positioned within the cylinder support portion. A piston is movable within the cylinder from a top-dead-center (TDC) position to a driven or bottom-dead-center (BDC) position. A driver blade is attached to the piston for movement therewith along a driving axis from the TDC position toward the BDC position for driving a fastener into a workpiece. A lifter is operable to move the piston and driver blade, in unison, from the BDC position toward the TDC position. The lifter includes a plurality of drive pins, and at least one of the drive pins is configured to engage the driver blade when moving the driver blade from the BDC position toward the TDC position. A drive unit is supported by the drive unit support portion and operably coupled to the lifter. The drive unit includes a motor having a first output shaft that extends along a motor axis and a second output shaft operably coupled to the first output shaft. The motor is positioned below the handle. The second output shaft extends along an axis that is parallel to the motor axis, and the lifter is operably coupled to the second output shaft.

The present invention provides, in another aspect, a powered fastener driver including a housing defining a cylinder support portion, a drive unit support portion, and a handle portion that is spaced apart from the drive unit support portion. A cylinder is within the cylinder support portion. A piston is movable within the cylinder from a top-dead-center (TDC) position to a driven or bottom-dead-center (BDC) position. A driver blade is attached to the piston for movement therewith along a driving axis from the TDC position toward the BDC position for driving a fastener into a workpiece. The driver blade includes a plurality of teeth extending along one side thereof. A lifter is operable to move the piston and driver blade, in unison, from the BDC position toward the TDC position. The lifter includes a plurality of drive pins engageable with the teeth when returning the driver blade from the BDC position to the TDC position. A drive unit is supported by the drive unit support portion and is operably coupled to the lifter. The drive unit includes a motor having a motor axis. The motor is positioned below the handle. The motor axis is positioned within a plane that is parallel to and within 10 mm of the driving axis, and the motor axis and the driving axis are contained within an imaginary plane bisecting the housing.

The present invention provides, in another aspect, a powered fastener driver including a housing defining a cylinder support portion, a drive unit support portion, and a handle portion that is spaced apart from the drive unit support portion. The handle portion defines a handle axis. A cylinder is within the cylinder support portion and a piston is movable within the cylinder from a top-dead-center (TDC) position to a driven or bottom-dead-center (BDC) position. The piston includes a first portion and a second portion that is threadably coupled to the first portion. The second portion includes a slot, an aperture extending through the second portion and in communication with the slot, and a bore extending through the second portion and in communication with the slot. The aperture is aligned with the bore. A driver blade is attached to the second portion of the piston for movement therewith along a driving axis from the TDC position toward the BDC position for driving a fastener into a workpiece. The driver blade includes a body having a first surface extending in a first plane, a second surface opposite the first surface extending in a second plane that is parallel to the first plane, and an aperture extending through the body from the first surface to the second surface. The body is received within the slot such that the aperture of the body is aligned with the aperture of the second portion of the piston and the bore of second portion of the piston. Lifting teeth extend from one side of the body, each of the lifting teeth including a first surface extending in the first plane and a second surface extending in the second plane. A pin extends through the aligned aperture of the body, the aperture of the second portion of the piston, and the bore of the second portion of the piston to attach the driver blade to the piston. A lifter is operable to engage one of the lifting teeth to move the piston and driver blade, in unison, from the BDC position toward the TDC position. A drive unit is supported by the drive unit support portion and is operably coupled to the lifter. The drive unit includes a motor having a first output shaft that extends along a motor axis.

Other features and aspects of the invention will become apparent by consideration of the following detailed description and accompanying drawings.

BRIEF DESCRIPTION OF THE DRAWINGS

FIG. 2B1 is a cross-sectional view of the gas spring-powered fastener driver of FIG. 1 along line 2B1-2B1 of FIG. 2A.

FIG. 2B2 is a cross-sectional view of another gas spring-powered fastener drive of FIG. 1 along the line 2B1-2B1 of FIG. 2A.

Figure 1:
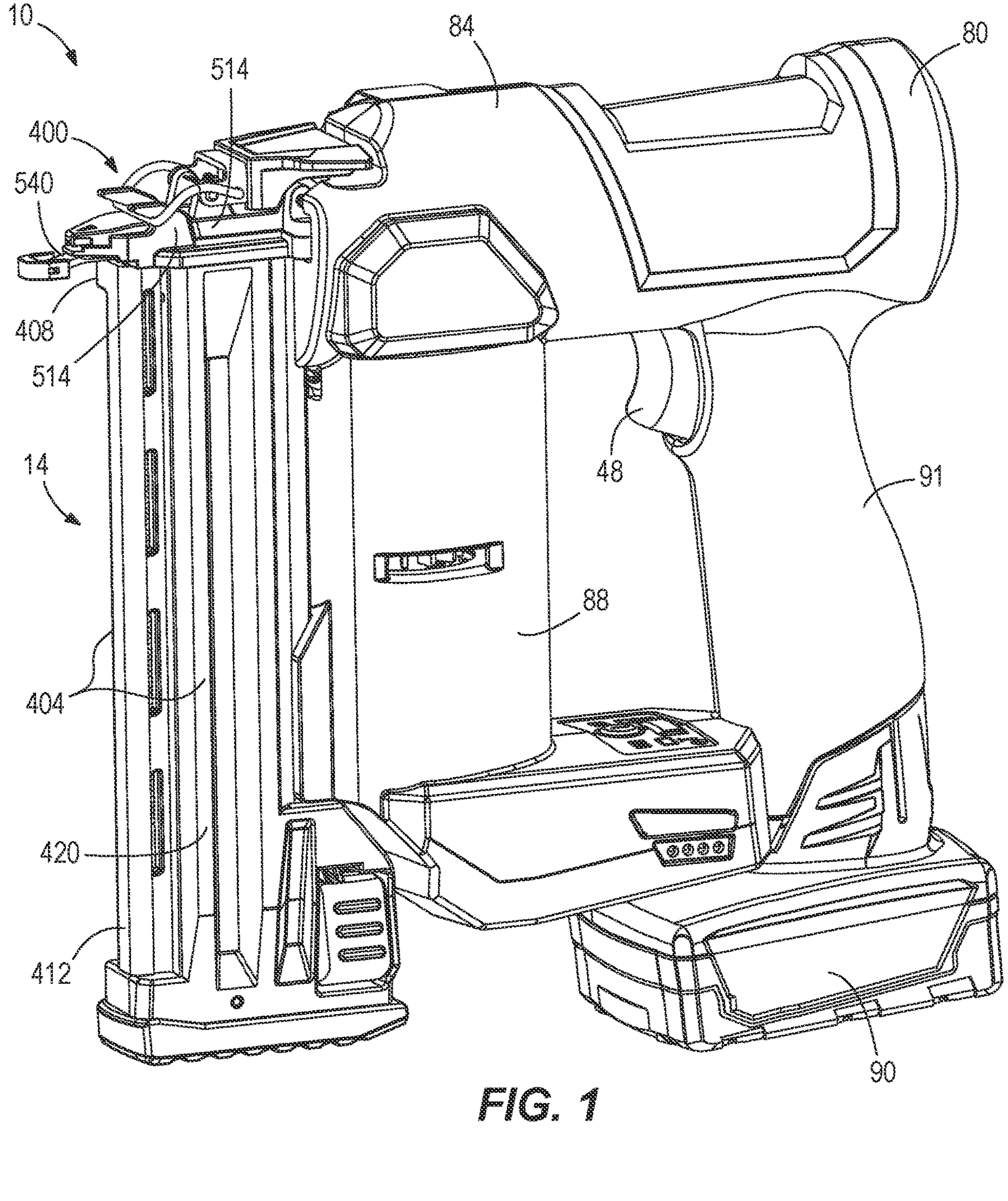
FIG. 1 is a perspective view of a gas spring-powered fastener driver including a magazine and a workpiece contact assembly in accordance with an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

With reference to FIGS. 1-6, a gas spring-powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the cylinder 18 (FIGS. 6A, 7A, 7B). With reference to FIGS. 6A-7B, the fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the cylinder 18. In the illustrated embodiment, the cylinder 18 and moveable piston 22 are positioned within the storage chamber cylinder 30. The driver 10 further includes a fill valve (not shown) coupled to the storage chamber cylinder 30. When connected with a source of compressed gas, the fill valve permits the storage chamber cylinder 30 to be refilled with compressed gas if any prior leakage has occurred. The fill valve may be configured as a Schrader valve, for example.

Figure 6A:
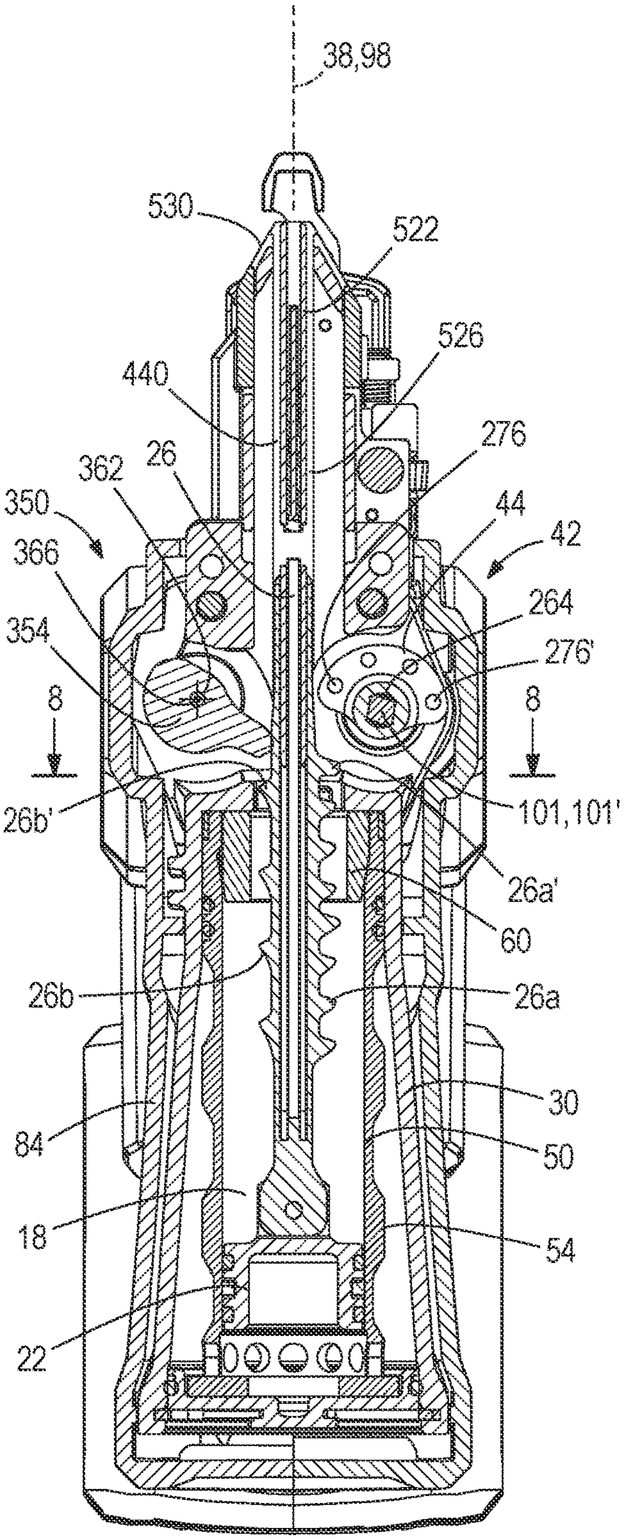
FIG. 6A is a cross-sectional view of the gas spring-powered fastener driver of FIG. 1 along line 6A-6A shown in FIG. 2A, which shows, among other features, a storage chamber cylinder, a cylinder, a piston having a first configuration, a driver blade, and a bumper.
Figure 6B:
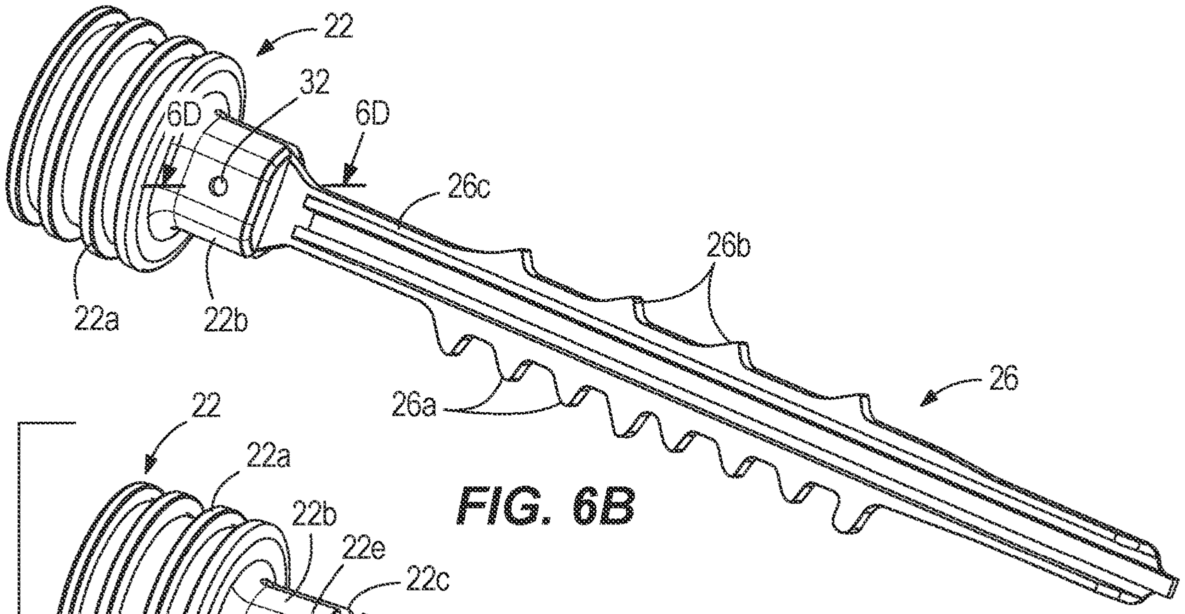
FIG. 6B is a perspective view of the piston and the driver blade of FIG. 6A.
Figure 6C:
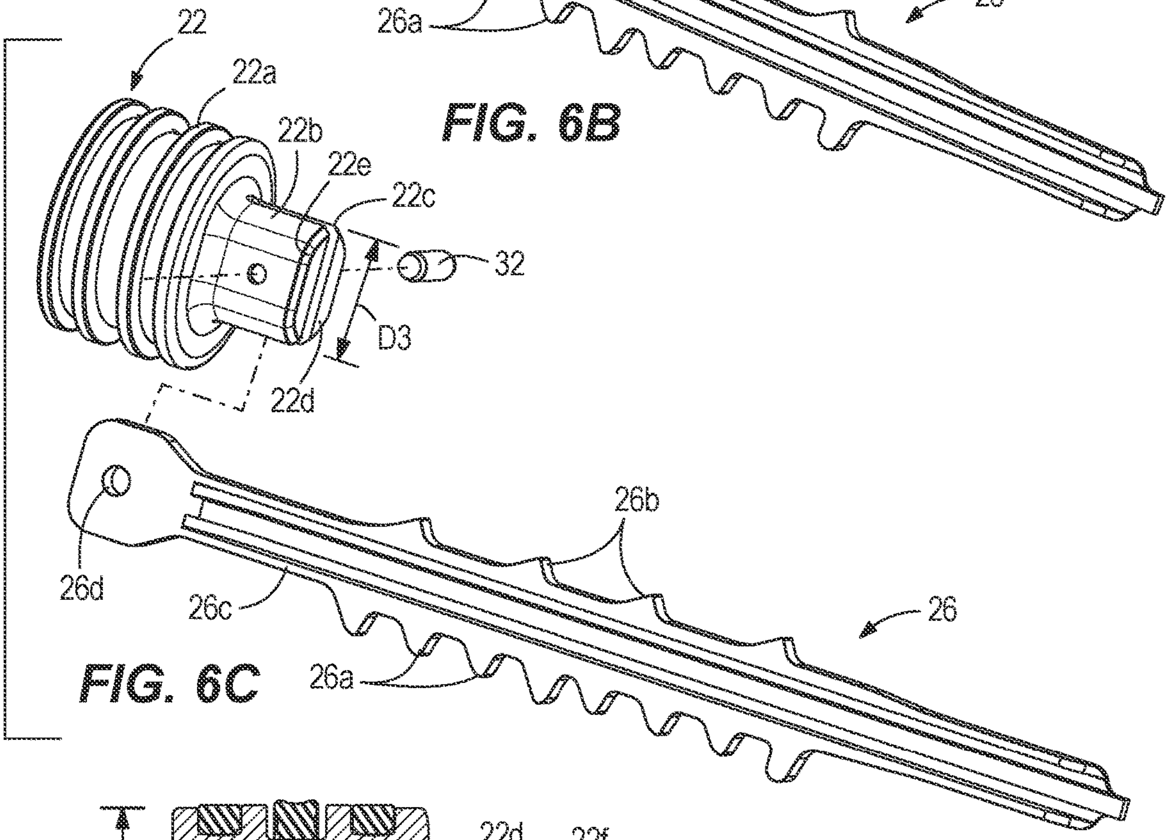
FIG. 6C is an exploded view of the piston and the driver blade of FIG. 6A.
Figure 6D:
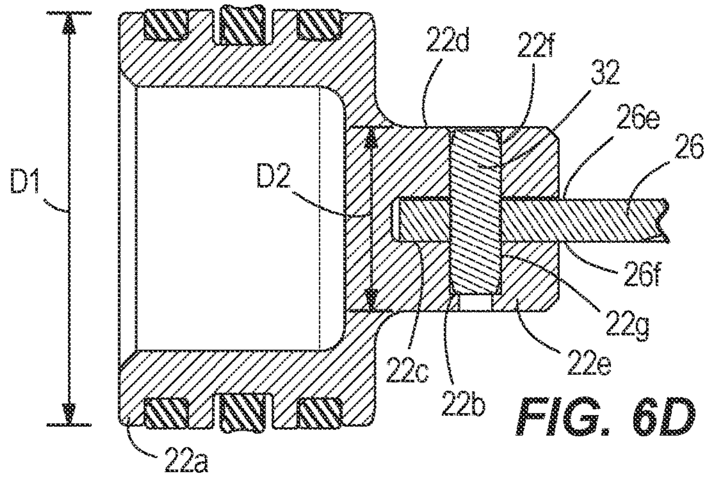
FIG. 6D is a cross-sectional view of the piston and the driver blade of FIG. 6A along the line 6D-6D of FIG. 6B.
Figure 6E:
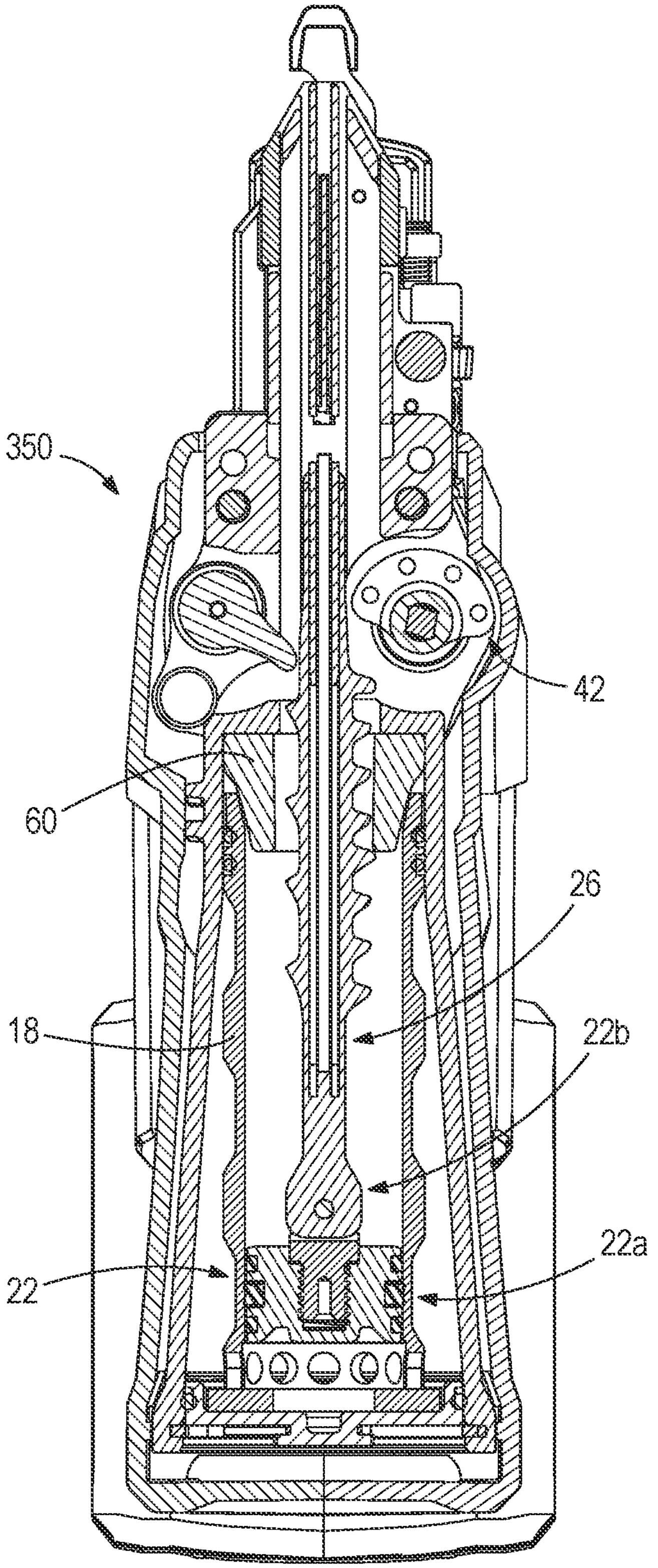
FIG. 6E is a cross-sectional view of the gas spring-powered fastener driver of FIG. 1 along line 6E-6E shown in FIG. 2A, which shows, among other features, a storage chamber cylinder, a cylinder, a piston having a second configuration, a driver blade, and a bumper.

As shown in FIGS. 6A and 6B and discussed below, the driver blade 26 has a body 26*c*, lifting teeth 26*a* extending from one side of the body 26*c*, and latching teeth 26*b* extending from an opposite side of the body 26*c*. In the illustrated embodiment, the body 26*c* of the driver blade 26 has a first surface and a second surface opposite the first surface. Each of the lifting teeth 26*a* has a first surface and a second surface opposite the first surface, and each of the latching teeth 26*b* has a first surface and a second surface opposite the first surface. The first surface of the body 26*c*, each of the first surfaces of the lifting teeth 26*a*, and each of the first surfaces of the latching teeth 26*b* are positioned in a first plane 26*e* (FIG. 6D). The second surface of the body 26*c*, each of the second surfaces of the lifting teeth 26*a*, and each of the second surfaces of the latching teeth 26*b* are positioned in a second plane 26*f* (FIG. 6E). In other embodiments, such as that shown in FIGS. 6H-6J, the latching teeth 26*b* may not be not be in the first and second planes, but may be positioned between the first and second planes. An aperture 26*d* extends through the body 26*c* between the first surface and the second surface. Accordingly, the aperture 26*d* is oriented perpendicular to both the first plane and the second plane.

In the embodiment of FIGS. 6A-6D, the piston 22 includes a first portion 22*a* and a second portion 22*b* that is integrally formed with the first portion 22*a*. The first portion 22*a* is substantially cylindrical and has a first diameter D1 (FIG. 6D), while the second portion 22*b* is substantially ovular and has a first dimension D2 (FIG. 6D) and a second dimension D3 (FIG. 6C) that is less than the first dimension D1. In the embodiment of FIGS. 6A-6D, the first diameter D1 measures approximately 1.0 inches (or approximately 24 mm), the first dimension D2 measures approximately 0.5 inches (approximately 13 mm), and the second dimension D3 measures approximately 0.4 inches (or approximately 10 mm). As used herein, "approximately" means plus or minus 0.2 inches (or approximately 5 mm). The second portion 22*b* includes a slot 22*c* that extends therethrough. The slot 22*c* bifurcates the second portion 22*b* thereby defining a first leg 22*d* and a second leg 22*e* on opposite sides of the slot 22*c*. The first leg 22*d* includes an aperture 22*f*, and the second leg 22*e* includes a bore 22*g* (FIG. 6D). The aperture 22*f* is aligned with (e.g., coincident with) the bore 22*g*. The diameters of the aperture 22*f* and the bore 22*g* are approximately 0.12 inches (or approximately 3.05 mm). The slot 22*c* is sized and shaped to receive the driver blade 26 such that the aperture 26*d* is aligned with (e.g., coincident with) the aperture 22*f* and bore 22*g* of the second portion 22*b*. A pin 32 is received within the aligned apertures 26*d*, 22*f* and bore 22*g* to couple the piston 22 to the driver blade 26. The pin 32 is substantially cylindrical and has a diameter of approximately 0.116 in (or approximately 2.95 mm). In the embodiment of FIGS. 6A-6D, the piston 22 is constructed of a first material (e.g., aluminum) and the driver blade 26 and the pin 32 are constructed from a second material (e.g., steel). In other embodiments, the piston 22, the driver blade 26, and the pin 32 may be constructed from the same second material (e.g., steel).

Figure 6F:
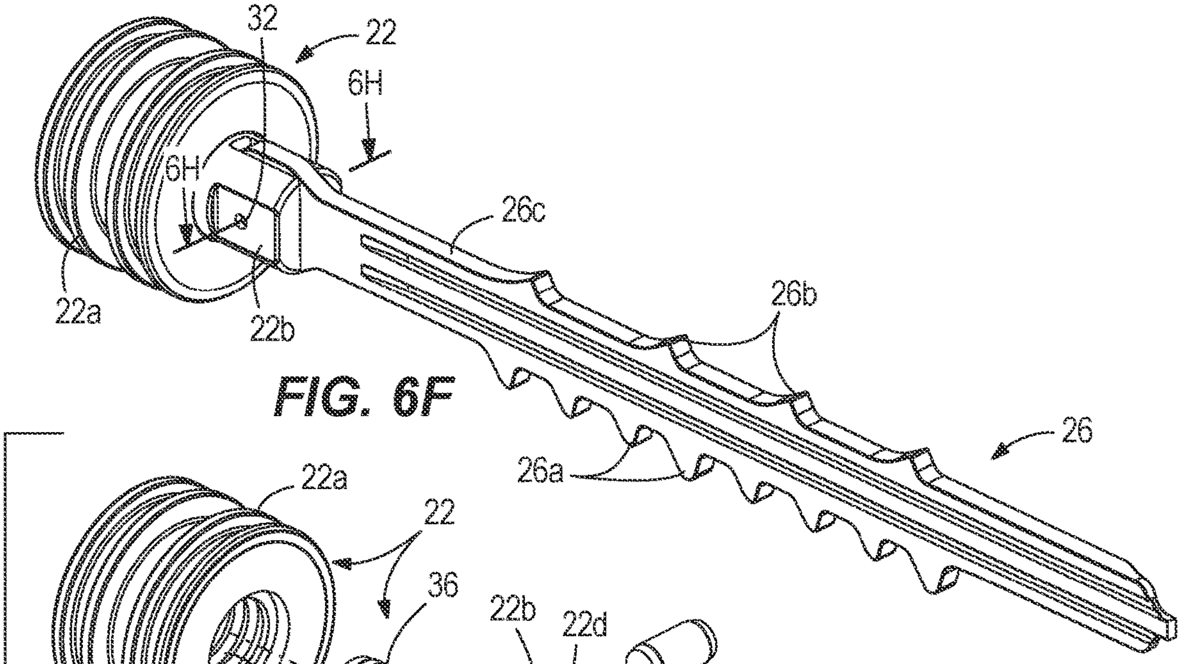
FIG. 6F is a perspective view of the piston and the driver blade of FIG. 6E.
Figure 6G:
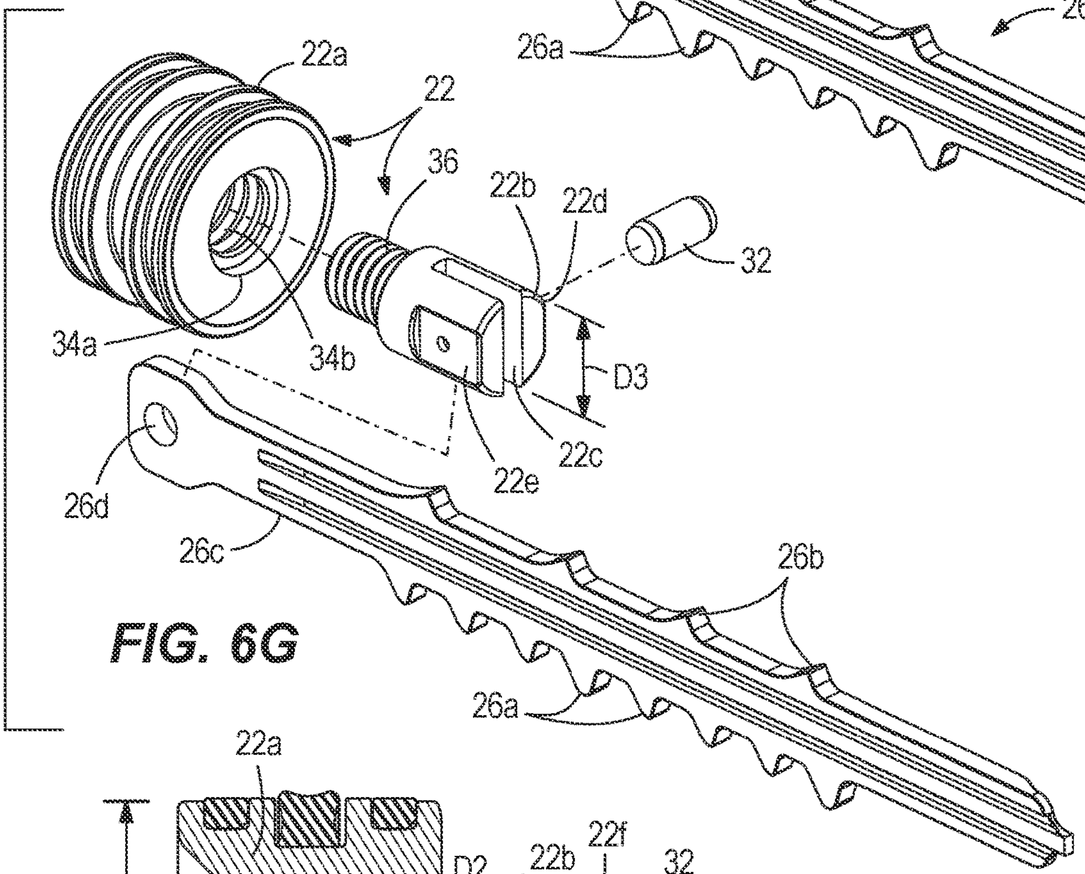
FIG. 6G is an exploded view of the piston and the driver blade of FIG. 6E.

In the embodiment of FIGS. 6E-6G, the piston 22 has a different configuration than that of the piston 22 of FIGS. 6A-6D. Therefore, only the differences between the piston 22 of FIGS. 6E-6G and the piston 22 of FIGS. 6A-6D will be discussed. In the embodiment of FIGS. 6E-6G, the first portion 22*a* and the second portion 22*b* are distinct components that are threadably coupled to one another. To this end, the first portion 22*a* includes a recess 34*a* positioned in one end and a threaded bore 34*b* extending from the recess 34*a* at least partially through the first portion 22*a*. The recess 34*a* circumscribes the threaded bore 34*b*. The second portion 22*b* has a threaded projection 36 extending therefrom. The second portion 22*b* is coupled to the first portion 22*a* via the threaded engagement therebetween. Specifically, the threaded projection 36 is configured to be matingly coupled within the threaded bore 34*b*. When coupled, the second portion 22*b* is seated in the recess 34*a* of the first portion 22*a*. In the embodiment of FIGS. 6E-6G, the first portion 22*a* of the piston 22 is constructed of a first material (e.g., aluminum) and second portion 22*b* of the piston 22, the driver blade 26, and the pin 32 are constructed from a second material (e.g., steel). In other embodiments, both the first and second portions 22*a*, 22*b* of the piston 22, the driver blade 26, and the pin 32 may be constructed from the same second material (e.g., steel). In the illustrated embodiment, a central longitudinal axis extending through the threaded bore 34*a* is aligned with a central longitudinal axis of the first portions 22*a*. Accordingly, a central longitudinal axis extending through the second portion 22*b* is also aligned with the central longitudinal axis of the first portion 22*a* and the central longitudinal axis of the first portion 22*a* extends centrally through the slot 22*c*. In other embodiments, the central longitudinal axis extending through the threaded bore 34*a* may be offset relative to the central longitudinal axis of the first portion 22*a*. In such case, the central longitudinal axis extending through the second portion 22*b* may also be offset relative to the central longitudinal axis of the first portion 22*a* such that the central longitudinal axis of the first portion 22*a* does not extend centrally through the slot 22*c*.

The piston 22 of FIGS. 6E-6G is similarly sized to the piston 22 of FIGS. 6A-6D. Therefore, in the embodiment of FIGS. 6E-6G, like the embodiment of FIGS. 6A-6D, the first diameter D1 measures approximately 1.0 inch (or approximately 24 mm), the first dimension D2 measures approximately 0.5 inch (or approximately 13 mm), the second dimension D3 measures 0.4 inch (or approximately 10 mm), the diameters of aperture 22*f* and bore 22*g* measure approximately 0.12 inch (or approximately 3.05 mm), and the diameter of the pin measures approximately 0.116 inch (or approximately 2.95 mm).

Figure 6H:
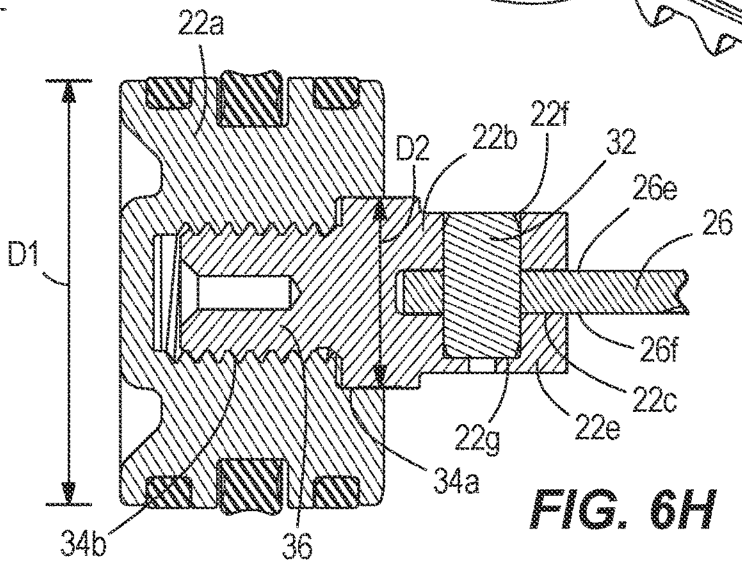
FIG. 6H is a cross-sectional view of the piston and the driver blade of FIG. 6A along the line 6H-6H of FIG. 6F.
Figure 6I:
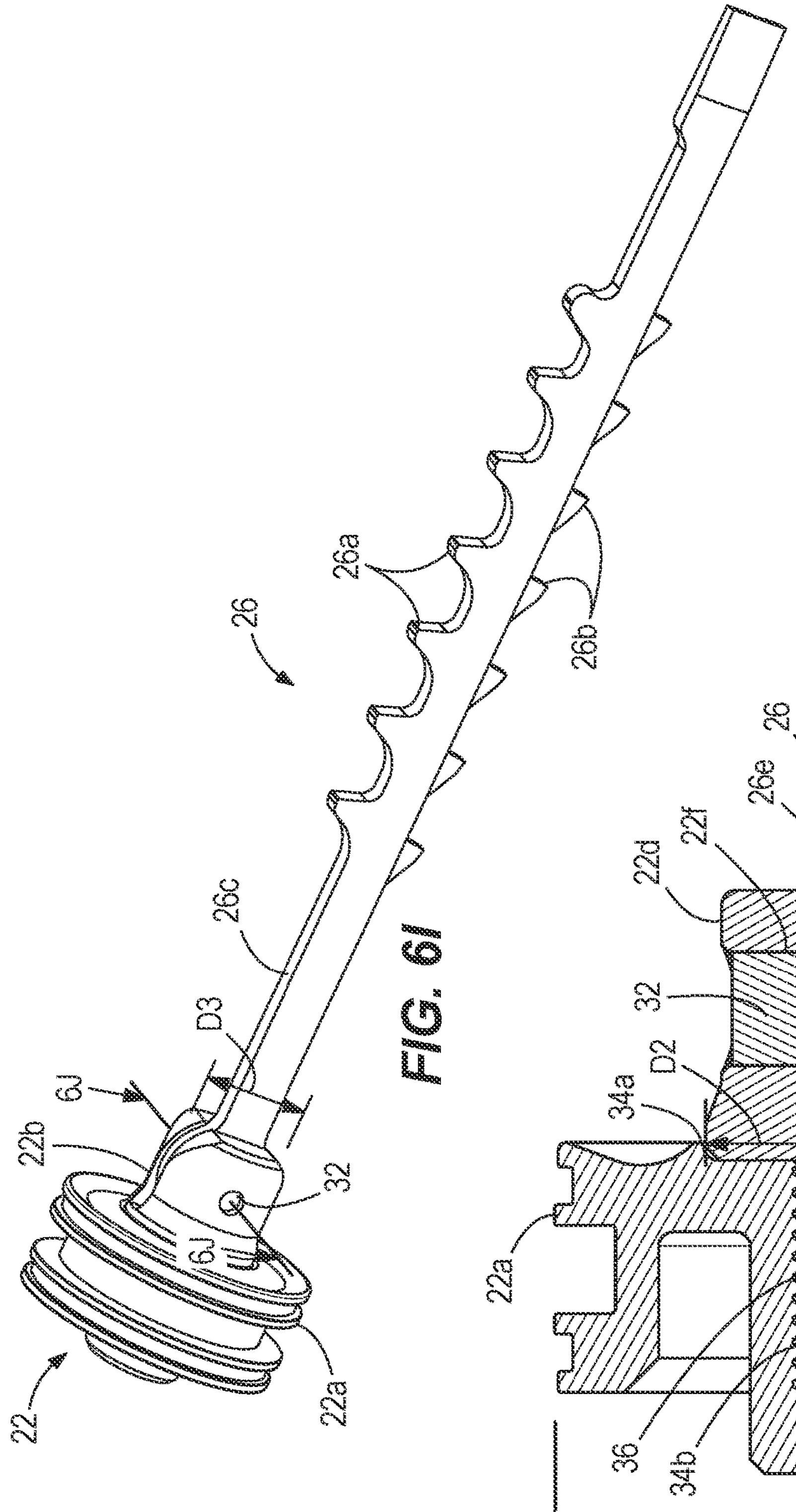
FIG. 6I is a perspective view of another piston and another driver blade having a similar configuration to that of FIG. 6E.
Figure 6J:
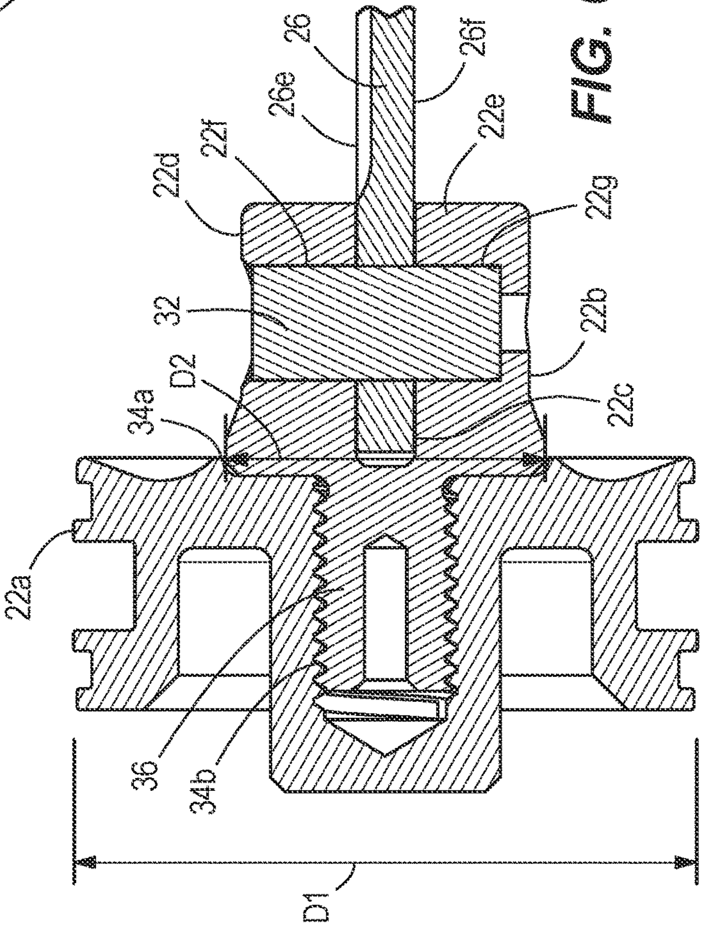
FIG. 6J is a cross-sectional view of the piston and the driver blade of FIG. 6A along the line 6J-6J of FIG. 6I.
Figure 7A:
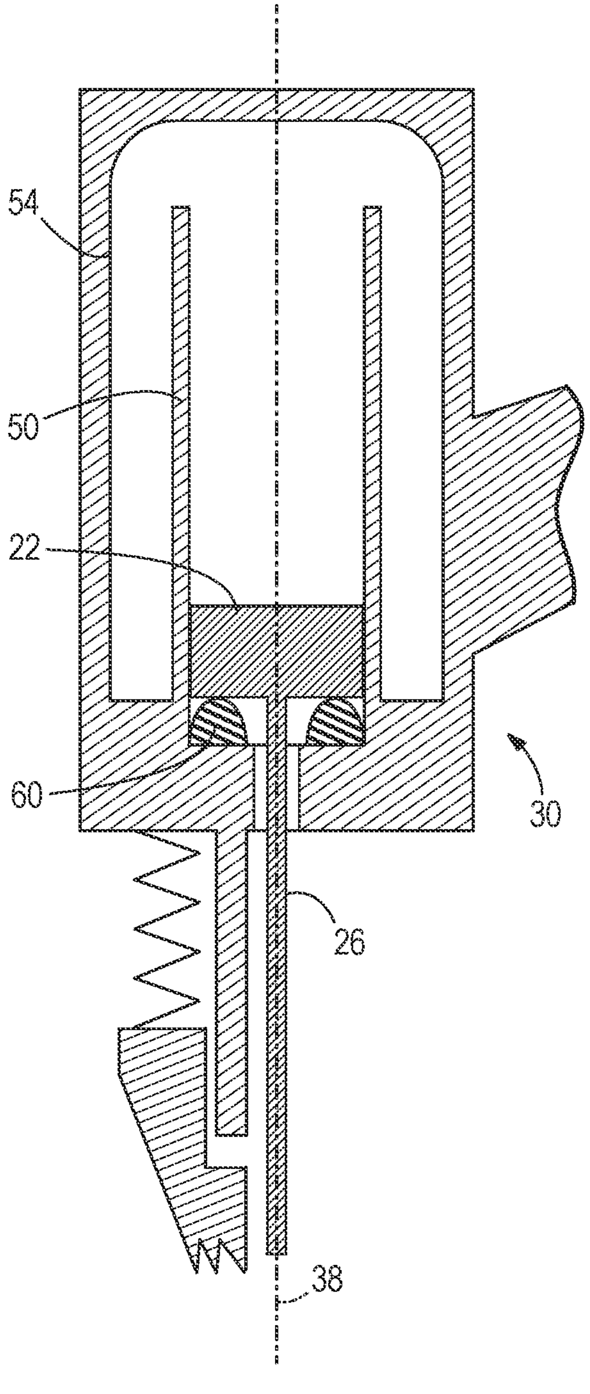
FIG. 7A is a schematic view of the gas spring-powered fastener driver of FIG. 1, illustrating a driver blade in a driven or bottom-dead-center position.
Figure 7B:
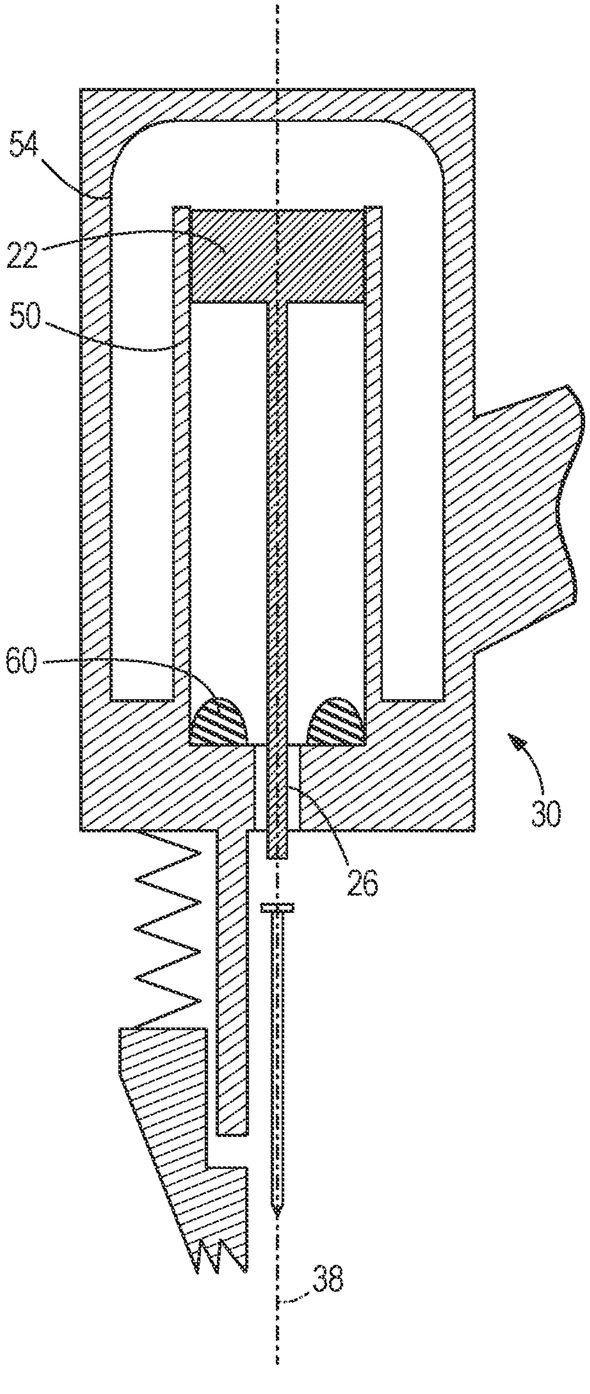
FIG. 7B is a schematic view of the gas spring-powered fastener driver of FIG. 1, illustrating a driver blade in a top-dead-center position prior to actuation.

However, the piston 22 and driver blade 26 of FIGS. 6E-6G may be suitable for larger powered fastener driver, as well, and therefore may have other dimensions (e.g., larger dimensions), as shown in FIGS. 6H-6J. In the embodiment of FIGS. 6H-6J, the first diameter measures approximately 1.7 inch (or approximately 43 mm), the first dimension D2 measures approximately 0.8 inch to 0.9 inch (or approximately 20 mm to 22.3 mm), the second dimension D3 measures approximately 1.1 inch (or approximately 28 mm), the diameters of the aperture 22*f* and bore 22*g* measure approximately 0.18 inch (or approximately 4.5 mm), and the diameter of the pin 32 measures approximately 0.18 inch (or approximately 4.5 mm). As noted above, the pin 32 is pressed into the bore 22*g*.

With reference to FIGS. 6A-7B, the cylinder 18 and the driver blade 26 define a driving axis 38. During a driving cycle, the driver blade 26 and piston 22 are moveable between a top-dead-center (TDC) position (FIG. 7B) and a driven or bottom-dead-center (BDC) position (FIG. 7A). The fastener driver 10 further includes a lifting assembly 42 (FIGS. 3, 4, 6, and 11-13), which has a lifter 44 (FIG. 6A) that is powered by a motor 46 (FIGS. 3, 4, 11-12) and that moves the driver blade 26 from the driven position to the TDC position.

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC position and the BDC position (e.g., the driven position), until being released by user activation of a trigger 48 (FIG. 1). When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifting assembly 42 and the piston 22 to further compress the gas within the cylinder 18 and the storage chamber cylinder 30. Further detail regarding the structure and operation of the fastener driver 10 is provided below.

With reference to FIGS. 6A-7B, the storage chamber cylinder 30 surrounds the cylinder 18. The cylinder 18 has an annular inner wall 50 configured to guide the piston 22 and driver blade 26 along the driving axis 38 to compress the gas in the storage chamber cylinder 30. The storage chamber cylinder 30 has an annular outer wall 54 circumferentially surrounding the inner wall 50. As such, the cylinder 18 is configured to be axially secured to the storage chamber cylinder 30.

With reference to FIG. 6A, the driver 10 includes a bumper 60 positioned beneath the piston 22 for stopping the piston 22 at the driven position (FIG. 7A) and absorbing the impact energy from the piston 22. The bumper 60 is configured to distribute the impact force of the piston 22 uniformly throughout the bumper 60 as the piston 22 is rapidly decelerated upon reaching the driven position (i.e., the bottom dead center position). The bumper 60 may be formed from any suitable elastic material (e.g., rubber). It is contemplated that a piston 22 that is constructed all or partially from a stronger material, such as steel (as discussed above), may survive the high impacts that result from a cold fire event. This is because when the tool gets cold the bumper 60 increases in stiffness and instead of a soft rubber that absorbs the impact, the bumper 60 no longer compresses as much, absorbs less energy, and causes a higher stress through the piston 22. A steel piston 22, with its higher strength, can withstand this impact better than an aluminum piston 22.

As shown in FIGS. 9A-9G, in the illustrated embodiments, the bumper 60 may have an asymmetric shape and include an asymmetric opening 62 extending therethrough. The bumper 60 defines a first bumper plane 60*a* and a second bumper plane 60*b* that is perpendicular to the first bumper plane 60*a*. The driving axis 38 extends in the second bumper plane 60*b*. In the illustrated embodiments, the bumper 60 includes an upper portion with a first perimeter dimension and a lower portion with a second perimeter dimension that is larger than the first perimeter dimension. In the illustrated embodiment, the opening 62 is generally ovular. As shown, the opening 62 is asymmetric across the first bumper plane 60*a*, and symmetric across the second bumper plane 60*b*, which is perpendicular to the driving axis 38 and the first bumper plane 60*a*. In other embodiments, the opening 62 may be asymmetrical about both the first and second bumper planes 60*a*, 60*b*. Additionally, the opening 62 has a height H1 extending along the first bumper plane 60*a* and a width W1 extending along the second bumper plane 60*b*. As shown, the width W1 that is greater than the height H1. In the illustrated embodiments, a slot 30*a* extending through the storage chamber cylinder 30 that accommodates the blade has a height H2 and a width W2. As shown in the illustrated embodiments, the width W2 of the slot 30*a* is substantially similar to the width W1 of the opening 62, but the height H2 of the slot 30*a* is much smaller than a height H1 of the opening 62. In some embodiments, the height H2 of the slot 30*a* is half or less than half the height H1 of the opening 62.

Figure 8:
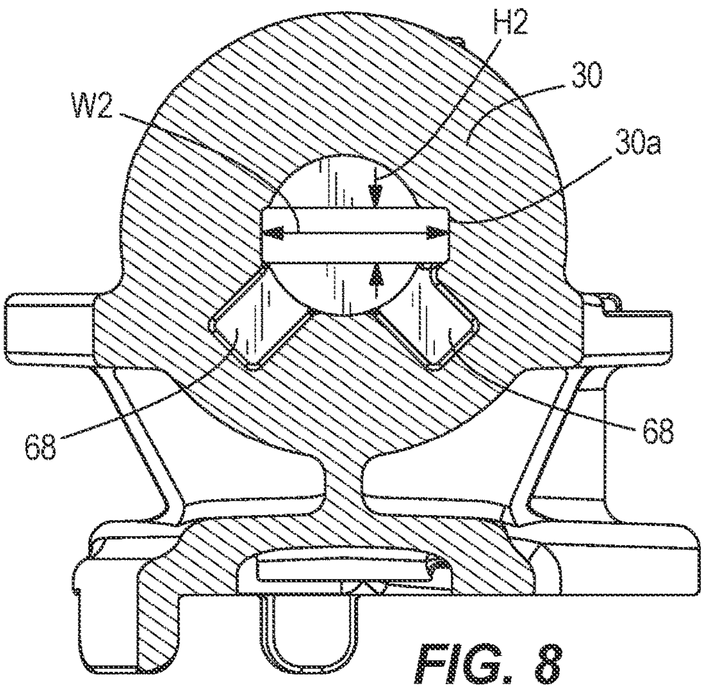
FIG. 8 is a cross-sectional view of a portion of the storage chamber cylinder of FIG. 6A along line 8-8 shown in FIG. 6A.
Figure 9A:
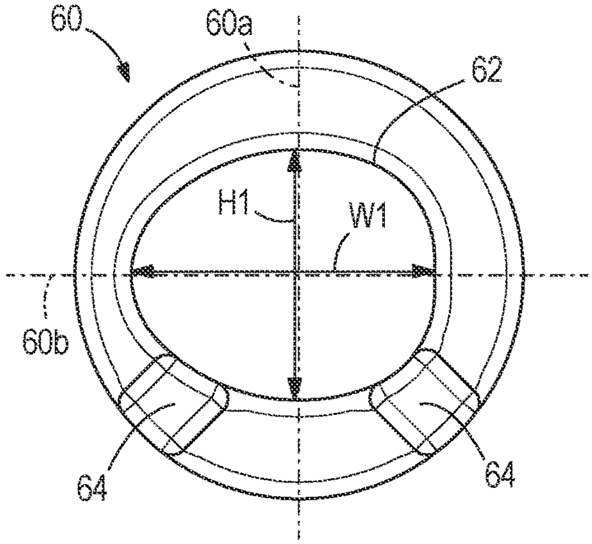
FIG. 9A is a lower end view of the bumper of FIG. 6A, according to one embodiment.
Figure 9B:
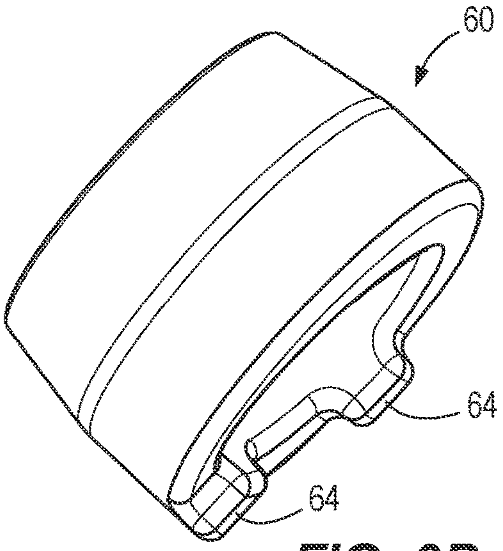
FIG. 9B is a perspective view of the bumper of FIG. 9A.
Figure 9C:
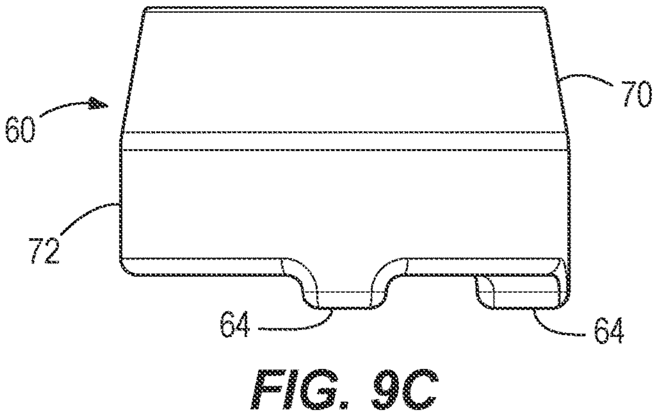
FIG. 9C is a side view of the bumper of FIG. 9A.
Figure 9D:
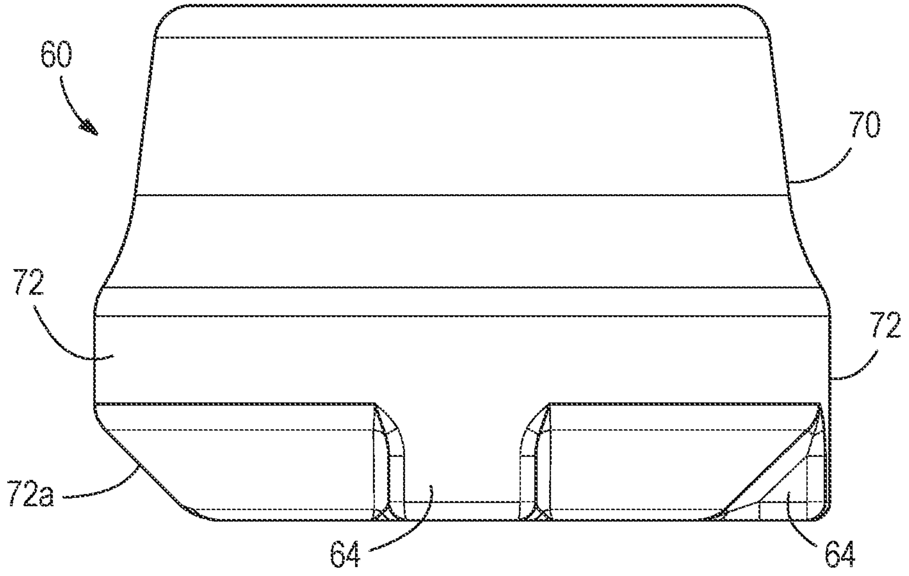
FIG. 9D is a side view of a bumper that may be usable with the gas-spring powered fastener of FIG. 1, according to another embodiment.
Figure 9E:
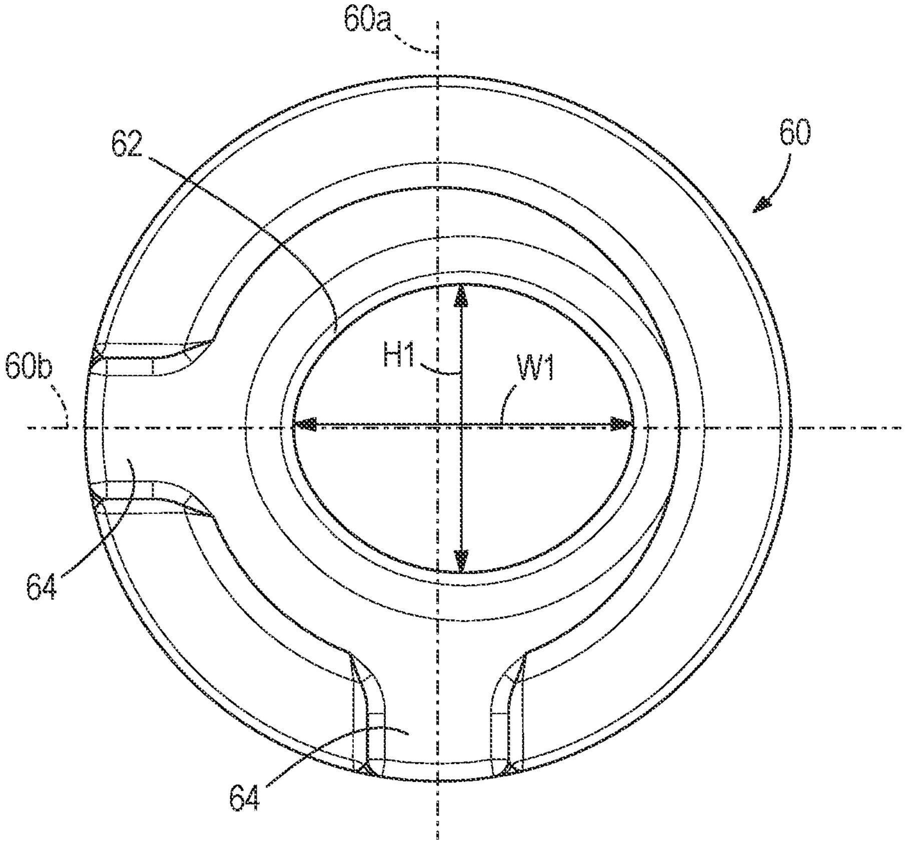
FIG. 9E is a lower end view of the bumper of FIG. 9D.
Figure 9F:
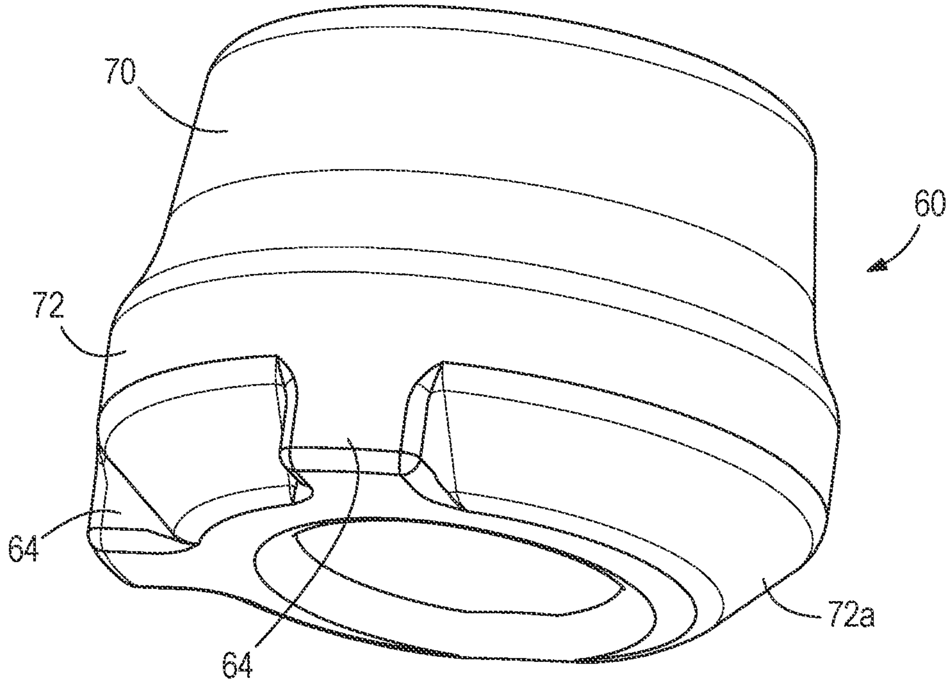
FIG. 9F is a perspective view of the bumper of FIG. 9D.
Figure 9G:
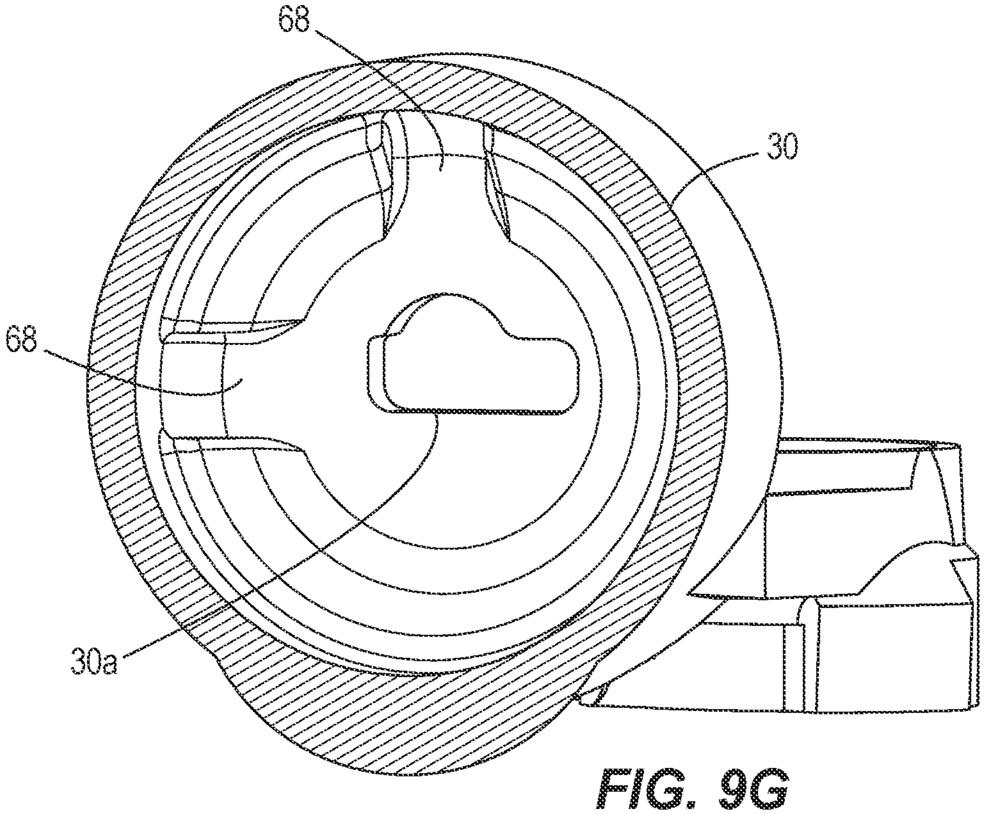
FIG. 9G is a cross-sectional view of a portion of a storage chamber cylinder that may be useable with bumper of FIG. 9D.
Figure 9H:
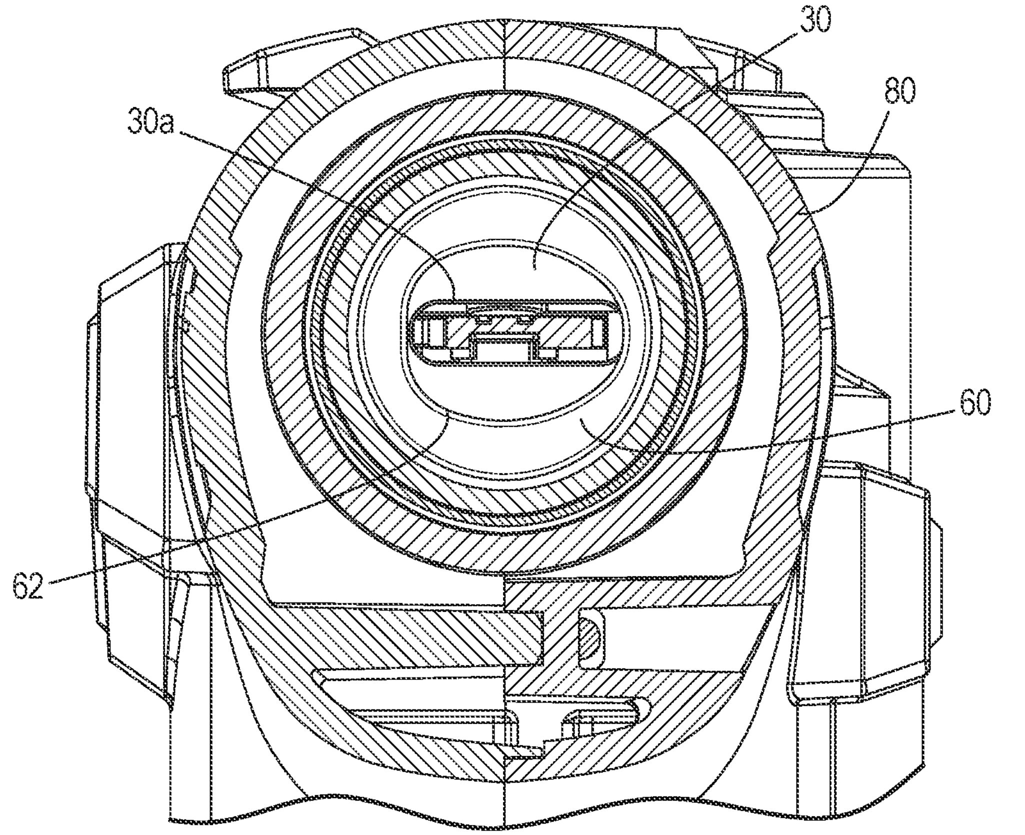
FIG. 9H is a cross-sectional view of the powered fastener driver of FIG. 1 along the line 9H-9H of FIG. 3 illustrating the storage chamber cylinder having another confirmation and the bumper having another configuration.
Figure 9I:
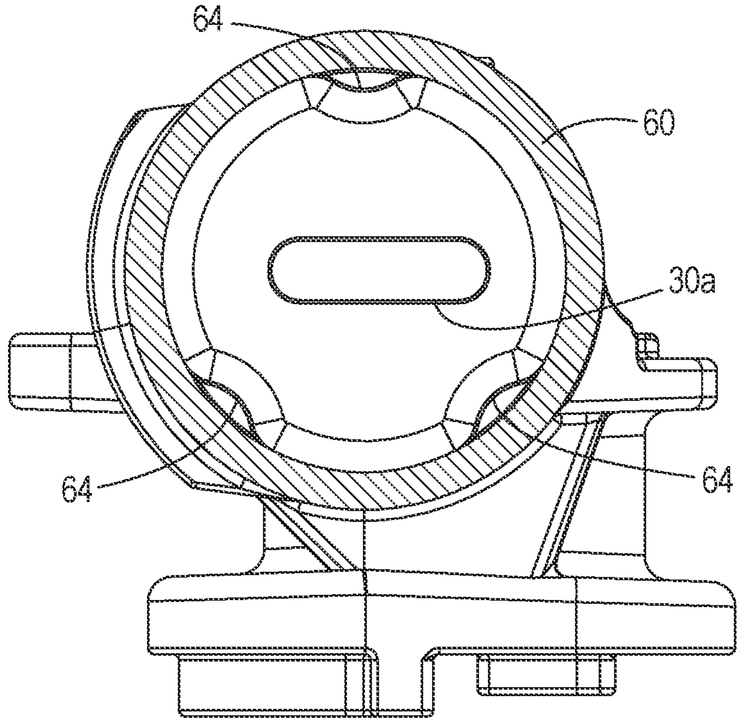
FIG. 9I a cross-sectional view of the storage chamber cylinder of FIG. 9H along the line 9H-9H of FIG. 3.
Figure 9J:
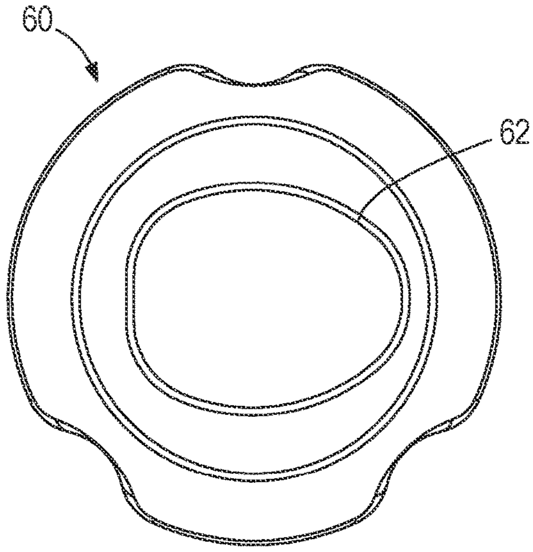
FIG. 9J is an upper end view of the bumper of FIG. 9H.
Figure 9K:
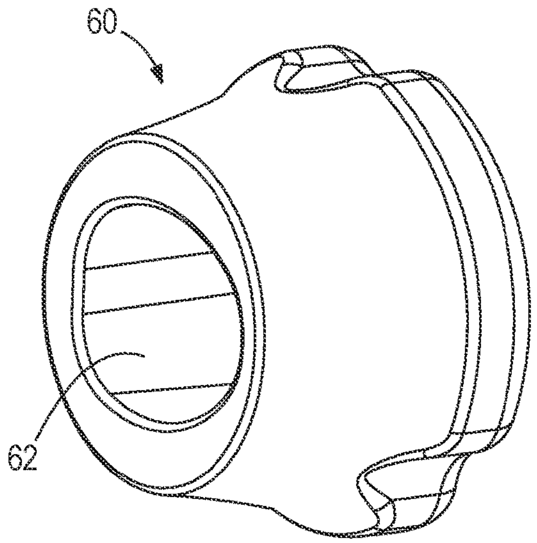
FIG. 9K is a perspective view of the bumper of FIG. 9H.
Figure 9L:
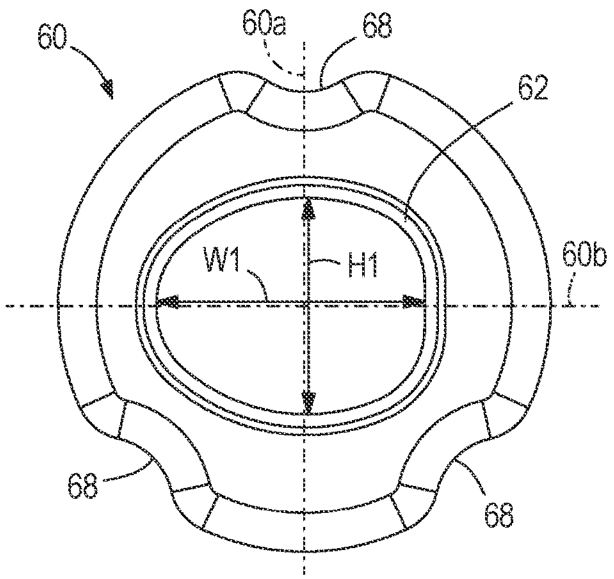
FIG. 9L is a lower end view of the bumper of FIG. 9H.
Figure 9M:
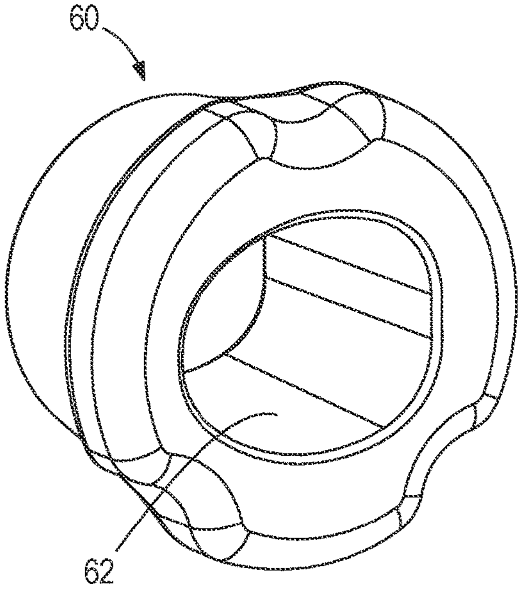
FIG. 9M is another perspective view of the bumper of FIG. 9H.

In the embodiments illustrated in FIGS. 8-9G, the bumper 60 may include a key 64 (e.g., a male component) that is configured to be received in a complementary keyway 68 (e.g., a female component) of the storage chamber cylinder 30 (e.g., an inner frame member or housing). The use of the key 64 and keyway 68 prevents the bumper 60 from rotating during firing events. In the illustrated embodiment, the key 64 of the bumper 60 may include one or more projections and the keyways 68 of the storage chamber cylinder 30 may be complementary recesses that each receive one of the projections of the bumper 60. As shown, the bumper 60 has two projections 64 positioned adjacent one another on the same side of the asymmetric opening 62. In other embodiments, there may be any suitable number of projections 64 on the bumper 60 that are oriented in any suitable configuration. In other embodiments, such as that of FIGS. 9I-9M, the one or more keys 64 (e.g., male components) may extend from the storage chamber cylinder 30 and the one or more keyways 68 (e.g., the female components) may be formed on the bumper. In the embodiment of FIGS. 9I-9M, there are three keyways 68. At least one keyway 68 is positioned on each opposite side of the second bumper plane 60*b*. As shown in FIG. 9L, there is one keyway 68 positioned on a first side of second bumper plane 60*b* and there are two keyways 68 positioned on a second opposite side of the second bumper plane 60*b*. Stated another way, there is one keyway 68 that is at least partially positioned in the first bumper plane 60*a* and there is one keyway 68 on each side of the first bumper plane 60*a*. In the illustrated embodiment of FIG. 9I, the keys 64 are curvilinear projections or grooves extending along the wall of the storage chamber cylinder 30 parallel to the driving axis 38. Similarly, the keyways 68 are curvilinear recesses in the second outer perimeter of the bumper 60. Regardless of the configuration of the keys/keyways, the keys/keyways cause the bumper 60 to have a generally asymmetrical shape about the first bumper plane 60, the second bumper plane 60*b*, or both the first and second bumper planes 60*s*, 60*b*. In the illustrated embodiment, the bumper 60 has a generally asymmetrical shaped about both the first and second bumper planes 60*a*, 60*b*. Additionally, the keys/keyways are configured to clock the bumper 60 in the correct or predetermined orientation so that the opening 62 is correctly oriented relative to the storage chamber cylinder 30 and the slot 30*a* thereof.

Moreover, in the illustrated embodiment of FIGS. 9A-9F, the upper portion of the bumper 60 has an angled outer surface 70 thereby defining the first outer dimension (e.g., an outer diameter) that tapers from an upper end to an intermediate portion. In contrast, the lower portion has a substantially straight outer surface 72 thereby defining a substantially constant second outer dimension (e.g., outer diameter) from the intermediate portion to a lower end. In other embodiments (e.g., FIG. 9D-9F), the lower portion may alternatively include a tapered edge 72*a*, such that that the lower portion includes both a straight outer surface 72 and an angled outer surface 72*a*. Regardless of the embodiment, the upper portion may have a different cross-sectional shape than the lower portion.

It should be noted that while the bumpers 60 having the keys 64 and the cylinders 30 having the keyways 68 are shown relative to the illustrated powered fastener nailer, the bumper and cylinder configurations may be used in powered fastener nailers having other configurations (e.g., a roofing nailer).

The asymmetric shape of the bumper 60 and the asymmetric opening 62 thereof is configured to accommodate the lifting teeth 26*a* and the latching teeth 26*b* on each side of the bumper 60, but also allow the opening 62 to be smaller at opposite ends thereof such that the bumper 60 enables an overall smaller tool. More specifically, the shape of the opening 62 allows the bumper 60 to be smaller since clearance is only necessary on the opposite sides of the driver blade 26. In contrast, if the opening 62 was a circle (rather than an oval), the bumper 60 would have thinner walls on the top and bottom of the bumper 60 and therefore would need to have a larger outer dimension to compensate. The bumper 60 configuration, therefore, enables the size of the storage chamber cylinder 30 to be reduced and the end result is a smaller width tool. The shape of the opening 62 also significantly reduces the stress in the bumper 60 during compression. In conventional designs, a cutout for the driver blade may have a reduced clearance but its sized and shaped similarly to the size and shape of the slot 30*a* in the storage chamber cylinder. In other words, the heights of conventional cutouts are much closer to the heights of the slots of the storage chamber cylinder. This causes a large stress concentration on the bumper on one of the sides of the cutout.

Figure 4:
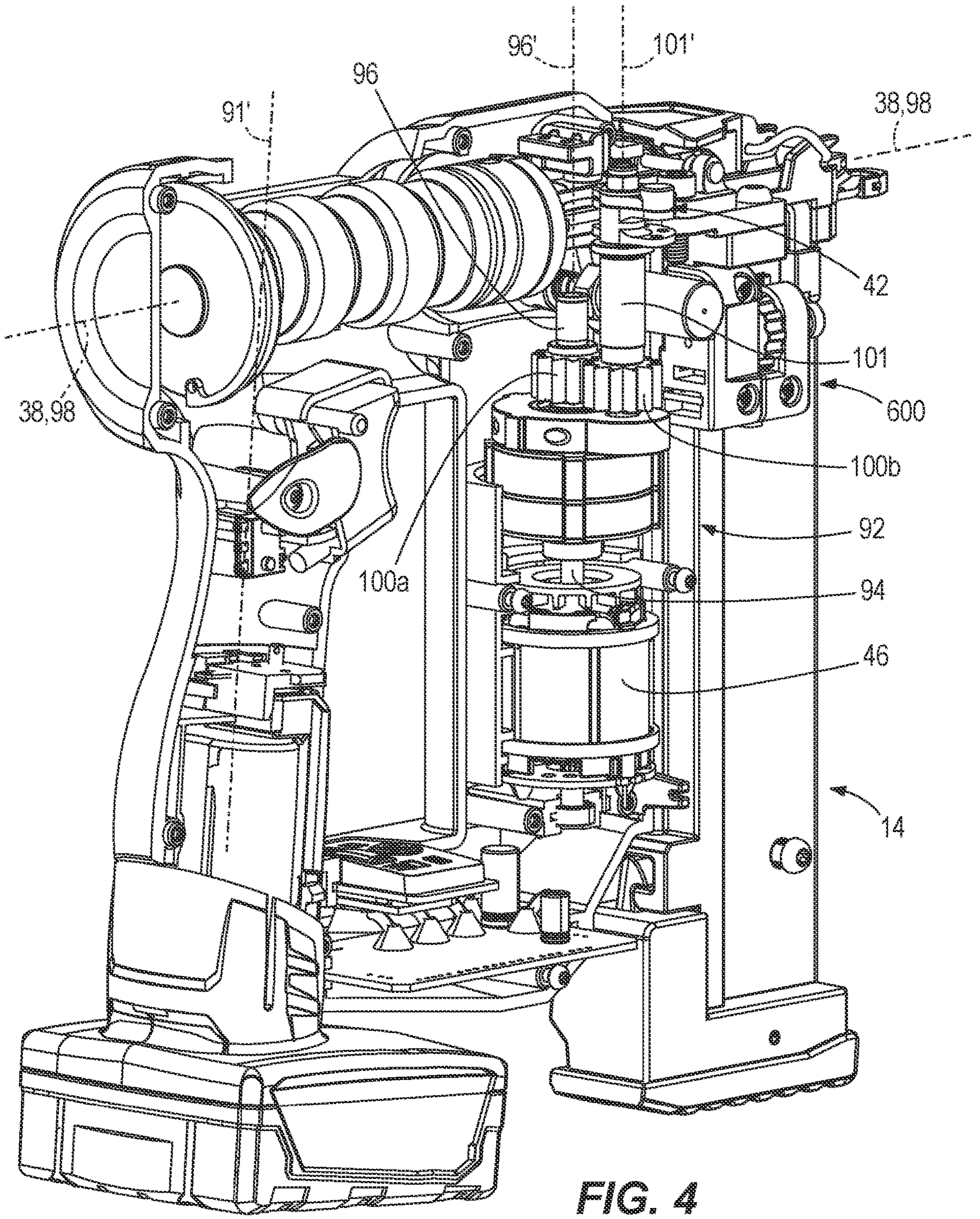
FIG. 4 is another partial cut-away view of the gas spring-powered fastener driver of FIG. 1, with portions removed for clarity.
Figure 5:
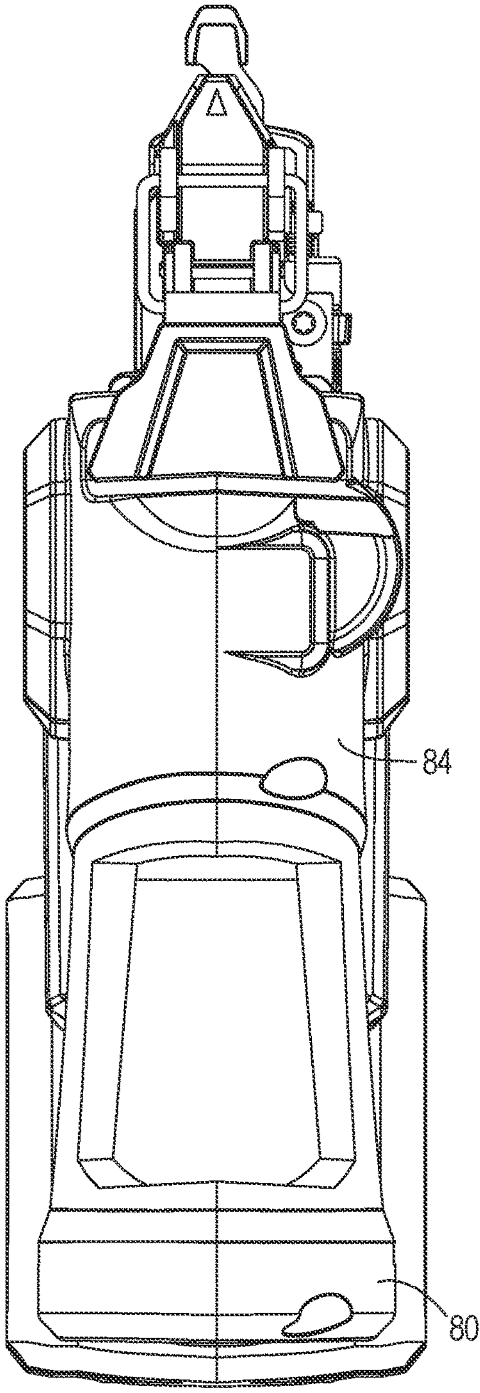
FIG. 5 is a top view of the gas spring-powered fastener driver of FIG. 1.

With reference to FIGS. 1 and 2, the driver 10 includes a housing 80 having a cylinder support portion 84 in which the storage chamber cylinder 30 is at least partially positioned, a drive unit support portion 88 in which the motor 46 and a transmission 92 are at least partially positioned, and a handle portion 91, which defines a handle axis 91' that intersects the driving axis 38. In other words, the handle axis 91' is oriented in a plane 98 that bisects the driver 10 and extends through the driving axis 38 (FIG. 4). In other embodiments, the handle axis 91' is in a plane that is offset from the driving axis 38 by less than 10 mm. In other embodiments, the handle axis 91' is in a plane that is offset from the driving axis 38 by less than 5 mm. In other embodiments, the handle axis 91' is in a plane that is offset from the driving axis 38 by between 1 mm and 5 mm. Additionally, in the illustrated embodiment, the cylinder support portion 84 extends between the drive unit support portion 88 and the handle portion 91. Accordingly, the drive unit support portion 88 and the handle portion 91 are spaced apart from one another. Moreover, the drive unit support portion 88 is spaced apart from the handle portion 91 in a direction toward the magazine 14 (and the nosepiece assembly 400 and the second end 548 of the workpiece contact assembly 540). In the illustrated embodiment, the cylinder support portion 84, the drive unit support portion 88, and the handle portion 91 are integrally formed with one another as a single piece (e.g., using a casting or molding process, depending on the material used). As described below in further detail, the transmission 92 raises the driver blade 26 from the driven position to the ready position. With reference to FIG. 4, the motor 46 is positioned within the drive unit support portion 88 for providing torque to the transmission 92 when activated. A battery pack 90 is received and supported by a battery pack attachment interface of the handle portion 91. The battery pack 90 is electrically connectable to the motor 46 for supplying electrical power to the motor 46. In alternative embodiments, the driver may be powered from an alternative power source such as an AC voltage input (i.e., from a wall outlet), or by an alternative DC voltage input (e.g., an AC/DC converter).

Figure 35:
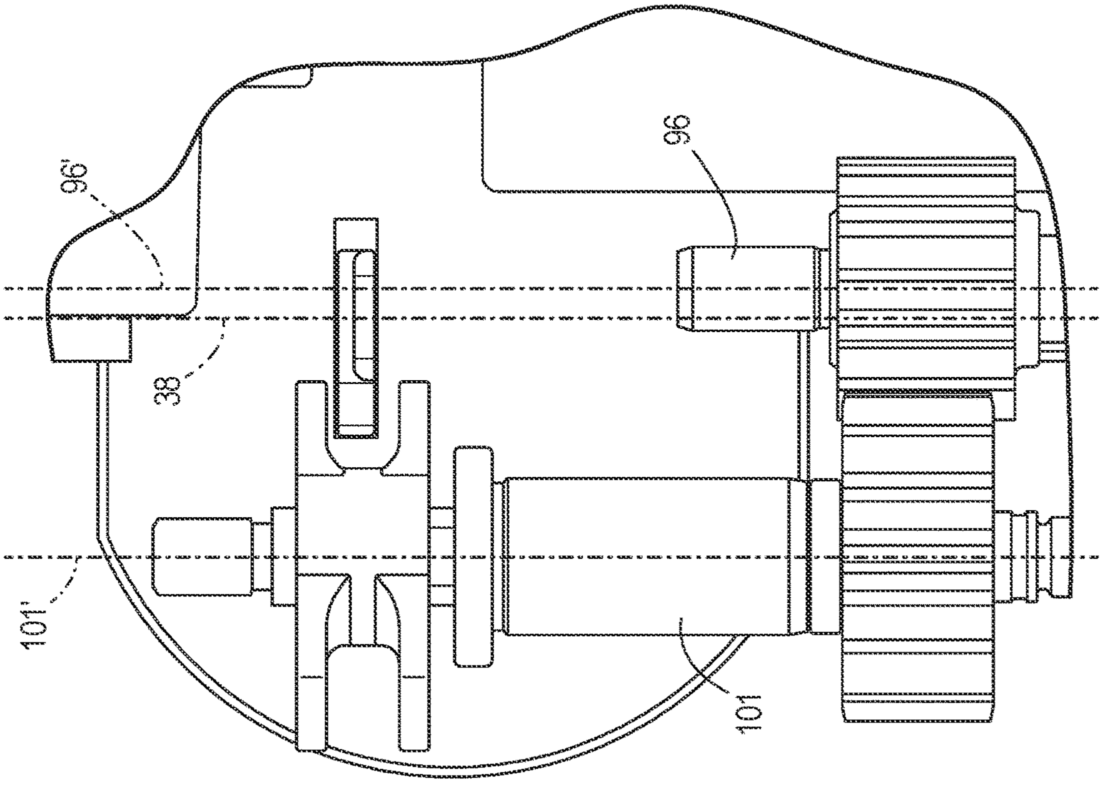
FIG. 35 illustrates a schematic view of a transmission for use with the fastener driver of FIG. 1 or 24 relative to a driving axis thereof.

With reference to FIG. 4, the transmission 92 provides torque to the lifter 44 from the motor 46. The transmission 92 includes an input shaft 94 and a first output shaft 96 extending along a first output shaft axis 96'. In the illustrated embodiment, the first output shaft axis 96' intersects the driving axis 38. In other words, like the handle axis 91' and the first output shaft axis 96' are contained within the plane 98 that bisects the driver 10 and also contains the driving axis 38. In other embodiments, such as that of FIG. 35, the first output shaft axis 96' is in a plane that is offset from the driving axis 38 by a first distance X. The first distance X may be less than about 10 mm (wherein about means plus or minus 0.1 mm). In other embodiments, the first distance X may be less than about 5 mm. In other embodiments, the first distance X may be between about 1 mm and 5 mm. In the embodiment of FIG. 35, the first distance X less than about 1.5 mm. Regardless, the motor 46 is generally in-line with the handle portion 91. As shown, the motor 46 is therefore positioned between the handle 91 and the magazine 14 (and therefore the nosepiece assembly 400 and the second end 548 of the workpiece assembly 540). That is, the motor 46 is generally below the handle 91 when the tool 10. With continued reference to FIG. 4, the first output shaft 96 rotates a drive gear 100*a*, which is operable to drive a driven gear

100*b*. In the illustrated embodiment, the gears 100*a*, 100*b* are meshed spur gears. Extending from the driven gear 100*b* is a second output shaft 101. The second output shaft 101 is operable to drive the lifter 44, which in turn is operable to move the driver blade 26 from the driven position to the ready position, as explained in greater detail below. In the illustrated embodiment, the second output shaft 101 extends along a second output shaft axis 101' that parallel to the first output shaft axis 96' and the plane 98. As shown, the second output shaft axis 101' extends in a plane that is laterally offset from the driving axis 38 and the plane 98 by a second distance Y. Moreover, as shown, the second distance Y is greater than the first distance X. As noted above, in some embodiments, such as that of FIG. 35, the driving axis 38 is positioned between the first output axis 96' and the second output axis 101'. In the illustrated embodiment, the second distance Y is about 15.6 mm. In other embodiments, the second distance is between about 5 mm and about 30 mm or between about 10 mm and about 20 mm. As shown, the first motor axis 96' and the second motor axis 101' are spaced apart from one another by a third distance Z. In the illustrated embodiment, the third distance Z may be about 17 mm. In other embodiments, the third distance Z may be between about 10 mm and about 30 mm or between about 15 mm and about 20 mm. Accordingly, the driving axis 38 may be positioned less than 10% of the third distance Z as measured from the first output axis 96'.

Figure 10:
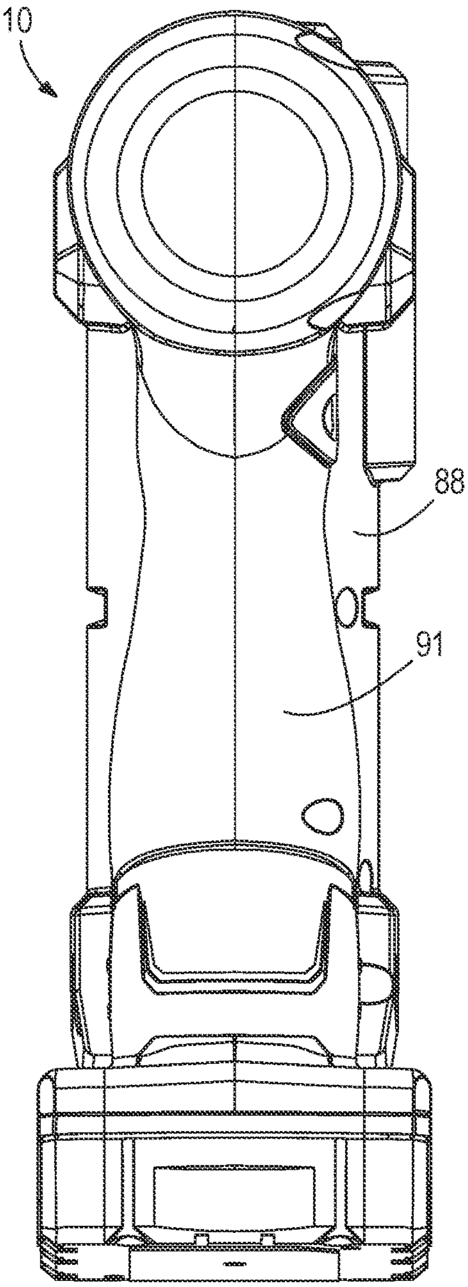
FIG. 10 is a rear view of the gas spring-powered fastener of FIG. 1.

Because the motor 46 and drive unit support portion 88 are in-line with the handle portion 91 as shown in FIG. 10, the driver 10 is more compact than conventional fastener drivers 10 in which the motor is offset from the handle portion. This is because only the driven gear 101*b* and second output shaft 101, rather than the entire transmission 92, need to be offset from the driving axis 38 and the plane 98 to provide torque to the lifter 44.

Figure 11:
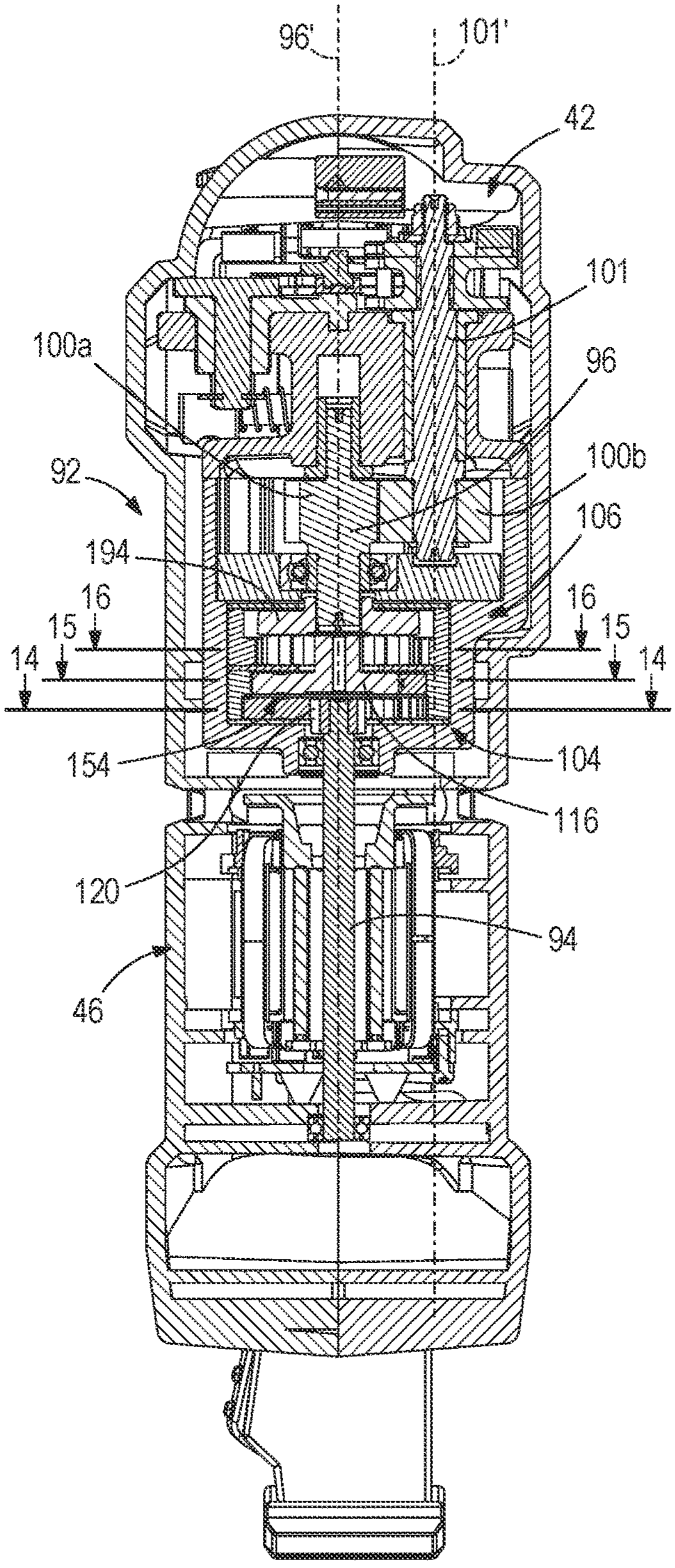
FIG. 11 is a cross-sectional view of the gas spring-powered fastener of FIG. 1 taken along the line 11-11 of FIG. 2A and illustrating a transmission.

With reference to FIG. 11, the transmission 92 is configured as a planetary transmission having a first planetary gear stage 104 and a second planetary gear stage 106. In alternative embodiments, the transmission may be a single-stage planetary transmission, or a multi-stage planetary transmission including any number of planetary gear stages. The first planetary gear stage 104 includes a ring gear 112, a carrier 116 (FIGS. 11 and 15), a sun gear 120, and multiple planet gears 124 coupled to the carrier 116 for relative rotation therewith. The sun gear 120 is drivingly coupled to the input shaft 94 and is enmeshed with the planet gears 124. The ring gear 112 includes a toothed interior peripheral portion 128. In the illustrated embodiment, the ring gear 112 in the first planetary gear stage 104 is fixed to a transmission housing 132 (FIG. 12) positioned adjacent the motor 46 such that it is prevented from rotating relative to the transmission housing 132. The plurality of planet gears 124 are rotatably supported upon the carrier 116 and are engageable with (i.e., enmeshed with) the toothed interior peripheral portion 128.

Figure 15:
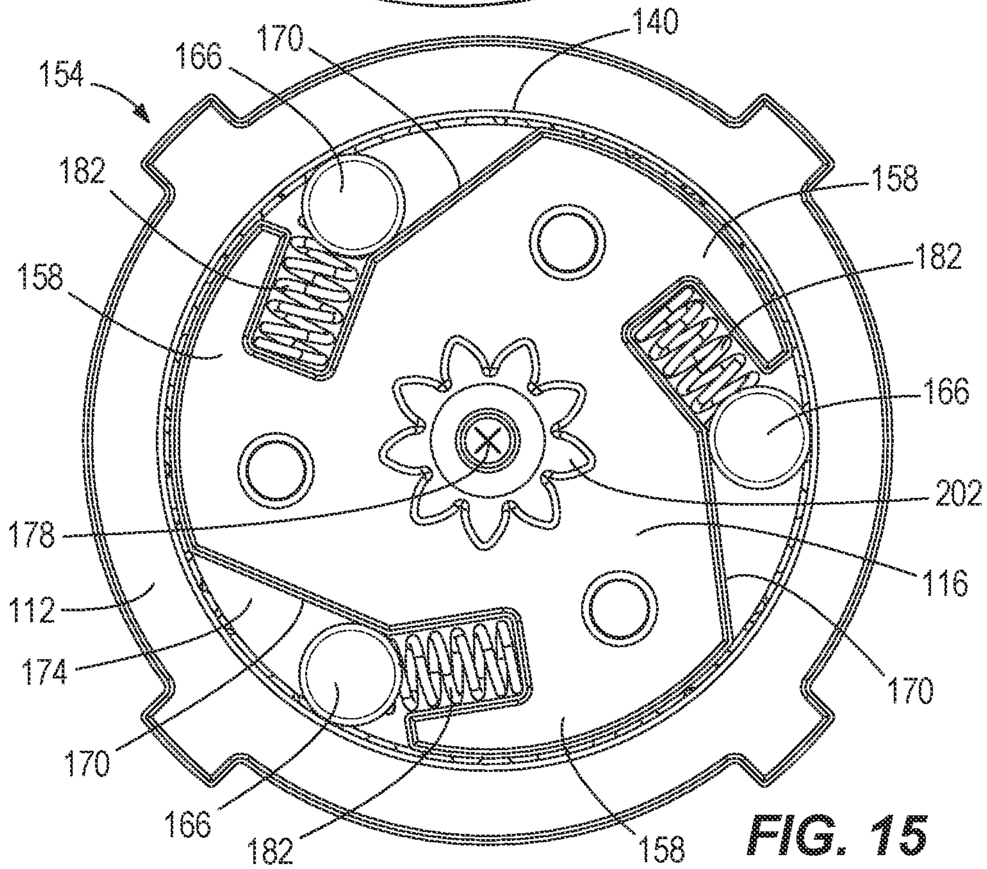
FIG. 15 is a cross-sectional view of the transmission of FIG. 11 taken along the line 15-15 of FIG. 11.

With reference to FIGS. 11 and 15, the driver 10 further includes a one-way clutch mechanism 154 incorporated in the transmission 92. More specifically, the one-way clutch mechanism 154 includes the carrier 116, which is also a component in the second planetary gear stage 106. The one-way clutch mechanism 154 permits a transfer of torque to the first output shaft 96 of the transmission 92 in a single (i.e., first) rotational direction (i.e., counter-clockwise from the frame of reference of FIG. 3), yet prevents the motor 46 from being driven in a reverse direction in response to an application of torque on the first output shaft 96 of the transmission 92 in an opposite, second rotational direction (e.g., clockwise from the frame of reference of FIG. 3). In the illustrated embodiment, the one-way clutch mechanism 154 is incorporated with the first planetary gear stage 104 of the transmission 92. In alternative embodiments, the one-way clutch mechanism 154 may be incorporated into the second planetary gear stage 106, for example.

Figure 14:
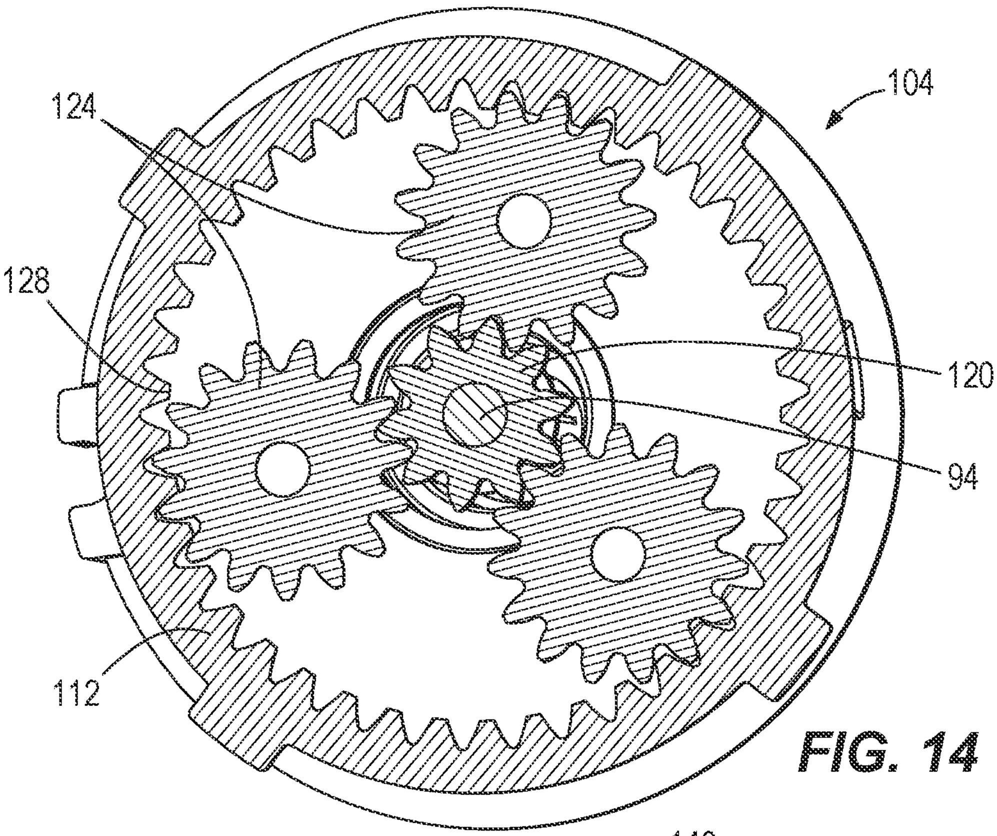
FIG. 14 is a cross-sectional view of the transmission of FIG. 11 taken along the line 14-14 of FIG. 11.

With continued references to FIG. 15, the one-way clutch mechanism 154 also includes a plurality of lugs 158 defined on an outer periphery of the carrier 116. In addition, the one-way clutch mechanism 154 includes a plurality of rolling elements 166 engageable with the respective lugs 158, and a ramp 170 adjacent each of the lugs 158 along which the rolling element 166 is moveable. The illustrated rolling elements 166 extend from a disc 174. Each of the ramps 170 is inclined in a manner to displace the rolling elements 166 farther from a rotational axis 178 of the carrier 116 (into the page as shown in FIG. 15) as the rolling elements 166 move further from the respective lugs 158. With reference to FIG. 14, the carrier 116 of the one-way clutch mechanism 154 is in the same planetary gear stage of the transmission 92 as the ring gear 112 (i.e., the first planetary gear stage 104). The rolling elements 166 are engageable with the second interior peripheral portion 140 of the ring gear 112 in response to an application of torque on the first output shaft 96 in the second rotational direction (i.e., as the rolling elements 166 move along the ramps 170 away from the respective lugs 158). A biasing mechanism (e.g., a spring 182) is positioned between each of the rolling elements 166 and the carrier 116. The springs 182 bias the rolling elements 166 toward the second interior peripheral portion 140 (and away from the lugs 158).

In operation of the one-way clutch mechanism 154, the rolling elements 166 are maintained in close proximity with the respective lugs 158 in the first rotational direction (i.e., counter-clockwise from the frame of reference of FIG. 3) of the first output shaft 96. However, when the piston 22/driver blade 26 has reached the ready position, the rolling elements 166 move away from the respective lugs 158 in response to an application of torque on the first output shaft 96 in an opposite, second rotational direction (i.e., clockwise from the frame of reference of FIG. 3). More specifically, when the first output shaft 96 rotates a small amount (e.g., 1 degree) in the second rotational direction, the rolling elements 166 roll away from the respective lugs 158 along the ramps 170 and engage the second interior peripheral portion 140 on the ring gear 112 to thereby prevent further rotation of the first output shaft 96 in the second rotational direction. Consequently, the one-way clutch mechanism 154 prevents the transmission 92 from applying torque to the motor 46, which might otherwise back-drive or cause the motor 46 to rotate in a reverse direction, in response to an application of torque on the first output shaft 96 in an opposite, second rotational direction (i.e., when the piston 22 and the driver blade 26 has reached the ready position).

Figure 16:
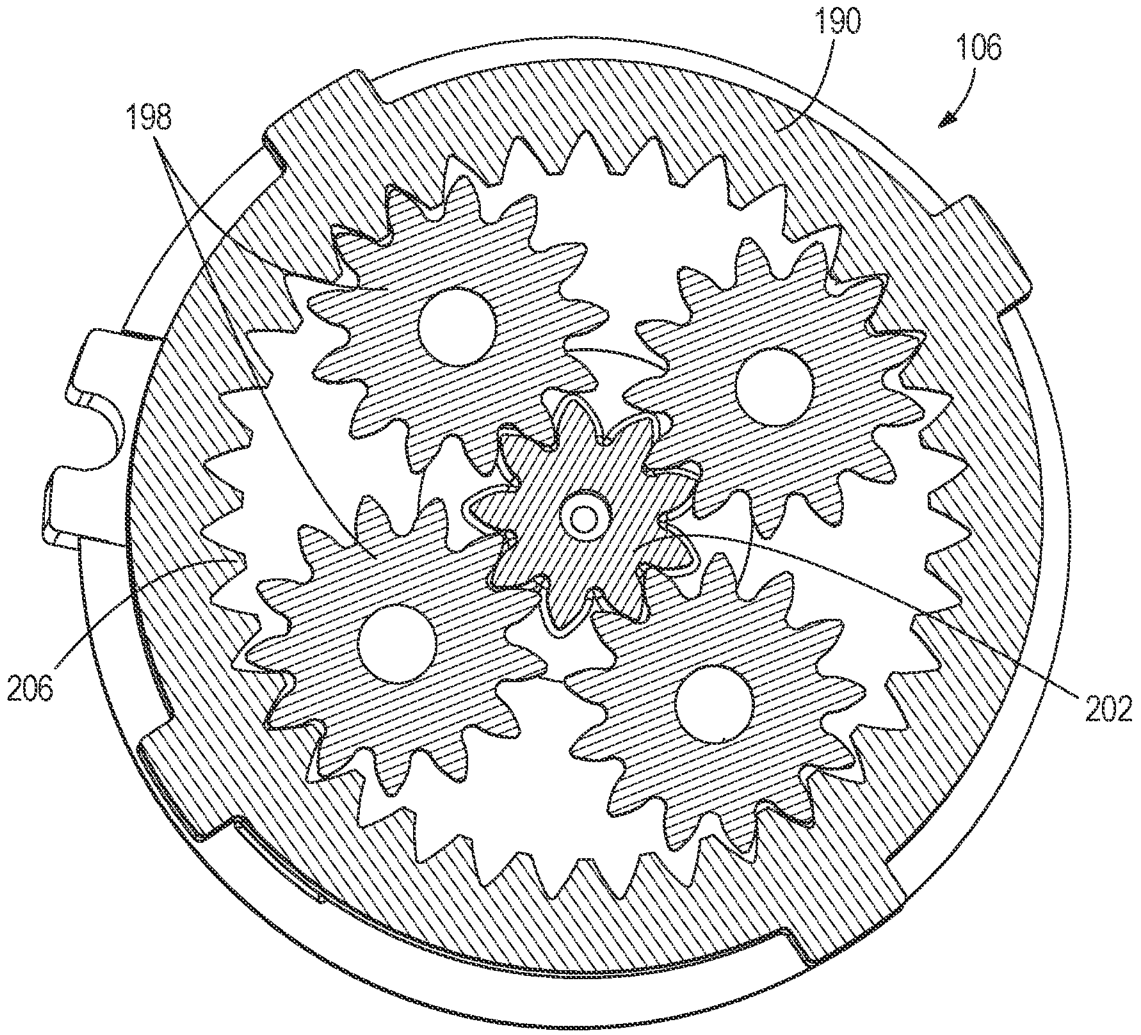
FIG. 16 is a cross-sectional view of the transmission of FIG. 11 taken along the line 16-16 of FIG. 11.

With reference to FIGS. 11 and 16, the second planetary gear stage 106 includes a ring gear 190, a carrier 194 (FIG. 11), and multiple planet gears 198 coupled to the carrier 194 for relative rotation therewith. The carrier 116 of the first planetary gear stage 104 further includes an output pinion 202 that is enmeshed with the planet gears 198 which, in turn, are rotatably supported upon the carrier 194 of the second planetary gear stage 106 and enmeshed with a toothed interior peripheral portion 206 of the ring gear 190. Like the ring gear 112, the ring gear 190 of the second planetary gear stage 106 is fixed relative to the transition housing 136. The carrier 194 is operably coupled to the first output shaft 96 for relative rotation therewith. Moreover, the carrier 194 is operably coupled to the first output shaft 96 to rotate the first output shaft 96, and therefore the drive gear 100*a* of the spur gear arrangement.

Although not shown, the driver 10 further includes a torque-limiting electronic-clutch mechanism, which limits an amount of torque transferred to the first output shaft 96 and the lifter 44.

Figure 12:
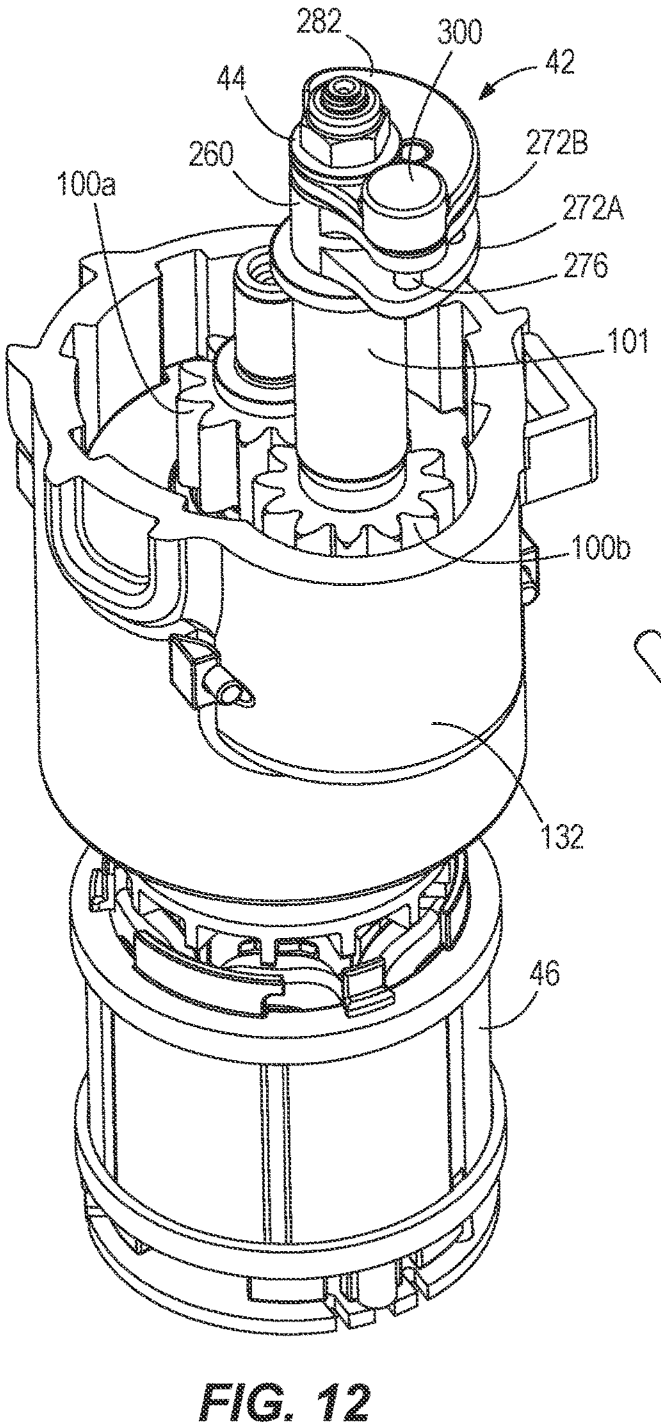
FIG. 12 is a perspective view of the transmission of FIG. 11 showing a transmission housing.
Figure 13:
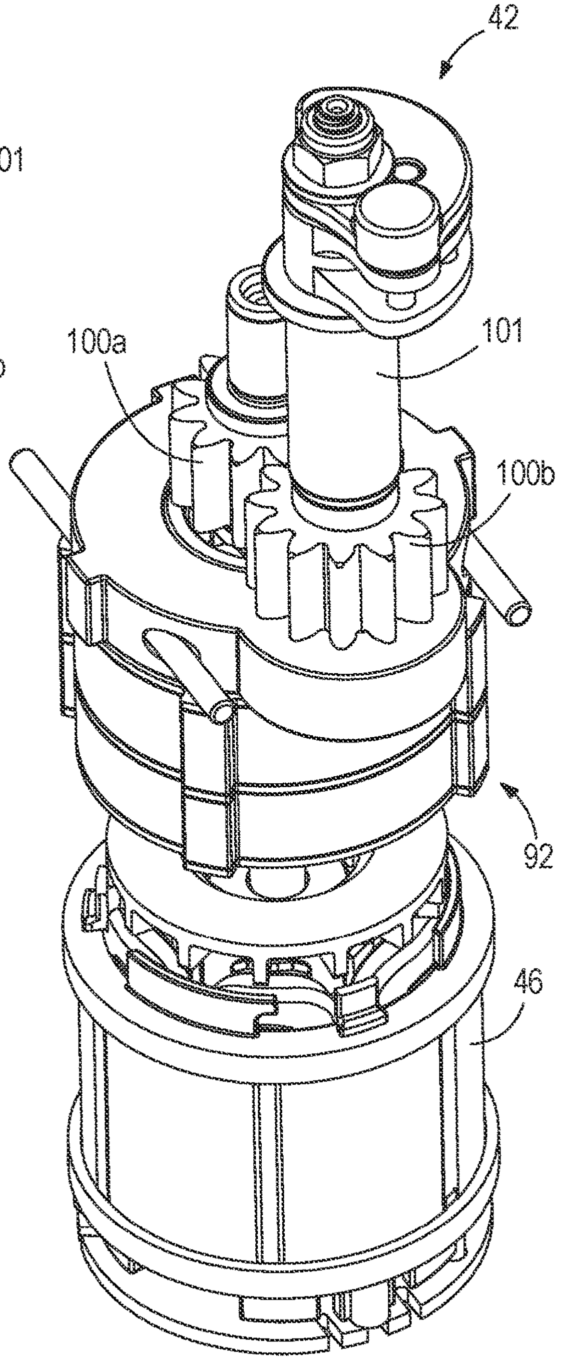
FIG. 13 is a perspective view of the transmission of FIG. 11 with the transmission housing of FIG. 12 removed.

With reference to FIGS. 4, 6, and 12, the lifter 44, which is a component of the lifting assembly 42, is coupled for co-rotation with the second output shaft 101 which, in turn, is driven by engagement of the driven gear 100*b* with drive gear 100*a*. The lifter 44 includes a hub 260 having an opening 264. An end of the second output shaft 101 extends through the opening 264 and is rotatably secured to the lifter 44. With continued reference to FIG. 12, the hub 260 is formed by two plates 272A, 272B and includes multiple drive pins 276 extending between the plates 272A, 272B. The illustrated lifter 44 includes four drive pins 276; however, in other embodiments, the lifter 44 may include three or more drive pins 276. The drive pins 276 are sequentially engageable with the driver blade 26 to raise the driver blade 26 from the driven position to the ready position.

The illustrated lifter 44 further includes a disk member 282 positioned adjacent the lower plate 272B (FIG. 12). The disk member 282 is coupled for co-rotation with the second output shaft 101 and the lifter 44. The disk member 282 supports a magnet 300. Specifically, the disk member 282 may be considered a retaining member for inhibiting axial movement of the drive pins 276 and the magnet 300 relative to the second output shaft axis 101'.

The driver 10 further includes a sensor (e.g., a Hall-effect sensor, not shown) positioned at a location proximate the lifter 44. As discussed above, the lifter 44 includes the magnet 300 supported by the disk member 282. The sensor and the magnet 300 are configured to indicate a position of the driver blade 26 (i.e., the ready position).

With reference to FIG. 4, and as noted above, the driver blade 26 includes lifting teeth 26*a* along the length thereof, and the respective drive pins 276 are engageable with the lifting teeth 26*a* when returning the driver blade 26 from the driven position to the ready position. The illustrated driver blade 26 includes eight lifting teeth 26*a* such that two revolutions of the lifter 44 moves the driver blade 26 from the driven position to the ready position.

As discussed above, the driver blade 26 further includes axially spaced latching teeth or projections 26*b* formed on an extending from the driver blade 26 opposite the lifting teeth 26*a*.

As stated above, the lifting assembly 42 moves the driver blade 26 from the driven position to the ready position. The sensor determines the position of the driver blade 26 in response to detecting the magnet 300, which is positioned on the disk member 282 and which co-rotates with the lifter 44. Specifically, the magnet 300 is aligned with the sensor when the driver blade 26 reaches the ready position, deactivating the motor 46 in response to an output signal from the sensor to stop the driver blade 26 at the ready position.

With reference to FIG. 6A, the driver 10 further includes a latch assembly 350 having a pawl or latch 354 for selectively holding the driver blade 26 in the ready position, and a solenoid (not shown) for releasing the latch 354 from the driver blade 26. In other words, the latch assembly 350 is moveable between a latched state in which the driver blade 26 is held in the ready position against a biasing force (i.e., the pressurized gas in the storage chamber cylinder 30), and a released state in which the driver blade 26 is permitted to be driven by the biasing force from the ready position to the driven position. The latch 354 is pivotably supported by a shaft 362 on the nosepiece guide 330 about a latch axis 366 (which is into the page as shown in FIG. 6A). The latch axis 366 is parallel to the second output shaft axis 101' of the second output shaft 101.

With reference to FIG. 6A, the latch assembly 350 is positioned proximate the side 322 of the driver blade 26. Furthermore, the latch 354 is configured to rotate, via actuation of the solenoid, about the shaft 362 relative to the latch axis 366 such that a tip 378 of the latch 354 is configured to engage a stop surface (not shown) of the nosepiece assembly 400 when the latch 354 is moved toward the driver blade 26.

The latch 354 is moveable between a latched position (coinciding with the latched state of the latch assembly 350) in which the latch 354 is engaged with one of the projections 318A on the driver blade 26 for holding the driver blade 26 in the ready position against the biasing force of the compressed gas, and a released position (coinciding with the released state of the latch assembly 350) in which the driver blade 26 is permitted to be driven by the biasing force of the compressed gas from the ready position to the driven position. Furthermore, the stop surface, against which the latch 354 is engageable when the solenoid is de-energized, limits the extent to which the latch 354 is rotatable in a counter-clockwise direction from the frame of reference of FIG. 6A about the latch axis 366 upon return to the latched state.

The operation of a firing cycle for the driver 10 is illustrated and detailed below. With reference to FIGS. 7B, prior to initiation a firing cycle, the driver blade 26 is held in the ready position with the piston 22 near top dead center within the cylinder 18. More specifically, the first drive pin 276' (FIG. 6A) on the lifter 44 is engaged with a lower-most tooth 26*a*' (FIG. 6A) of the axially spaced teeth lifting 26*a* on the driver blade 26, and the rotational position of the lifter 44 is maintained by the one-way clutch mechanism 154. In other words, as previously described, the one-way clutch mechanism 154 prevents the motor 46 from being back-driven by the transmission 92 when the lifter 44 is holding the driver blade 26 in the ready position. Also, in the ready position of the driver blade 26, the latch 354 is engageable with a lower-most tooth 26*b*' (FIG. 6A) on the driver blade 26, though not necessarily in contact with and functioning to maintain the driver blade 26 in the ready position. Rather, the latch 354 at this instant provides a safety function to prevent the driver blade 26 from inadvertently firing should the one-way clutch mechanism 154 fail.

Upon the trigger 48 being pulled to initiate a firing cycle, the solenoid is energized to pivot the latch 354 from the latched position to the release position, thereby repositioning the latch 354 so that it is no longer engageable with the latching teeth 26*b* (defining the released state of the latch assembly 350). At about the same time, the motor 46 is activated to rotate the first output shaft 96 and the lifter 44 in a counter-clockwise direction from the frame of reference of FIG. 6A, thereby displacing the driver blade 26 upward past the ready position a slight amount before the lower-most tooth 26*a*' on the driver blade 26 slips off the drive pin 276' (at the TDC position of the driver blade 26). Thereafter, the piston 22 and the driver blade 26 are thrust downward toward the driven position (FIG. 7A) by the expanding gas in the cylinder 18 and storage chamber cylinder 30. As the driver blade 26 is displaced toward the driven position, the motor 46 remains activated to continue counter-clockwise rotation of the lifter 44.

With reference to FIG. 6A, upon a fastener being driven into a workpiece, the piston 22 impacts the bumper 60 to quickly decelerate the piston 22 and the driver blade 26, eventually stopping the piston 22 in the driven or bottom dead center position.

Shortly after the driver blade 26 reaches the driven position, a first of the drive pins 276 on the lifter 44 engages one of the lifting teeth 26*a* on the driver blade 26 and continued counter-clockwise rotation of the lifter 44 raises the driver blade 26 and the piston 22 toward the ready position. Shortly thereafter and prior to the lifter 44 making one complete rotation, the solenoid is de-energized, permitting the latch 354 to re-engage the driver blade 26 and ratchet around the latching teeth 26*b* as upward displacement of the driver blade 26 continues (defining the latched state of the latch assembly 350).

After one complete rotation of the lifter 44 occurs, the latch 354 maintains the driver blade 26 in an intermediate position between the driven position and the ready position while the lifter 44 continues counter-clockwise rotation (from the frame of reference of FIG. 4) until the first drive pin 276' re-engages another of the lifting teeth 26*a* on the driver blade 26. Continued rotation of the lifter 44 raises the driver blade 26 to the ready position, which is detected by the sensor as described above.

With reference to FIGS. 2A-2C and 17-23B, the driver 10 further includes a nosepiece assembly 400 positioned at an end of the magazine 14.

The magazine 14 includes a magazine body 404 configured to receive the fasteners to be driven into the workpiece by the powered fastener driver. The magazine body 404 (FIG. 1) has a first end 408 and a second end 412 opposite the first end 408. The magazine body 404 further includes a first side 416 and a second side 420 (FIGS. 17-18) opposite the first side 416, and a bottom side 424 and a top side 428 extending between the first and second sides 416, 420, respectively.

Figure 2A:
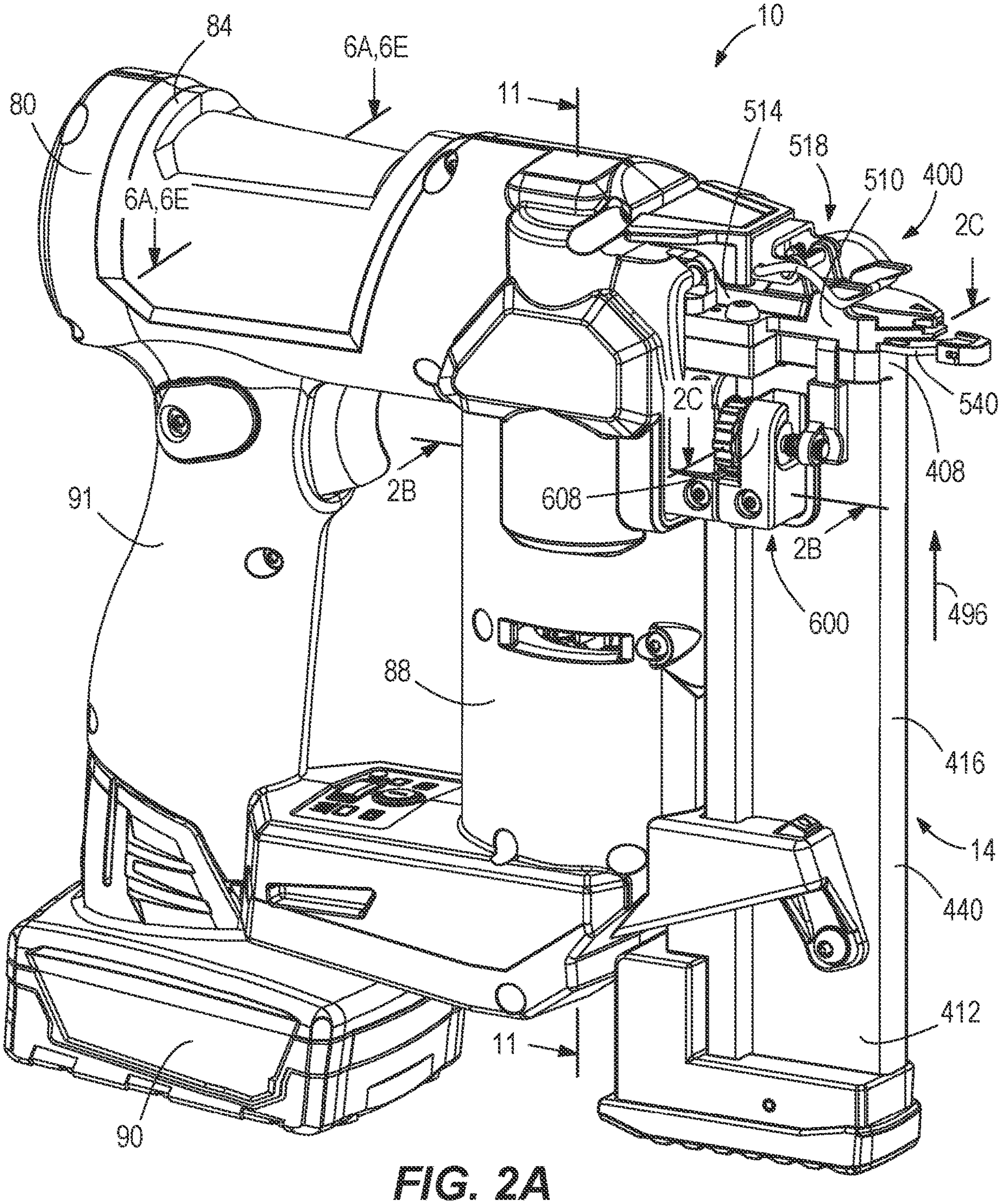
FIG. 2A is another perspective view of the gas spring-powered fastener driver of FIG. 1.
Figure 2C:
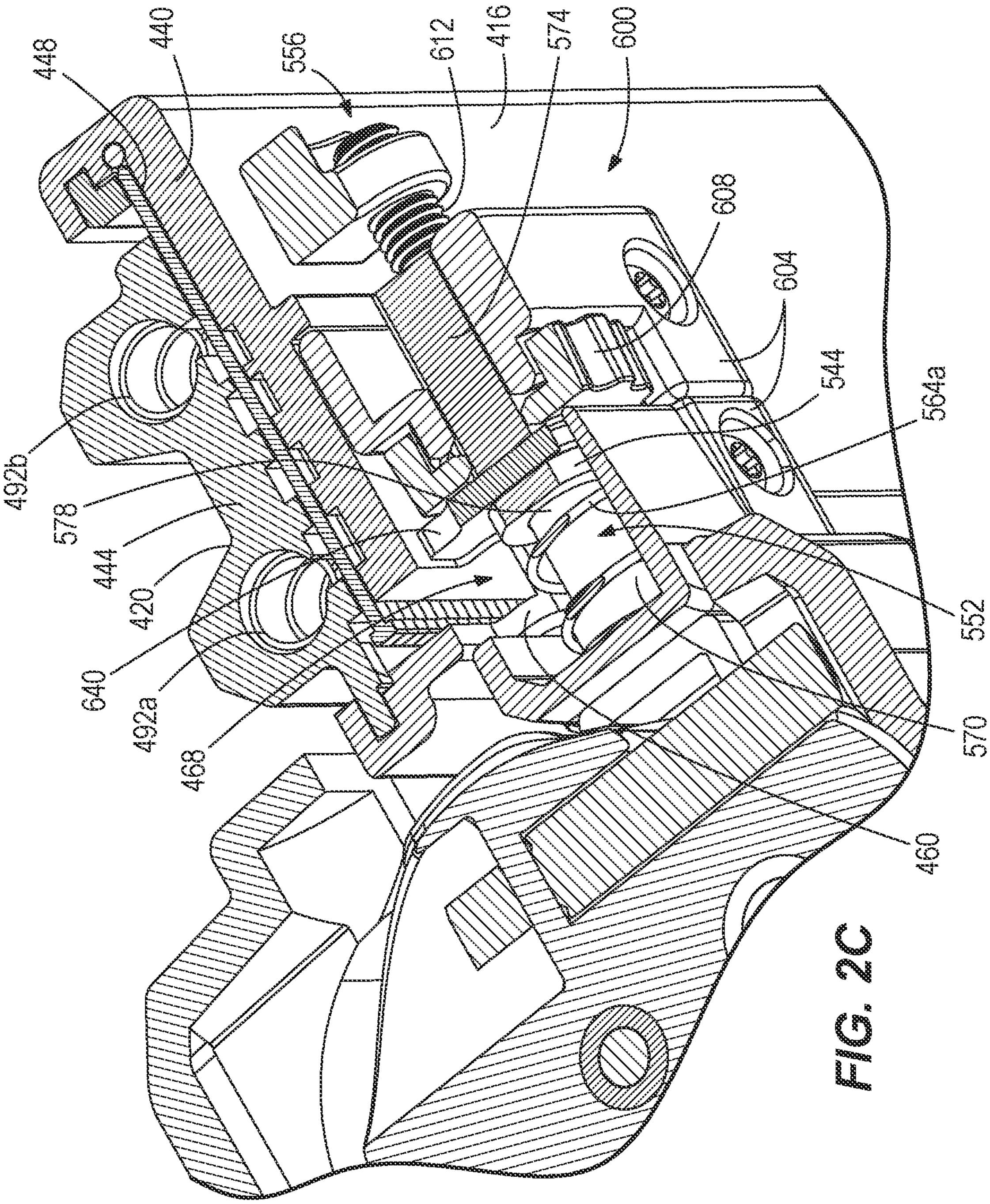
FIG. 2C is a cross-sectional view of the gas spring-powered fastener driver of FIG. 1 along line 2C-2C of FIG. 2A.
Figure 3:
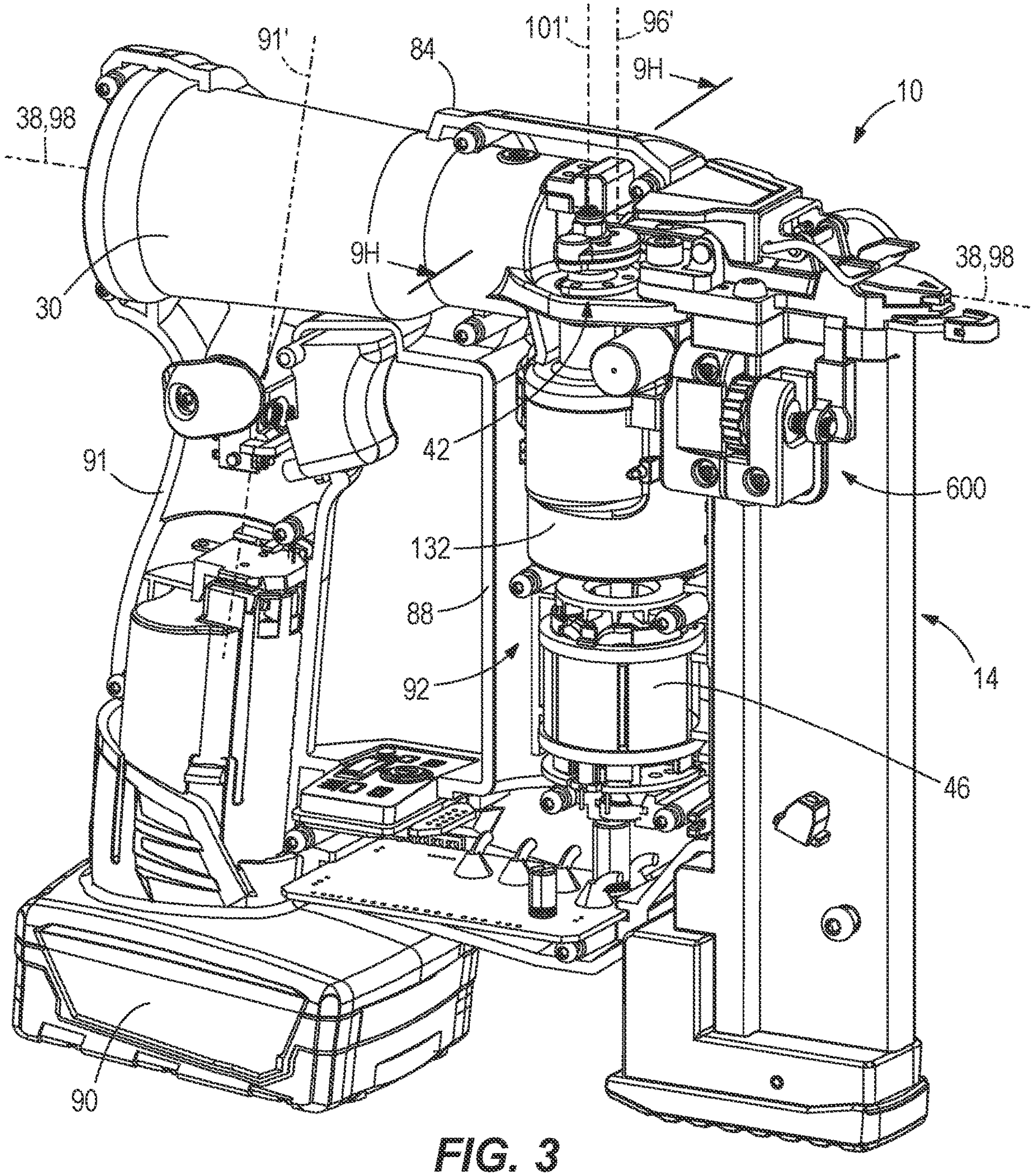
FIG. 3 is a partial cut-away view of the gas spring-powered fastener driver of FIG. 1, with portions removed for clarity.
Figure 17:
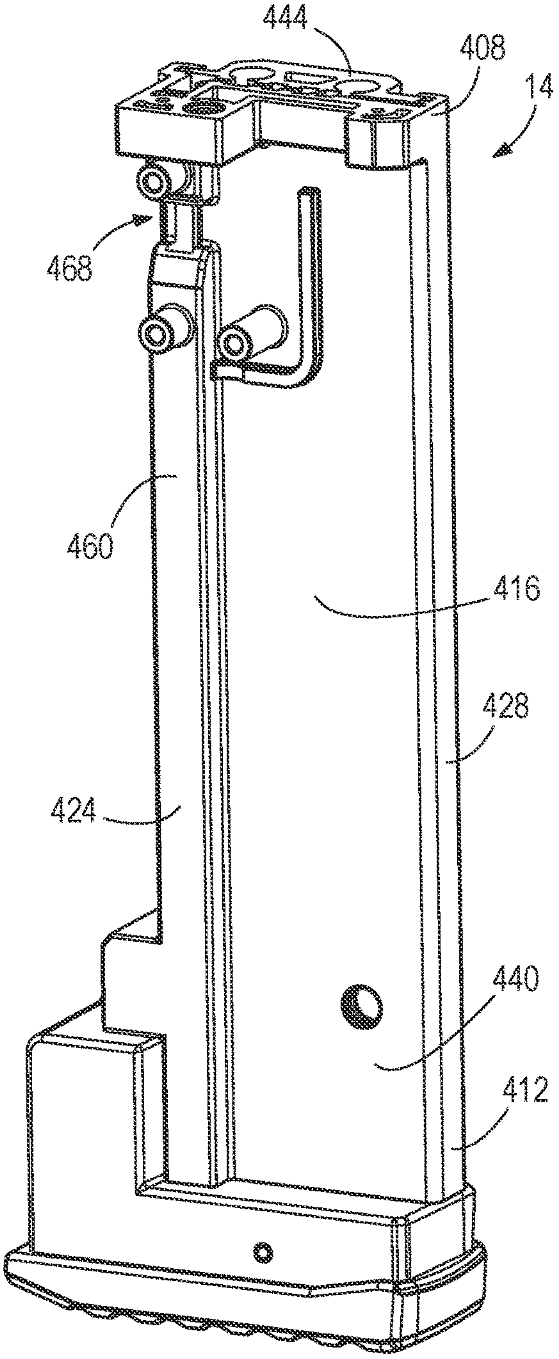
FIG. 17 is a perspective view of the magazine of FIG. 1.
Figure 18:
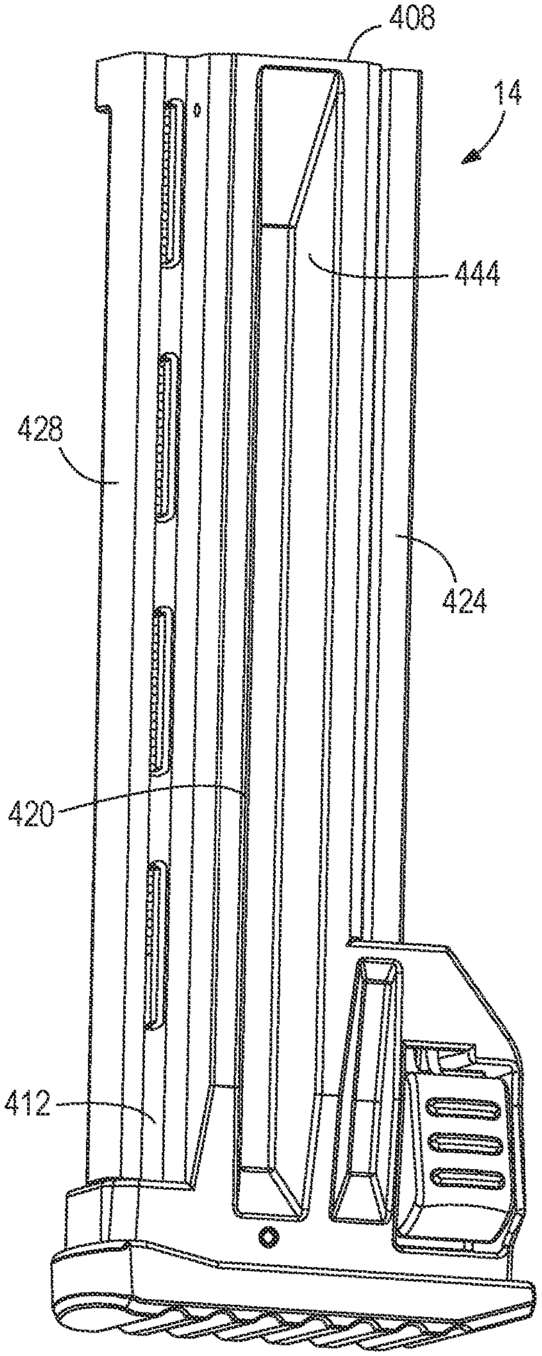
FIG. 18 is another perspective view of the magazine of FIG. 1.

As shown in FIGS. 2C, 17, 18, the illustrated magazine body 404 is formed by a base portion 440 and a cover portion 444. In particular, the cover portion 444 is slidably coupled to the base portion 440. Additionally, the base portion 440 and the cover portion 444 cooperatively define a fastener channel 448 (FIG. 2C) extending from the first end 408 to proximate the second end 412 of the magazine body 404. The fastener channel 448 is configured to receive the fasteners.

Figure 19:
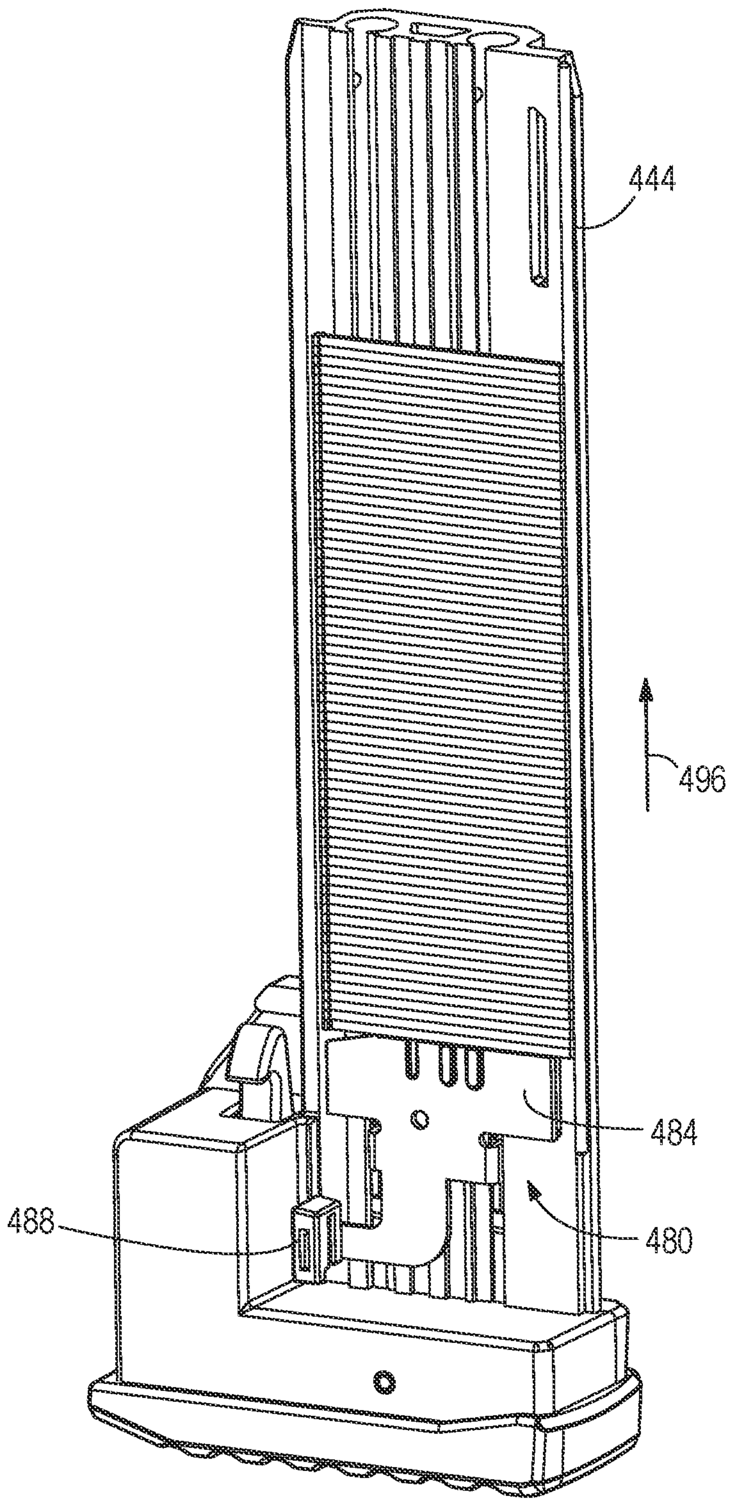
FIG. 19 is a perspective view of the magazine of FIG. 1 with a portion removed, illustrating a pusher assembly.
Figure 20A:
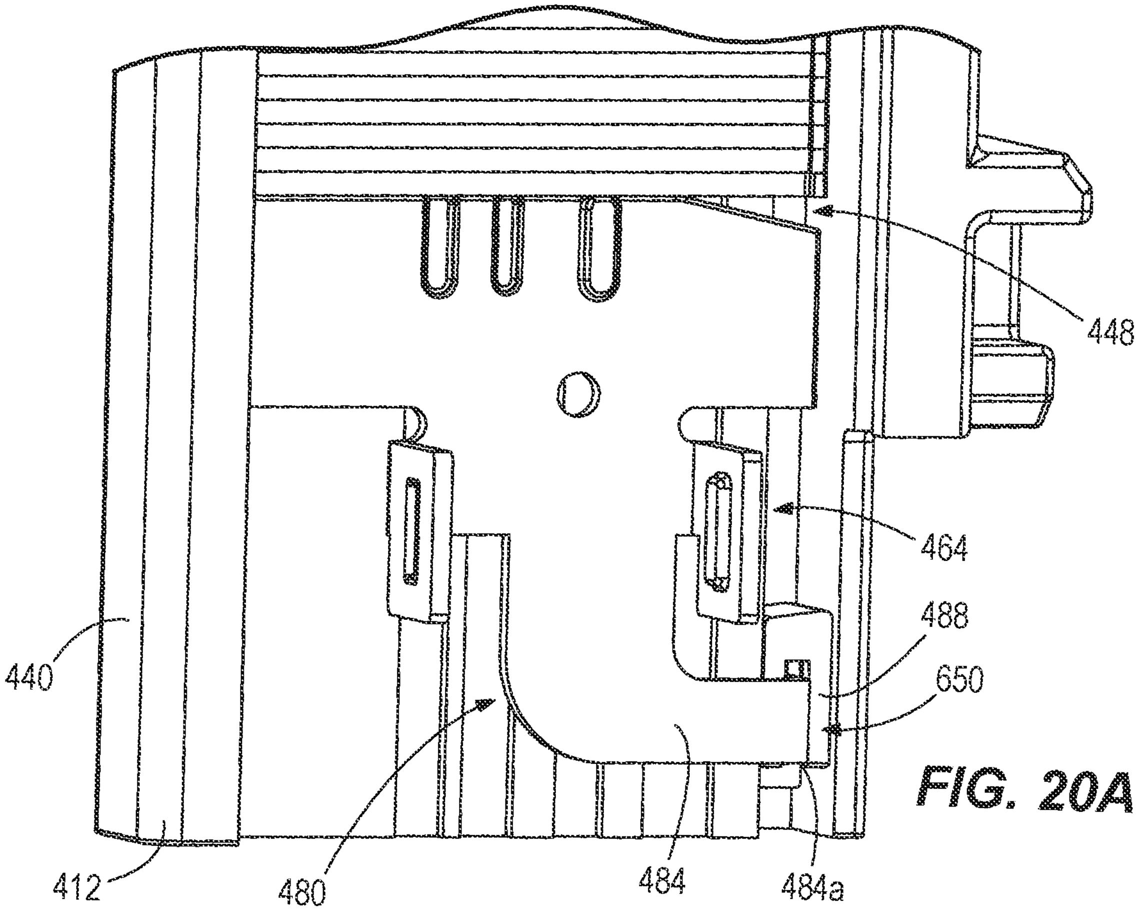
FIG. 20A is a detailed perspective view of the pusher assembly of FIG. 19.

With particular reference to FIGS. 2C and 17-20, the first side 416 of the magazine body 404 includes a projection 460 (FIG. 17) defining a recess 464 (FIG. 20). The recess 464 extends along the first side 416 from proximate the second end 412 toward the first end 408. More specifically, the recess 464 extends parallel to and in connection with the fastener channel 448. The first side 416 further defines an opening or window 468 (FIGS. 2C and 17) in connection with the recess 464 proximate the first end 408 of the magazine body 404.

Figure 20B:
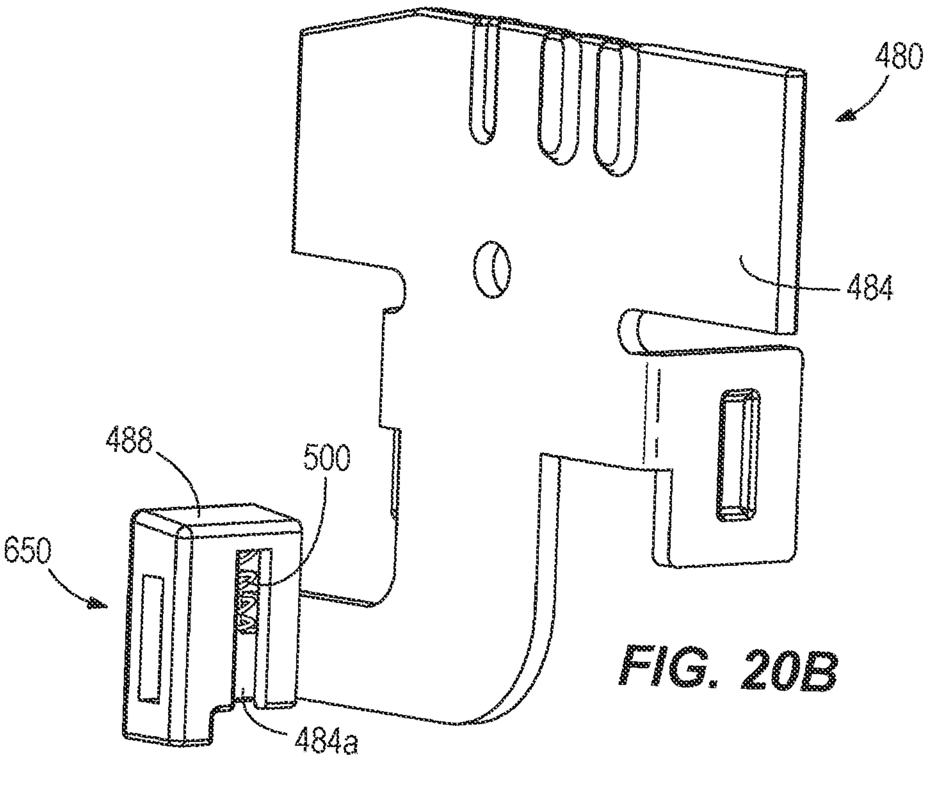
FIG. 20B is another detailed perspective view of the pusher assembly of FIG. 19.
Figure 21E:
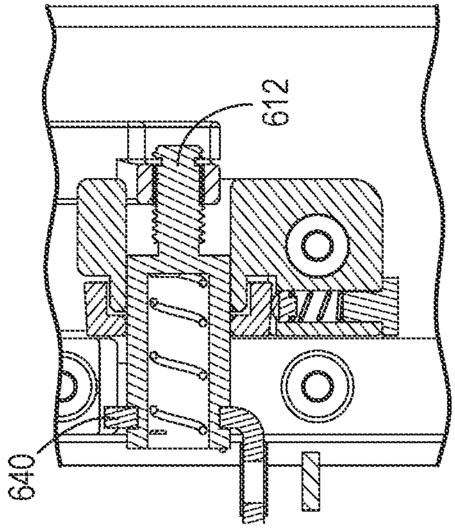
FIG. 21E illustrates the dry-fire lockout link coupled to the workpiece contact assembly of FIG. 1 in a third position when there is greater than a predetermined number of fasteners within the magazine.
Figure 21F:
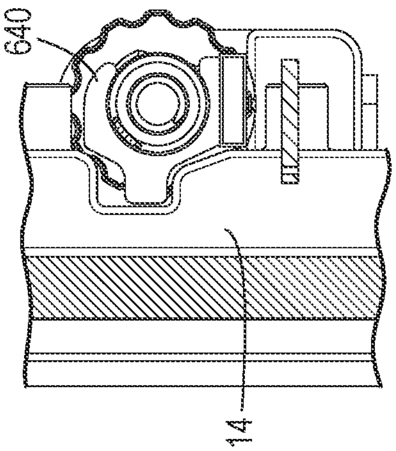
FIG. 21F illustrates the dry-fire lockout link coupled to the workpiece contact assembly of FIG. 1 in the third position when there is greater than a predetermined number of fasteners within the magazine.
Figure 21C:
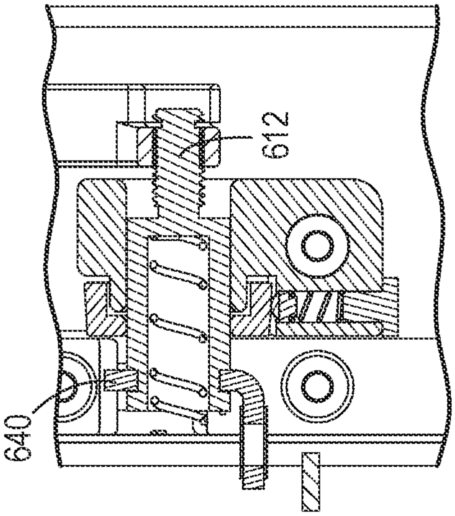
FIG. 21C illustrates the dry-fire lockout link coupled to the workpiece contact assembly of FIG. 1 in a second position when there is greater than a predetermined number of fasteners within the magazine.
Figure 21D:
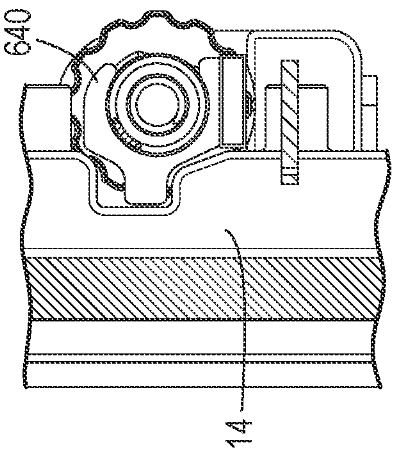
FIG. 21D illustrates the dry-fire lockout link coupled to the workpiece contact assembly of FIG. 1 in the second position when there is greater than a predetermined number of fasteners within the magazine.
Figure 21A:
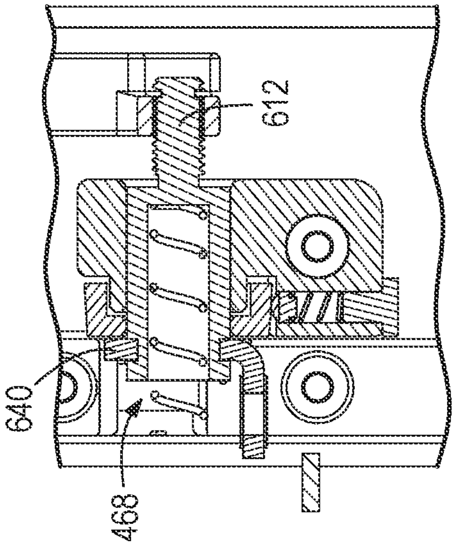
FIG. 21A illustrates a dry-fire lockout link coupled to the workpiece contact assembly of FIG. 1 in a first position when there is greater than a predetermined number of fasteners within the magazine.
Figure 21B:
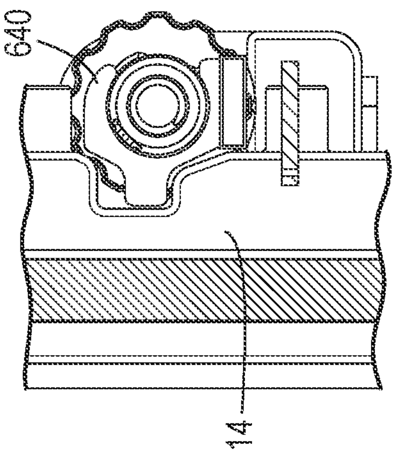
FIG. 21B illustrates the dry-fire lockout link coupled to the workpiece contact assembly of FIG. 1 in the first position when there is greater than a predetermined number of fasteners within the magazine.
Figure 22A:
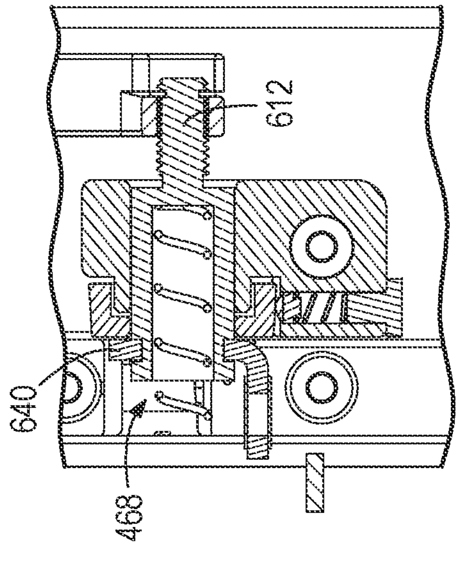
FIG. 22A illustrates a dry-fire lockout link coupled to the workpiece contact assembly of FIG. 1 in a first position when there is one more than the predetermined number of fasteners within the magazine.
Figure 22B:
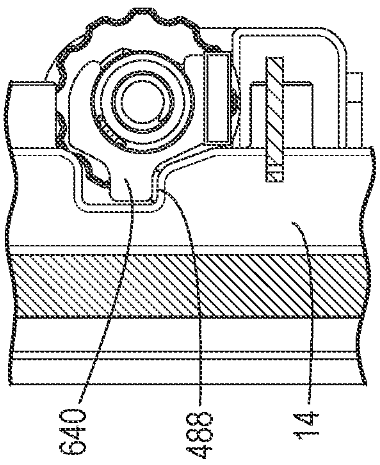
FIG. 22B illustrates the dry-fire lockout link coupled to the workpiece contact assembly of FIG. 1 in the first position when there is one more than the predetermined number of fasteners within the magazine.
Figure 22C:
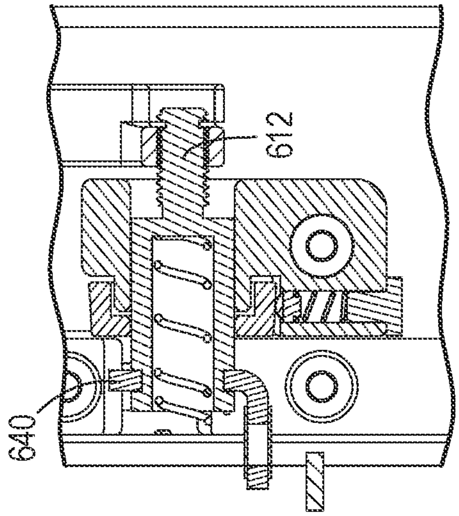
FIG. 22C illustrates the dry-fire lockout link coupled to the workpiece contact assembly of FIG. 1 in a second position when there is one more than the predetermined number of fasteners within the magazine.
Figure 22D:
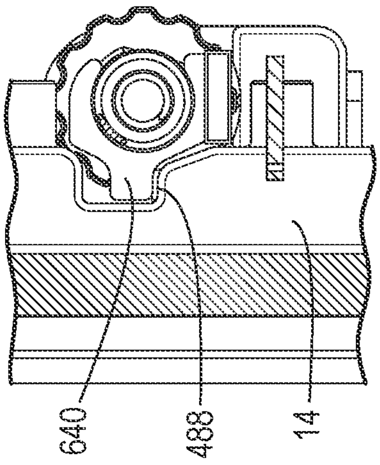
FIG. 22D illustrates the dry-fire lockout link coupled to the workpiece contact assembly of FIG. 1 in the second position when there is one more than the predetermined number of fasteners within the magazine.
Figure 22E:
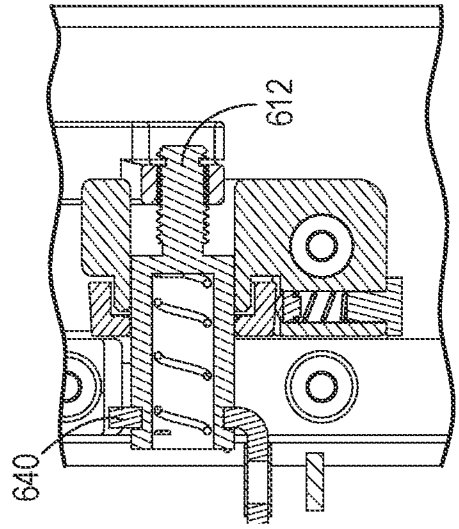
FIG. 22E illustrates the dry-fire lockout link coupled to the workpiece contact assembly of FIG. 1 in a third position when there is one more than the predetermined number of fasteners within the magazine.
Figure 22F:
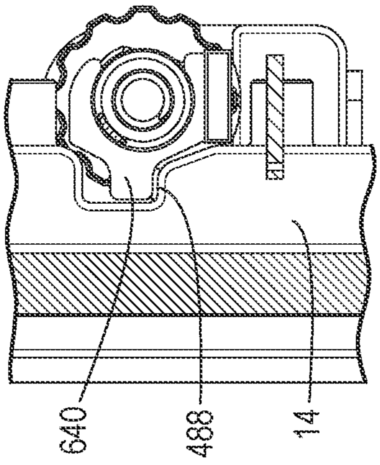
FIG. 22F illustrates the dry-fire lockout link coupled to the workpiece contact assembly of FIG. 1 in the third position when there is one more than the predetermined number of fasteners within the magazine.

With reference to FIGS. 19-23B, the magazine 14 further includes a pusher assembly 480 positioned within the fastener channel 448 of the magazine body 404. The pusher assembly 480 is slidably coupled to the magazine 14 and configured to bias the fasteners in the magazine 14 toward the nosepiece assembly 400. As shown in FIGS. 19-20B, the illustrated pusher assembly 480 includes a first portion or pusher body 484 and a second portion or dry-fire lockout member 488 movably coupled to the pusher body 484. The magazine 14 includes first springs 492*a*, 492*b* (FIG. 2C) configured to exert a biasing force on the pusher assembly 480 for moving the pusher assembly 480 in the direction of arrow 496 (FIG. 2A and FIG. 18). Furthermore, the dry-fire lockout member 488 is movably coupled to the pusher body 484 (e.g., an extension 484*a* of the pusher body 484) by a second spring 500 (FIG. 20B). As such, the pusher body 484 of the pusher assembly 480 may selectively move relative to the dry-fire lockout member 488. The biasing force of the second spring 500 is independent of the biasing force of the first springs 492*a*, 492*b*. The pusher assembly 480 is movable in a first state, in which the pusher body 484 and the dry-fire lockout member 488 move together in unison in the direction of arrow 496 and a second state in which relative movement between the pusher body 484 and the dry-fire lockout member 488 has occurred, as further discussed below.

With reference to FIGS. 2A-2B2, the nosepiece assembly 400 is positioned at the first end 408 of the magazine body 404. The nosepiece assembly 400 generally includes a first, base portion 510 coupled to the first end 408 of the magazine body 404 and a second, cover portion 514 coupled to the base portion 510. The base portion 510 of the nosepiece assembly 400 is fixed to the magazine body 404. The cover portion 514 of the nosepiece assembly 400 substantially covers the base portion 510. In the illustrated embodiment, the cover portion 514 is pivotally coupled to the base portion 510 by a latch mechanism 518. The nosepiece assembly 400 cooperatively defines a firing channel 522 (only a portion of which is shown in FIG. 6A) extending along the driving axis 38. The firing channel 522 is in communication with the fastener channel 448 of the magazine body 404 (e.g., by an opening 526 in the base portion 510) for receiving a fastener from the magazine body 404. The nosepiece assembly 400 further has a distal end 530 at one end of the firing channel 522 (FIG. 6A). The driver blade 26 is received in the firing channel 522 for driving the fastener from the firing channel 522, out the distal end 530 of the nosepiece assembly 400, and into a workpiece, as discussed above.

With reference to FIGS. 2A, 2B1, and 2B2, the driver 10 includes a workpiece contact assembly 540 extending along one side of the nosepiece assembly 400. The workpiece contact assembly 540 includes a first end 544 (FIGS. 2B1, 2B2, and 2C) and a second, opposite end 548 that is engageable with a workpiece during a firing operation. The workpiece contact assembly 540 includes a plurality of sections 552, 556 in which each section 552, 556 is formed by a plurality of interconnected segments. A pair of springs 564*a*, 564*b* (FIGS. 2B1, 2B2, and 2C) are configured to bias the workpiece contact assembly 540 toward an extended position. The workpiece contact assembly 540 is configured to be moved from the extended position toward a retracted position when the workpiece contact assembly 540 is pressed against a workpiece.

A first section 552 of the workpiece contact assembly 540 is positioned closer to the top side 428 of the magazine body 404 rather than the bottom side 424. The first section 552 includes the first end 544 of the workpiece contact assembly 540. The first section 552 further includes an arm 574 including a bore 578. The arm 574 is movable relative to the housing 80. Specifically, a stationary post 570 is coupled to the housing 80 and is movably received in the bore 578 of the arm 574. The first spring 564*a* surrounds the post 570 and is seated between the housing 80 and a first end of the arm 574. The second spring 564*b* is positioned within the bore 578 and is seated between a distal end of the post 570 and a bottom surface of the bore 578. The arm 574 includes a screw portion 612. The second section 556 includes the second end 548 that is configured to engage a workpiece. The first and second sections 552, 556 are coupled together by a depth of drive adjustment mechanism 600, which adjusts the effective length of the workpiece contact assembly 540. In particular, the screw portion 612 couples the first section 552 to the second section 556.

With reference to FIGS. 2B and 2C, the depth of drive adjustment mechanism 600 includes a support member 604, an adjustment knob 608, and the screw portion 612. In the illustrated embodiment, the pair of springs 564*a*, 564*b* are supported, at least in part, by the depth of drive adjustment mechanism 600. The springs 564*a*, 564*b* achieve the same spring force on the workpiece contact assembly 540 with a reduced throw (distance between extended and retracted positions), compared to a single spring. In the illustrated embodiment, the springs 564*a*, 564*b* have different stiffnesses, but in other embodiments the stiffnesses may be the same. In the illustrated embodiment, there are two springs 564*a*, 564*b*, but in other embodiments, there may be more than two springs having the same or different stiffnesses. The support member 604 at least partially supports the arm 570. The adjustment knob 608 is rotatably supported upon the arm 570. As noted above, the screw portion 612 extends between the first section 552 and the second section 556 of the workpiece contact assembly 540. One end of the second section 556 is threadably coupled to the screw portion 612. Furthermore, the arm 574, and therefore the screw portion 612, are coupled for co-rotation with the adjustment knob 608. Accordingly, the screw portion 612 and the adjustment knob 608 are rotatably supported by the arm 570. Rotation of the adjustment knob 608 axially threads the second section 556 along the screw portion 612 for adjusting a protruding length of the workpiece contact assembly 540 relative to the distal end 530 of the nosepiece assembly 400. More specifically, rotation of the adjustment knob 608 moves the second section 556 relative to the first section 552 for adjusting an effective length of the workpiece contact assembly 540. As such, the adjustment knob 608 may be termed as an actuator. As shown in FIGS. 2B1 and 2B2, a detent mechanism 610 is engageable with the adjustment knob 608 to prevent the adjustment knob 608 from freely rotating. As shown, the adjustment knob 608 includes a plurality of grooves or recesses 608*a* in an outer surface thereof. The detent mechanism 608 includes a ball 610*a* (e.g., detent) and a spring 610*b* (e.g., biasing mechanism) that biases the ball 610*a* into one of the grooves 608*a* of the adjustment knob 608.

The depth of drive adjustment mechanism 600 adjusts the depth to which a fastener is driven into the workpiece. In particular, the depth of drive adjustment mechanism 600 adjusts the length that the workpiece contact assembly 540 protrudes relative to the distal end 530 of the nosepiece assembly 400, thereby changing the distance between the distal end 530 of the nosepiece assembly 400 and the workpiece contact assembly 540 in the extended position. In other words, the depth of drive adjustment mechanism 600 adjusts how far the workpiece contact assembly 540 extends past the nosepiece assembly 400 for abutting with a workpiece. The larger the gap between the distal end 530 of the nosepiece assembly 400 and the workpiece, the shallower the depth a fastener will be driven into the workpiece. As such, the position of the workpiece contact assembly 540 with respect to the nosepiece assembly 400 is adjustable to adjust the depth to which a fastener is driven. In the illustrated embodiment, the spring 610*b* biases the ball 610*a* into the one of the grooves 608*a* of the adjustment knob 608 to retain the adjustment knob 608, and therefore the workpiece contact assembly 400 at the selected depth. When the user wants to adjust the depth, the user rotates the adjustment knob 608 against the bias of the spring 610*a* to selectively rotate the adjustment knob 608.

As shown in FIGS. 2B-2C and FIGS. 21A-23B, the workpiece contact assembly 540 further includes an engagement portion 640 (e.g., a dry-fire lockout link). In the illustrated embodiment, the first section 552 includes the dry-fire lockout link 640. The dry-fire lockout link 640 is positioned at the substantially the first end 544 of the workpiece contact assembly 540 and specifically is coupled to the arm 570.

Figure 23B:
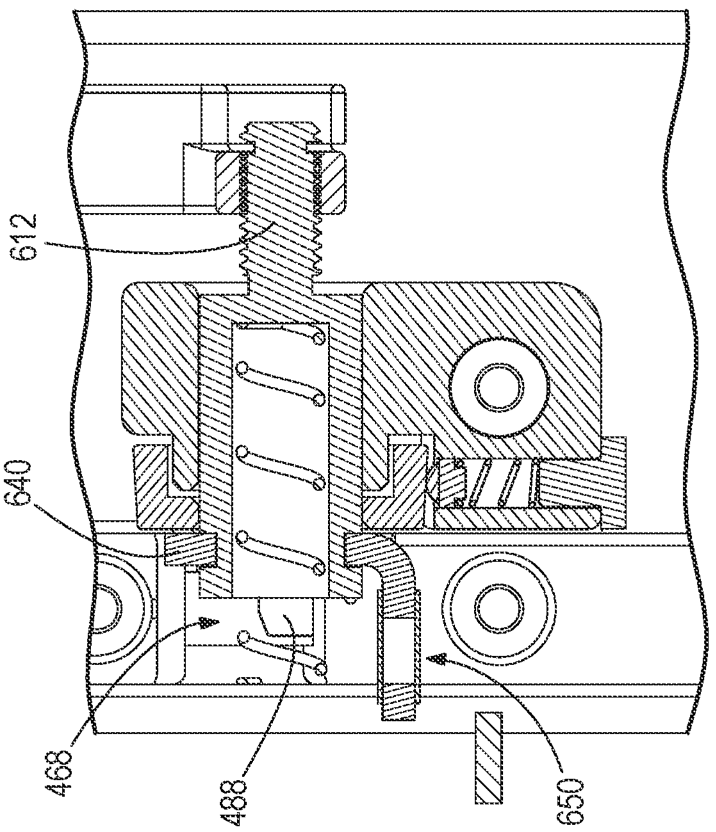
FIG. 23B illustrates the dry-fire lockout link coupled to the workpiece contact assembly of FIG. 1 in a second position when there are the predetermined number of fasteners within the magazine.
Figure 23A:
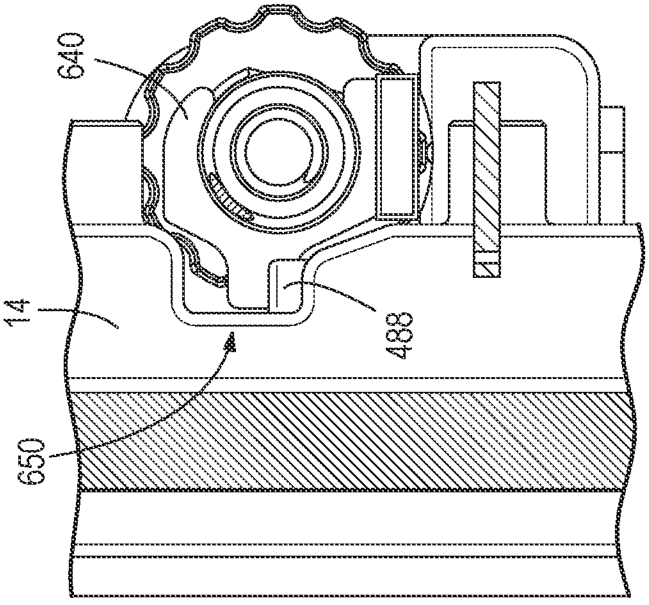
FIG. 23A illustrates a dry-fire lockout link coupled to the workpiece contact assembly of FIG. 1 in a first position when there are the predetermined number of fasteners within the magazine.
Figure 24:
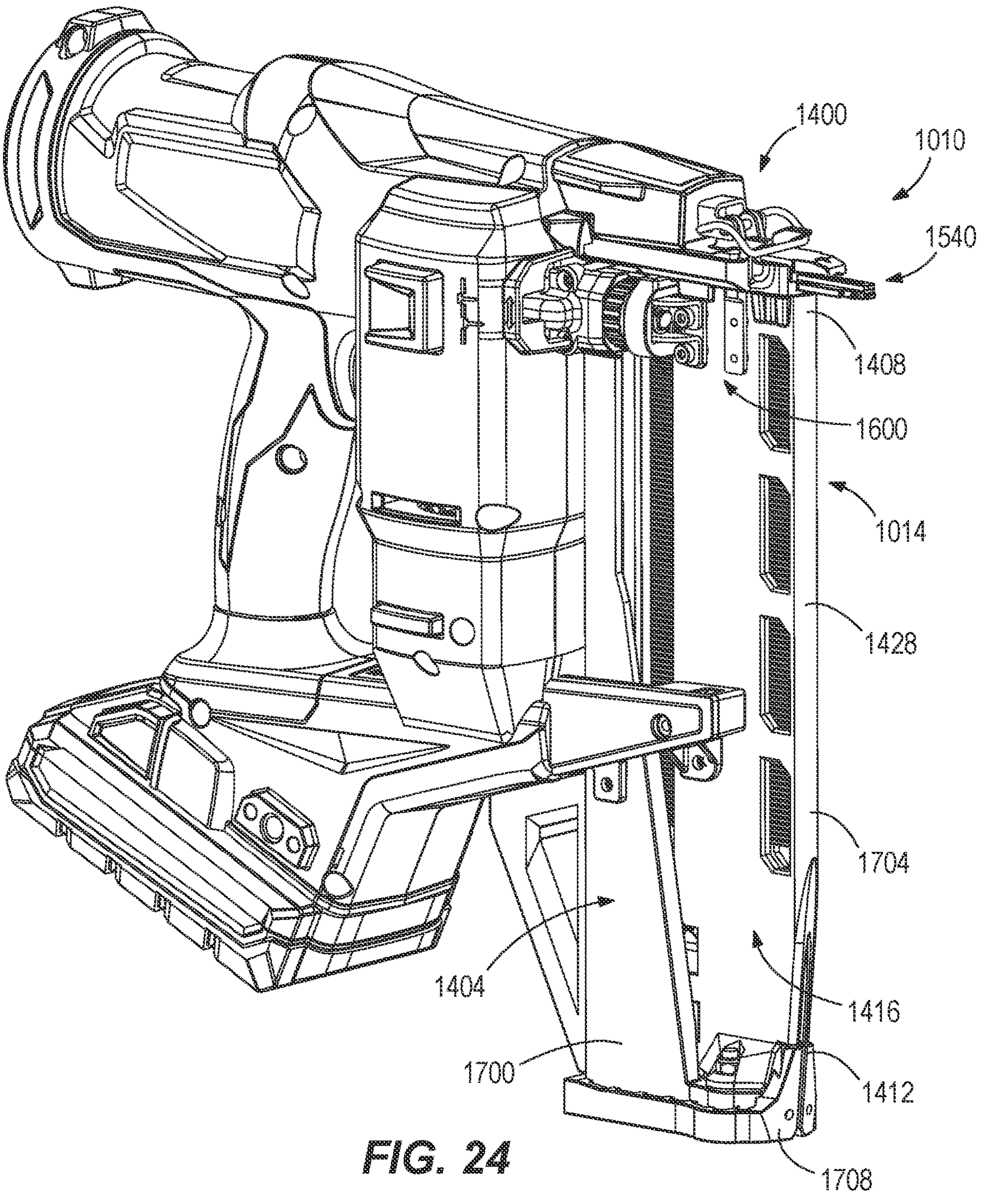
FIG. 24 is a perspective view of a gas spring-powered fastener driver including a magazine and a workpiece contact assembly in accordance with another embodiment of the invention.

With reference to FIGS. 19-23B, the powered fastener driver 10 further includes a dry-fire lockout assembly 650 (FIGS. 23A and 23B). The dry-fire lockout assembly 650 prevents the powered fastener driver 10 from operating when the number of fasteners remaining in the magazine 14 drops below a predetermined value. The dry-fire lockout assembly 650 includes the dry-fire lockout member 488 of the pusher assembly 480, and the dry-fire lockout link 640. The extension 484*a* of the pusher body 484 and the dry-fire lockout member 488 are positioned within and movable (e.g., slideable) within the fastener channel 448 of the magazine 14. The dry-fire lockout member 488 is selectively received in the opening 468 of the magazine 14. The dry-fire lockout member 488 is configured to prevent movement of the workpiece contact assembly 540 when a predetermined number of fasteners (e.g., 0, 1, 2, 4 etc.) remain in the magazine 14.

The dry-fire lockout member 488 is movable between a first, non-blocking or bypass position (e.g., FIGS. 21A-22E), and a second, blocking position (FIGS. 23A-23B). When the dry-fire lockout member 488 does not extend through the opening 468 of the magazine 14, the dry-fire lockout member 488 is in the bypass position such that the dry-fire lockout link 640 and the workpiece contact assembly 540 can move from the extended position toward the retracted position (FIGS. 21A-22E). That is, in the bypass position, the dry-fire lockout link 640 is configured to slide past the opening 468 (and depending on the number of fasteners remining, the dry-fire lockout member 488) in response to movement toward the retracted position. Also, when the dry-fire lockout member 488 is in the bypass position, the pusher assembly 480 is in the first state such that the pusher body 484 and the dry-fire lockout member 488 move together in unison. When the dry-fire lockout member 488 is in the blocking position, at least a portion of the dry-fire lockout member 488 (FIG. 23A-23B) protrudes through the opening 468 of the magazine 14 where it interferes with retraction of dry-fire lockout link 640 and therefore inhibits movement of the workpiece contact assembly 540 from the extended position toward the retracted position.

In operation, as shown in FIGS. 21A-21E, with more than the predetermined number of fasteners in the magazine 14, the first and second portions 484, 488 of the pusher assembly 480 move in unison, biased by the first springs 492*a*, 492*b*, in the direction of arrow 496 the magazine 14 in an incremental manner as consecutive fasteners from the collated fastener strip are discharged from the nosepiece assembly 400. At this time, the opening 468 remains open and the dry-fire lockout member 488 remains in the bypass position.

In a scenario when the predetermined number of fasteners remaining in the magazine 14 is reached, the dry-fire lockout member 488 is in the blocking position and therefore engages the dry-fire lockout link 640, as shown in FIGS. 23A-23B. Upon reaching the blocking position, the dry-fire lockout member 488 blocks the dry-fire lockout link 640 of the workpiece contact assembly 540, and retraction of the workpiece contact assembly 540 is inhibited to prevent further activation of the powered fastener driver 10. In this scenario, movement of the pusher assembly 480 may remain in the first state (i.e., with the first and second portions 484, 488 moving together in unison) up until the dry-fire lockout member 488 is moved to the blocking position.

However, in a scenario in which fasteners of specific sizes (e.g., fasteners having a specific shank length or diameter) are placed in the magazine 14, when the predetermined number of fasteners remaining in the magazine 14 is reached, the skewed collated fastener strip within the fastener channel may only permit the dry-fire lockout member 488 to partially move toward the blocking position. That is, as shown in FIGS. 22A-22E, the dry-fire lockout member 488 may be in an intermediate position between the bypass position and the blocking position, in which the dry-fire lockout member 488 only slightly blocks the dry-fire lockout link 640 and the workpiece contact assembly 540. In addition, other tolerances associated with the specific sized fasteners used, and/or associated with the driver 10 as a whole, may cause the dry-fire lockout member 488 to move to the intermediate position. In this case, for example, when the number of fasteners remaining is one greater than the predetermined number of fasteners, the dry-fire lockout member 488 is in the intermediate position. With the dry-fire lockout member 488 in the intermediate position, it is possible for the workpiece contact assembly 540 (and specifically, the dry-fire lockout link 640) to nominally engage the dry-fire lockout member 488 during retraction and move the dry-fire lockout member 488 toward the bypass position, permitting continued retraction of the workpiece contact assembly 540 to enable a final fastener firing cycle. When the dry-fire lockout member 488 is moved from the intermediate position to the bypass position, the pusher assembly 480 transitions from the first state to the second state, in which relative movement between the pusher body 484 and the dry-fire lockout member 488 has occurred.

That is, the dry-fire lockout link 640 can nominally engage the dry-fire lockout member 488 during retraction to move the dry-fire lockout member 488 toward the bypass position against the bias of the spring second spring 500 and therefore slide past the dry-fire lockout member 488 to the retracted position to enable the final firing cycle. In this scenario, movement of the pusher assembly 480 transitions from the first state to the second state (i.e., the dry-fire lockout member 488 having moved relative to the pusher body 484 against the bias of the second spring 500) after the final fastener firing cycle. Once the final fastener firing cycle is complete and the number of predetermined fasteners remain, the dry-fire lockout member 488 protrudes through the opening 468 and blocks the dry-fire lockout link 640, and therefore the workpiece contact assembly 540, from moving into the retracted position to prevent a "dry-fire" cycle in which a driver blade 26 is driven from the TDC position to the BDC position without a fastener in the firing channel 522.

When the predetermined number of fasteners remain and the dry-fire lockout member 488 is located in the blocking position, the dry-fire lockout member 488 cannot transition from the first state to the second state. Accordingly, when the predetermined number of nails remain, the dry-fire lockout member 488 is positioned so that there is sufficient engagement between the dry-fire lockout member 488 and the dry-fire lockout link 640, and therefore the workpiece contact assembly 540 to prevent a "dry-fire" cycle.

Another configuration for the magazine is shown 1014 in FIGS. 24-34. The magazine 1404 is similar to the magazine 14 discussed above. Therefore like structure will be designated with like reference numeral plus "1000" and only the differences will be described herein.

The magazine 1014 includes a magazine body 1404 configured to receive the fasteners to be driven into the workpiece by the powered fastener driver 1010. The magazine body 1404 (FIGS. 24, 30) has a first end 1408 and a second end 1412 opposite the first end 1408. The magazine body 1404 further includes a first portion 1700 and a second portion 1704 coupled to one another by a cover 1708 at the second end 1412 of the magazine. The first portion 1700 includes the top side 1428 and the second portion 1704 includes the bottom side 1424. The first side 1416 and the second side 1420 are each formed at least partially from both the first portion 1700 and the second portion 1704. Additionally, the first portion 1700 and the second portion 1704 cooperatively define the fastener channel 1448 (FIG. 2, 30) extending from the first end 1408 to proximate the second end 1412 of the magazine body 1404. The fastener channel 1448 is configured to receive the fasteners.

Figure 25:
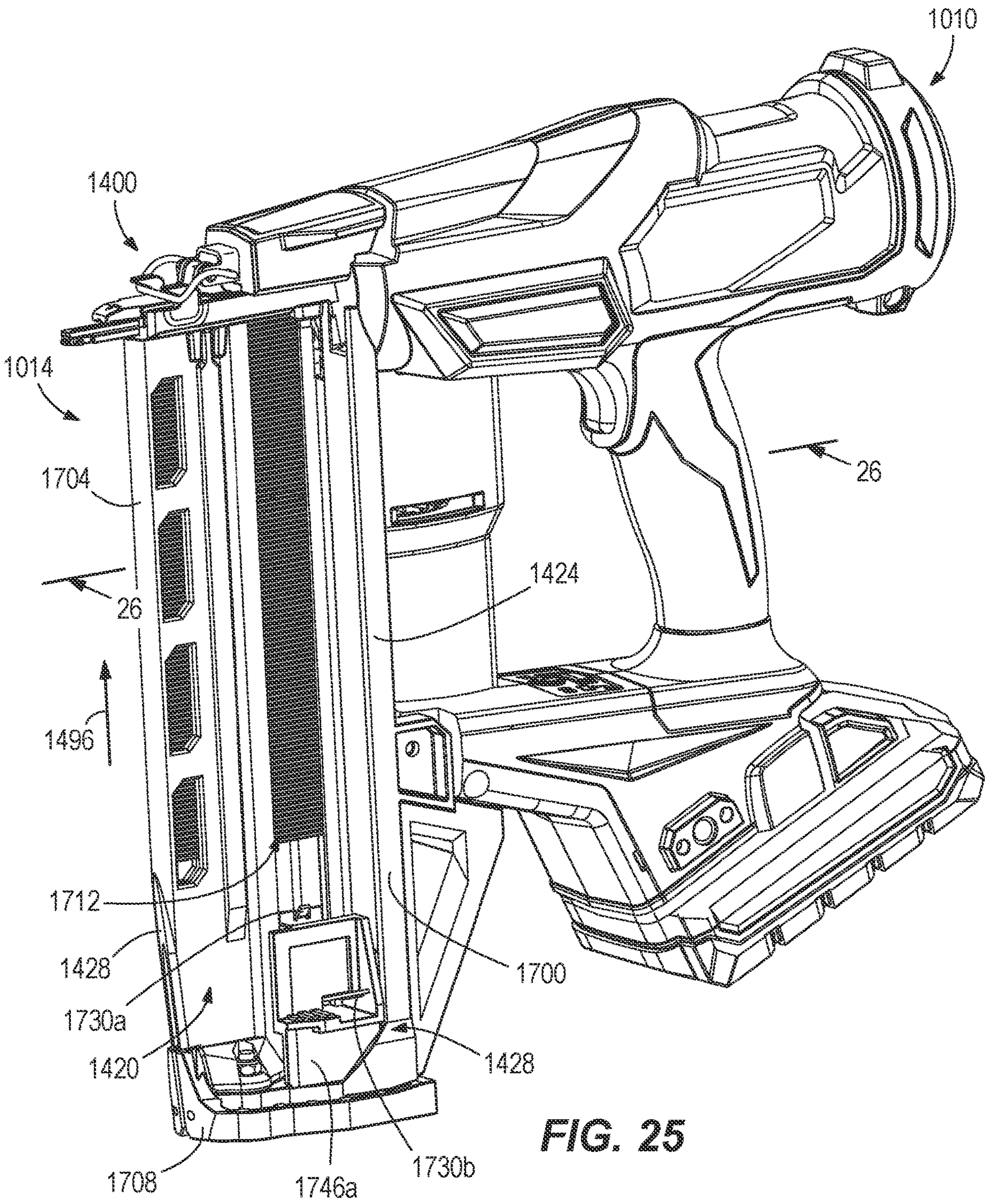
FIG. 25 is another perspective view of the gas spring-powered fastener driver of the FIG. 24.
Figure 29:
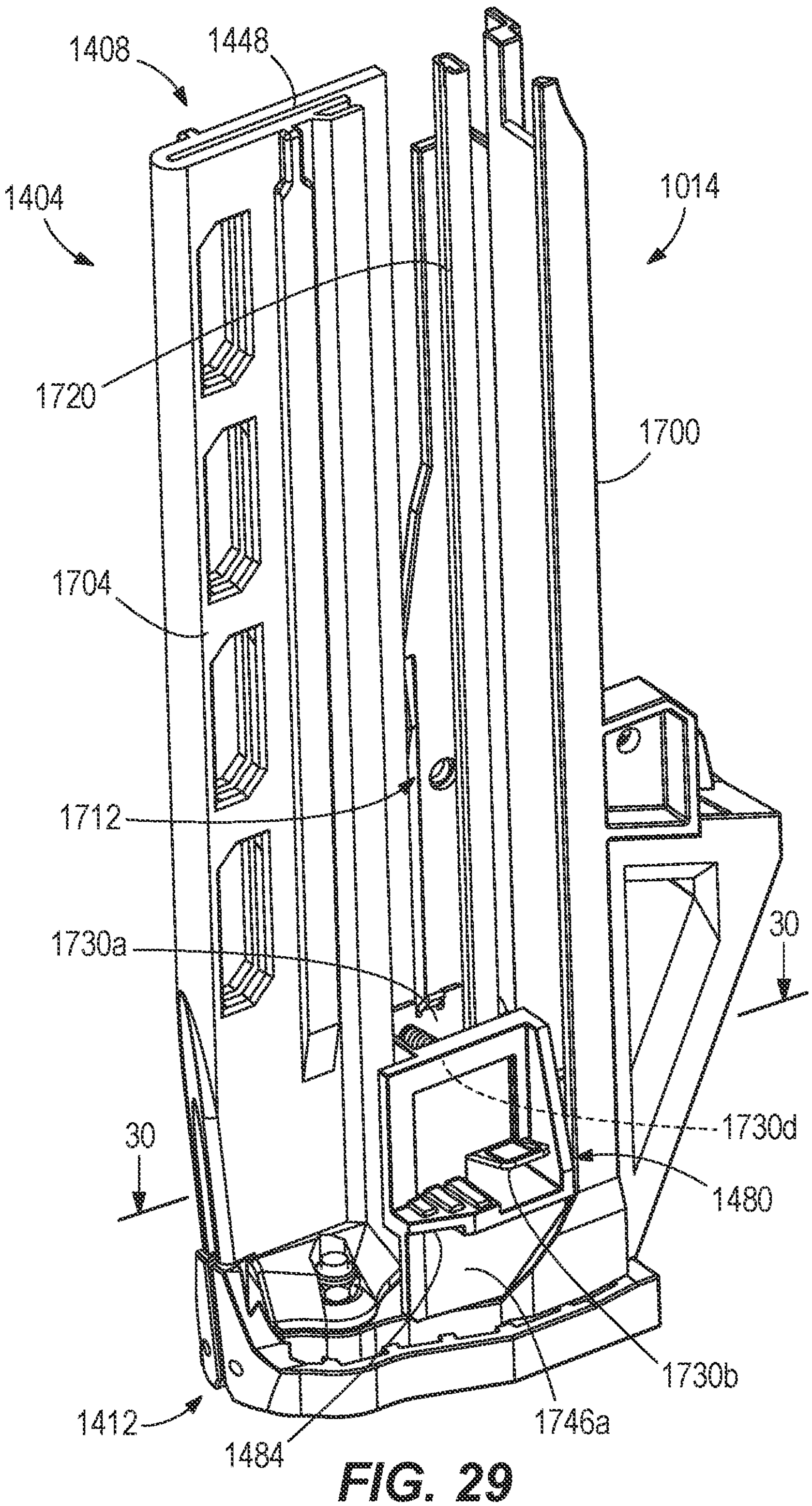
FIG. 29 is a perspective view of the magazine of FIG. 24 illustrating a pusher assembly.
Figure 30:
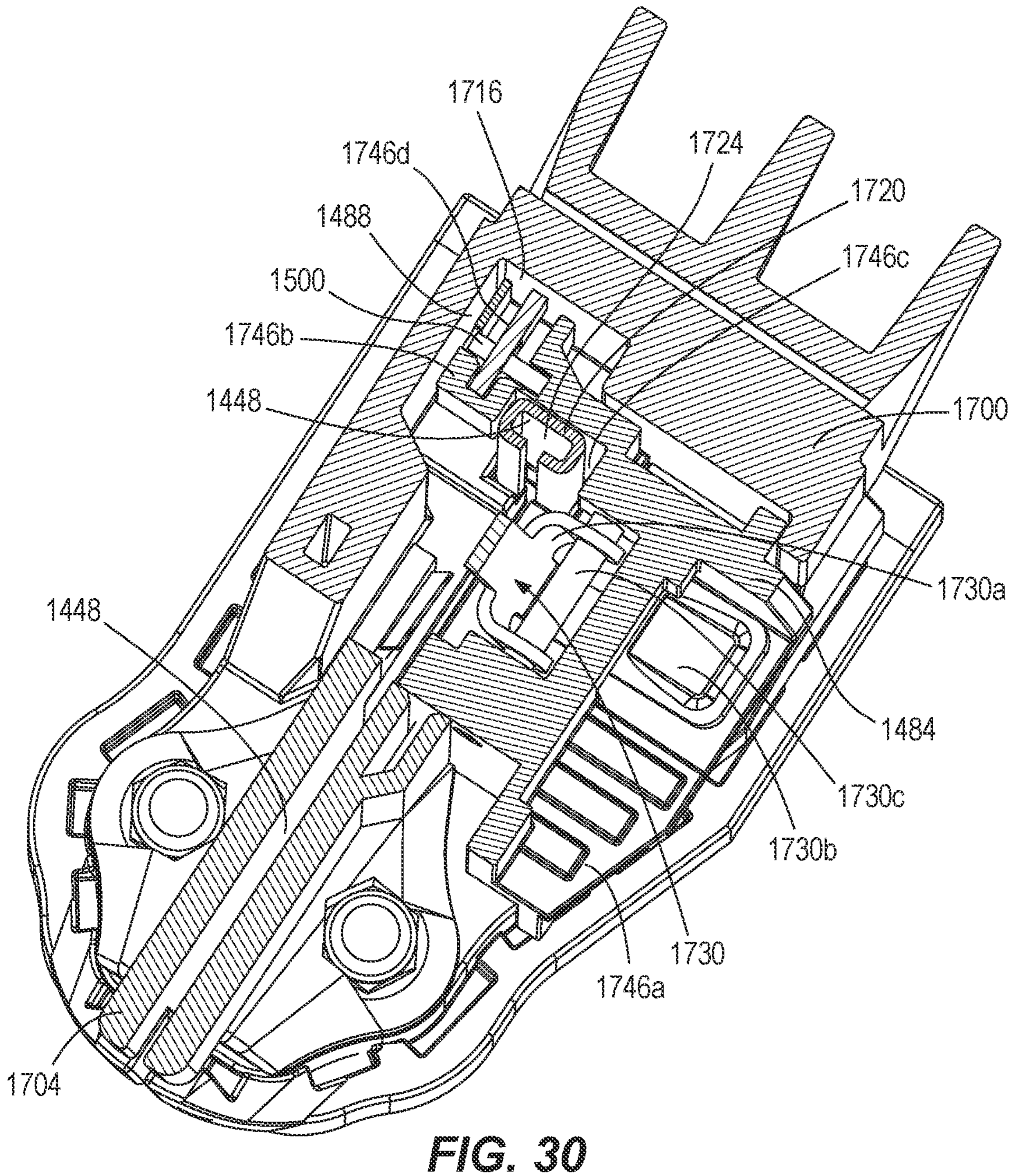
FIG. 30 is a cross-sectional view of the magazine of FIG. 29 along the line 30-30 in FIG. 29.
Figure 31:
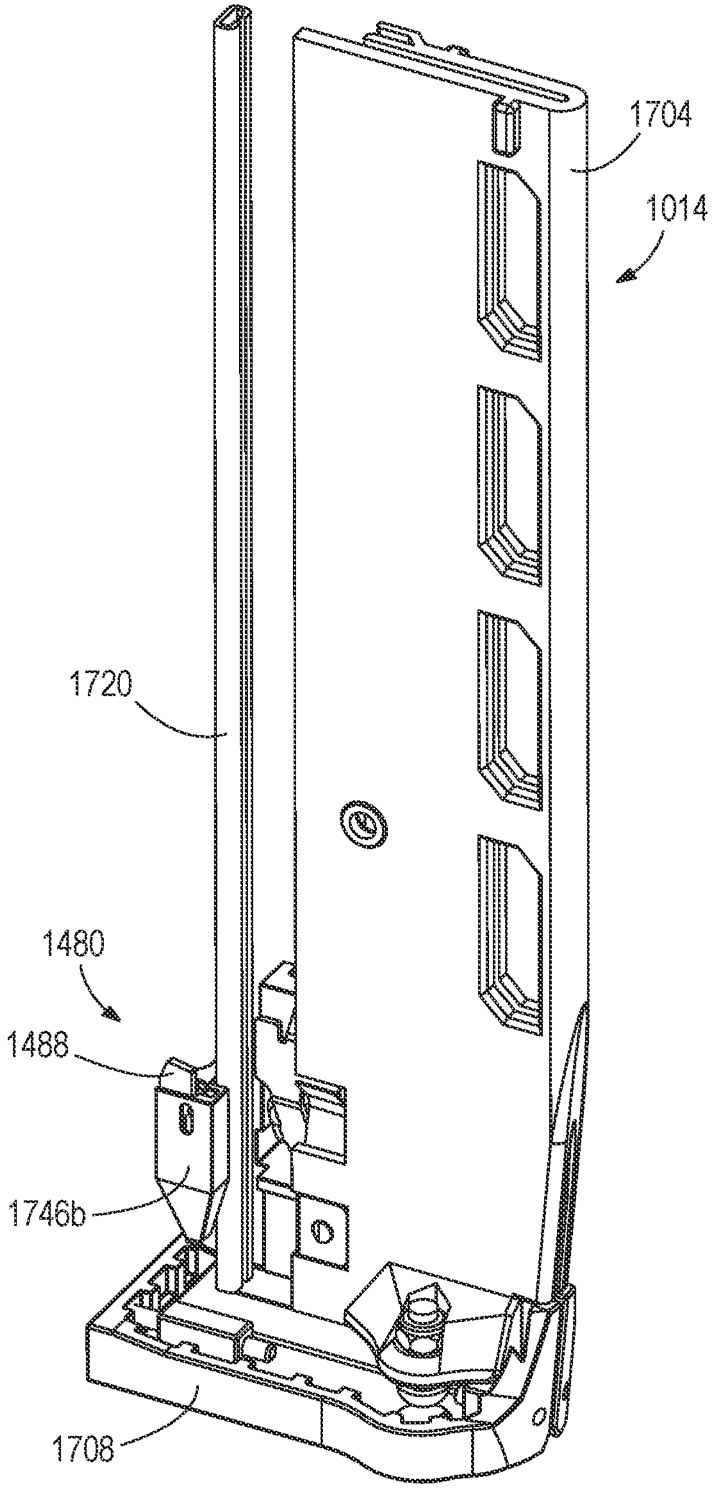
FIG. 31 is another perspective view of the magazine of FIG. 24.
Figure 31A:
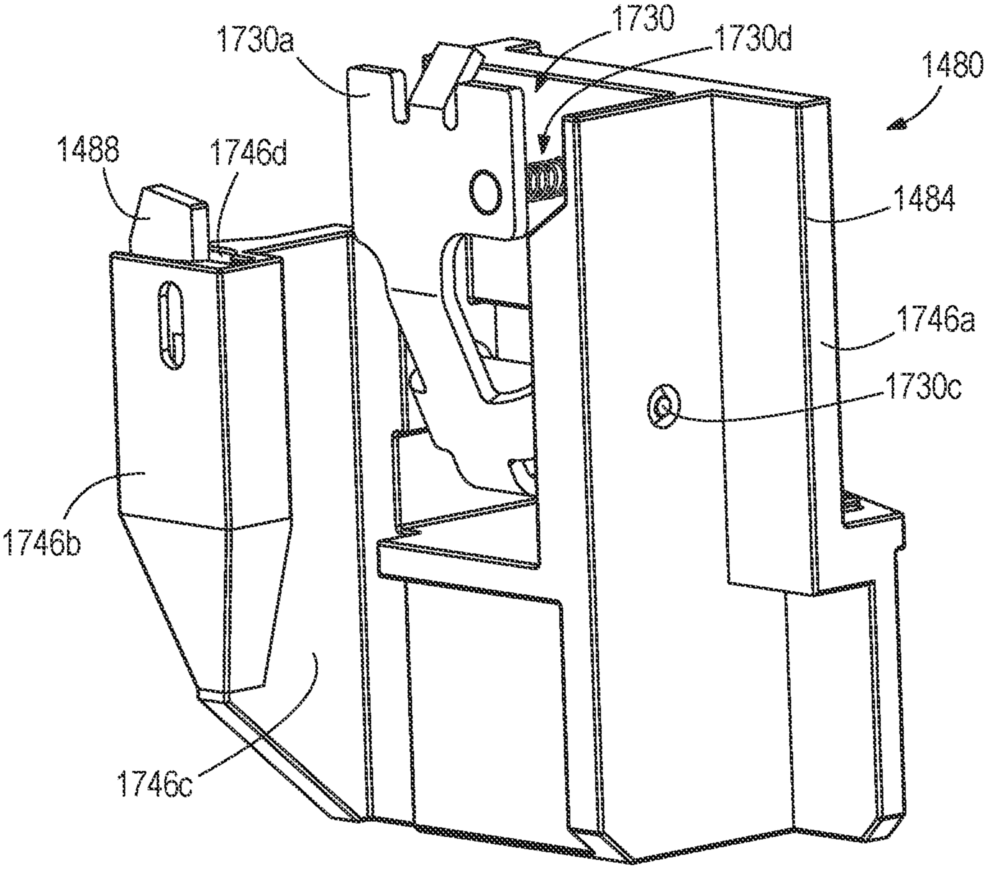
FIG. 31A is perspective view of the pusher assembly of FIG. 29.
Figure 31B:
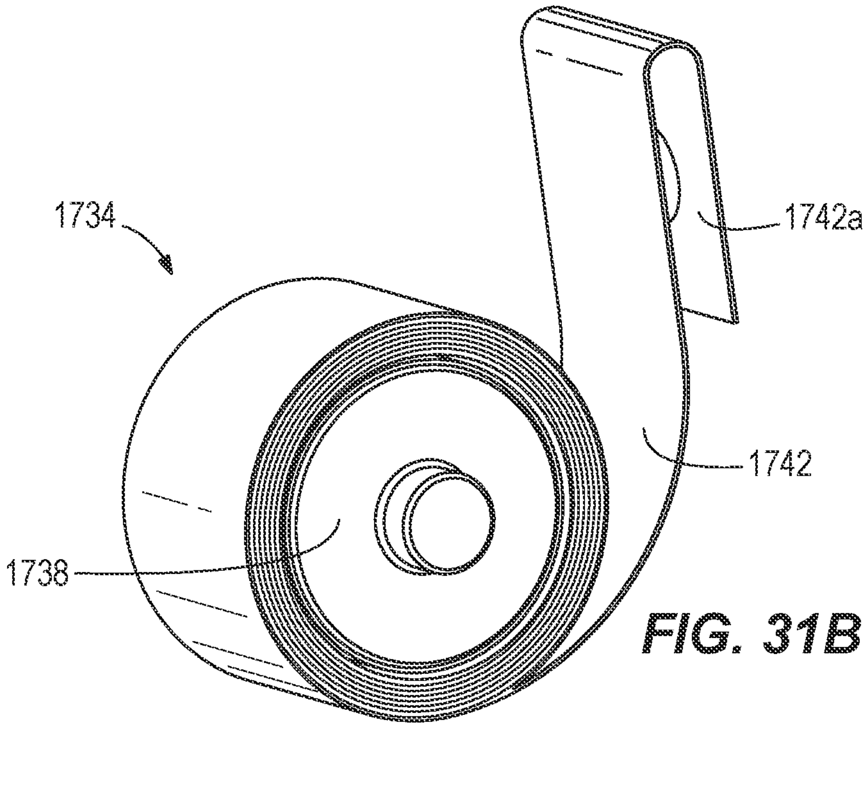
FIG. 31B is a perspective view of a spring assembly of the pusher assembly of FIG. 29.

With particular reference to FIGS. 25 and 29, a gap or track 1712 is defined on the second side 1420 between the first portion 1700 and the second portion 1704. The track 1712 extends along the length of the magazine body 1404 from proximate the second end 1412 toward the first end 1408. As shown in at least FIG. 26, the first portion 1700 includes a recess 1716 that extends along the first side 1416 from proximate the second end 1412 toward the first end 1408. More specifically, the recess 1716 extends parallel to and in connection with the fastener channel 1448. As shown in FIGS. 29-31, a guide member 1720 is coupled to the second end 1412 of the first portion 1700 and is spaced apart from the second portion 1704. The guide member 1720 extends parallel to the recess 1716 and defines a portion of the fastener channel 1448. That is, the guide member 1720 includes an opening 1724 (FIG. 30) extending along a length thereof that receives a head of each of the fasteners.

With reference to FIGS. 29-31B, the magazine 1014 further includes a pusher assembly 1480. The pusher assembly 1480 is slidably coupled to the magazine 1014 and configured to bias the fasteners in the magazine 1014 toward the nosepiece assembly 1400. As shown in FIGS. 25-26, 29-31B, the illustrated pusher assembly 1480 includes a first portion or pusher body 1484, a pusher finger 1730 pivotably coupled to the pusher body 1484, and a second portion or dry-fire lockout member 1488 movably coupled to the pusher body 1484. The pusher assembly 1480 further includes a spring assembly 1734 (FIG. 31B) that has a roller 1738 supported by the pusher body 1484 and a spring 1742 supported by the roller 1738. A stationary end 1742*a* of the spring 1742 is coupled to the magazine body 1404. The spring assembly 1734 is configured to exert a biasing force on the pusher assembly 1480 for moving the pusher assembly 1480 in the direction of arrow 1496 (FIG. 25).

With respect to FIGS. 25 and 29-30, the pusher body 1484 is supported by both the first and second portions 1700, 1704 of the magazine body 140 and is at least partially positioned both sides of the fastener channel 1448. As shown, the pusher body 1484 includes a main part 1746*a* that is positioned on the second side 1420 and positioned adjacent to the track 1412. The main part 1746*a* pivotably supports the pusher finger 1730. The pusher body 1484 also includes an arm 1746*b* extending from the main part 1746*a* and positioned on the second side 1416. The arm 1746*b* is received within and movable relative to the recess 1716 of the magazine body 1404. The arm 1746*b* includes a first recess 1746*c* through which extends the guide member 1420 and a second recess 1746*d* in which the dry-fire lockout member 1488 is received.

The pusher finger 1730 includes a first end 1730*a* that is positioned between the main part 1746*a* of the pusher body 1484 and the magazine body 1404 and a second end 1730*b* that extends outwardly from the main part 1746*a* of the pusher body 1484. The pusher finger 1730 is pivotably coupled to the main part 1746*a* by pin 1730*c* extending through the pusher finger 1730 at a location between the first end 1730*a* and the second end 1730*b*. The pusher finger 1730 is movable between an engaged position in which the first end 1730*a* is positioned within the fastener channel 1448 and configured to engage the last fastener in the fastener channel 1448 and a disengaged position in which the first end 1730*a* is at least partially removed from the track 1712. A spring 1730*d* (FIG. 29) biases the pusher finger 1730 into the engaged position. A force exerted on the second end 1730*b* of the pusher finger 1730 temporarily moves the pusher finger 1730 from the engaged position to the disengaged position such that the pusher assembly 1480 is movable relative to the magazine body 1014. When the force is removed from the second end 1730*b* of the pusher finger 1730, the bias of the spring 1730*d* returns the pusher finger 1730 to the engaged position.

Figure 26:
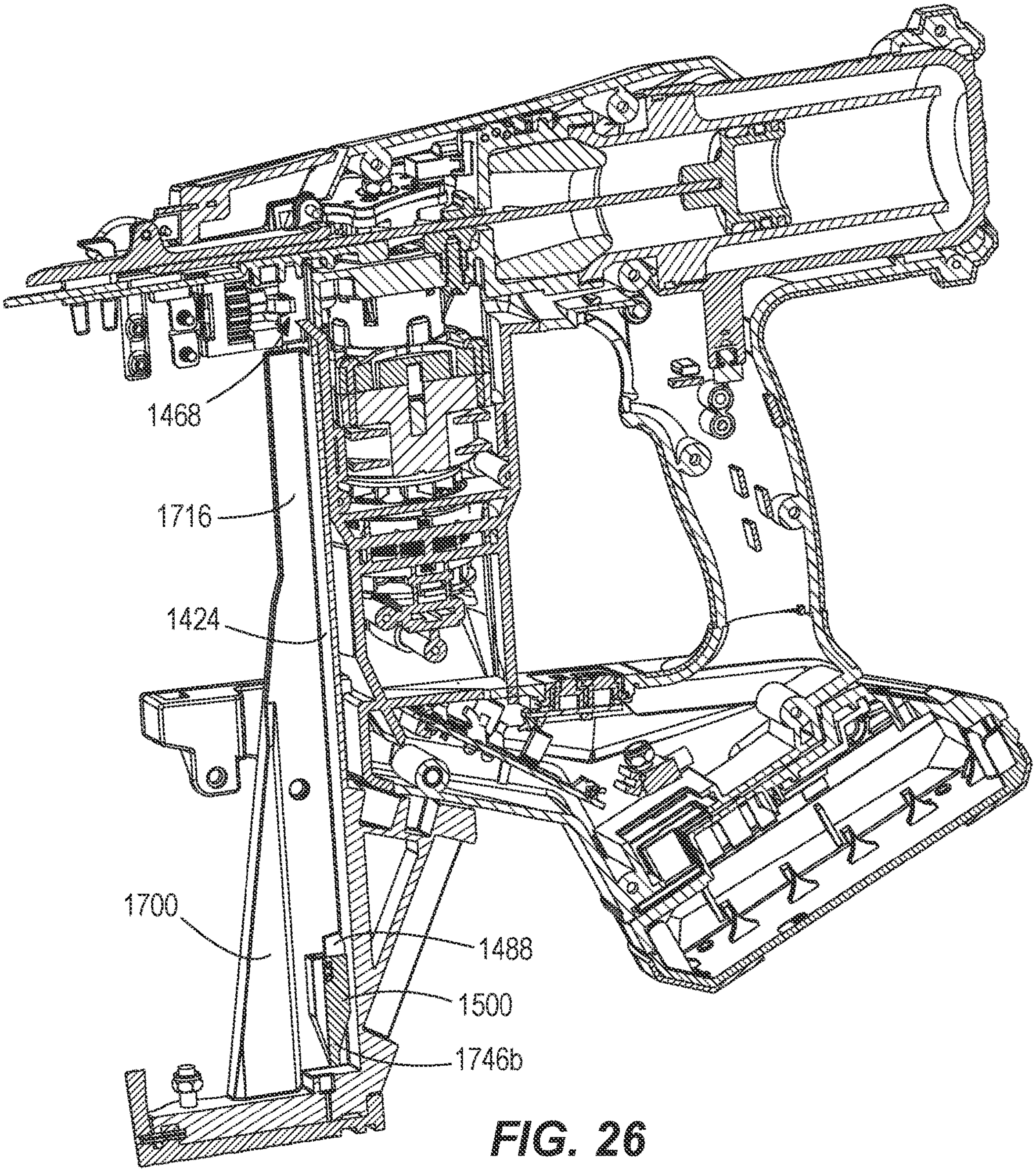
FIG. 26 is a cross-sectional view of the gas spring-powered fastener driver of the FIG. 24 along the line 26-26 of FIG. 25.

Furthermore, the dry-fire lockout member 1488 is movably coupled to the pusher body 1484 (e.g., the arm 1746*b* of the pusher body 1484) by a second spring 1500 (FIGS. 26 and 30). As such, the pusher body 1484 of the pusher assembly 1480 may selectively move relative to the dry-fire lockout member 1488. The biasing force of the second spring 1500 is independent of the biasing force of the spring assembly 1734. The pusher assembly 1480 is movable in a first state, in which the pusher body 1484 and the dry-fire lockout member 1488 move together in unison in the direction of arrow 1496 and a second state in which relative movement between the pusher body 1484 and the dry-fire lockout member 1488 has occurred, as further discussed below.

Like the previous embodiment, the nosepiece assembly 1400 (FIGS. 24 and 25) is positioned at the first end 1408 of the magazine body 1404 and includes similar structure and reference numerals plus "1000", which will not be repeated here. Similarly, with reference to FIGS. 24-28, the driver 1010 includes a workpiece contact assembly 1540 that is similar to the workpiece contact assembly 1540, such that reference numerals plus "1000" are used and only the differences will be discussed herein. A single spring 1750 (FIGS. 32-34) is configured to bias the workpiece contact assembly 1540 toward an extended position. The workpiece contact assembly 1540 is configured to be moved from the extended position toward a retracted position (shown in FIGS. 27-29) when the workpiece contact assembly 1540 is pressed against a workpiece. The first section 1552 includes an arm 1754 that is movable relative to the housing 1080. The first spring 1754 surrounds the arm 1754. The arm 1754 includes an engagement portion 1640 (e.g., a dry-fire lockout link) and a screw portion 1758. In the illustrated embodiment, the first section 1552 includes the dry-fire lockout link 1640. The dry-fire lockout link 1640 is positioned at the substantially the first end 1544 of the workpiece contact assembly 1540 and specifically is coupled to the arm 1754.

Figure 27:
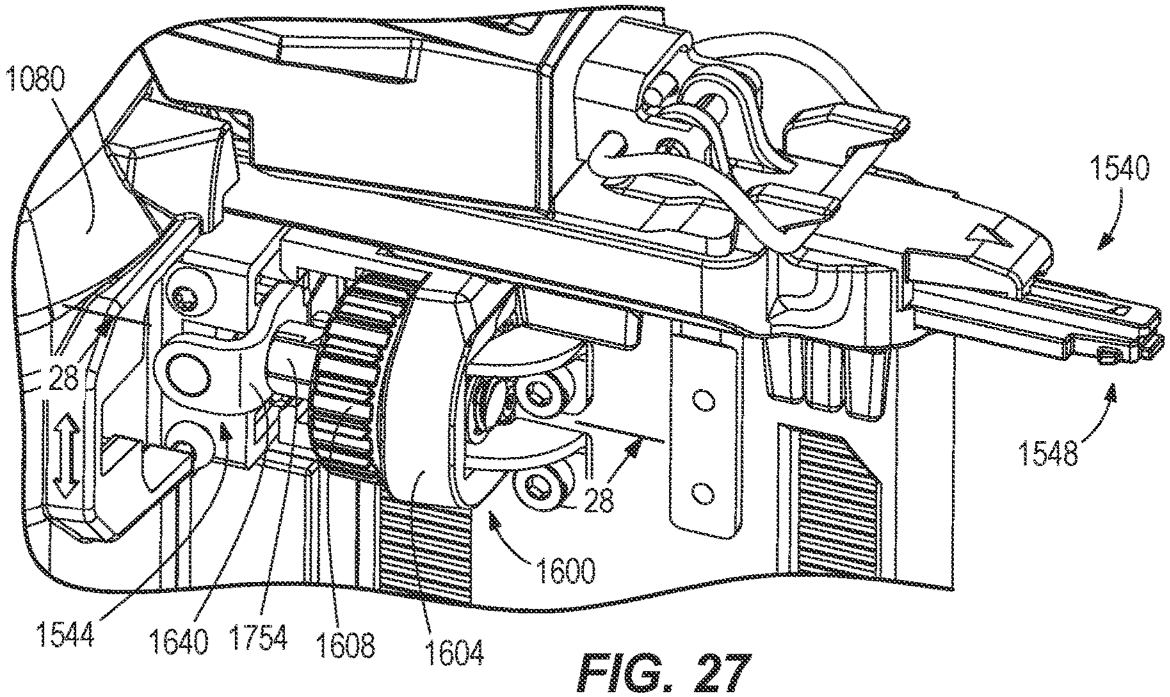
FIG. 27 is a detailed perspective view of the gas spring-powered fastener driver of the FIG. 24.
Figure 28:
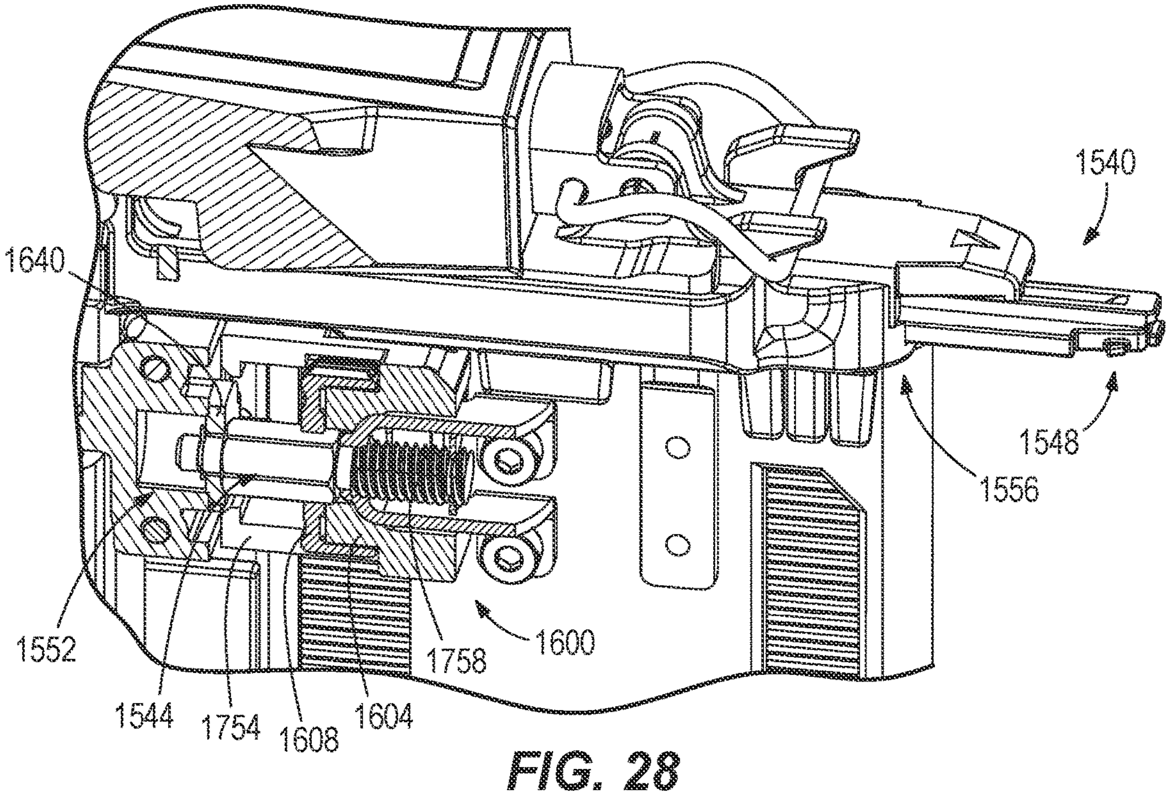
FIG. 28 is a detailed cross-sectional view of the gas spring-powered fastener driver of the FIG. 24 along the line 28-28 of FIG. 27.

With reference to FIGS. 27-29, the depth of drive adjustment mechanism 1600 is similar to depth-of-drive adjustment mechanism described above and operates in a similar manner as discussed above. Therefore like structure is identified using like reference numerals plus "1000".

With reference to FIGS. 25 and 29-34, the powered fastener driver 1010 further includes a dry-fire lockout assembly 1650 (FIG. 32-34) that operates similar to the dry-fire lockout assembly 1650, discussed above. The dry-fire lockout assembly 1650 prevents the powered fastener driver 1010 from operating when the number of fasteners remaining in the magazine 1014 drops below a predetermined value. The dry-fire lockout assembly 1650 includes the dry-fire lockout member 1488 of the pusher assembly 1480, and the dry-fire lockout link 1640. The arm 1746*b* of the pusher body 1484 and the dry-fire lockout member 1488 are positioned within and movable (e.g., slideable) within the recess 1716 of the magazine 1014. The dry-fire lockout member 488 is selectively received in the opening 1468 (FIG. 26) of the magazine 1014. In the illustrated embodiment, the opening 1468 is at least partially formed by the inner frame 1030, as shown in FIG. 26. The dry-fire lockout member 1488 is configured to prevent movement of the workpiece contact assembly 1540 when a predetermined number of fasteners (e.g., 0, 1, 2, 4 etc.) remain in the magazine 1014.

Figure 33:
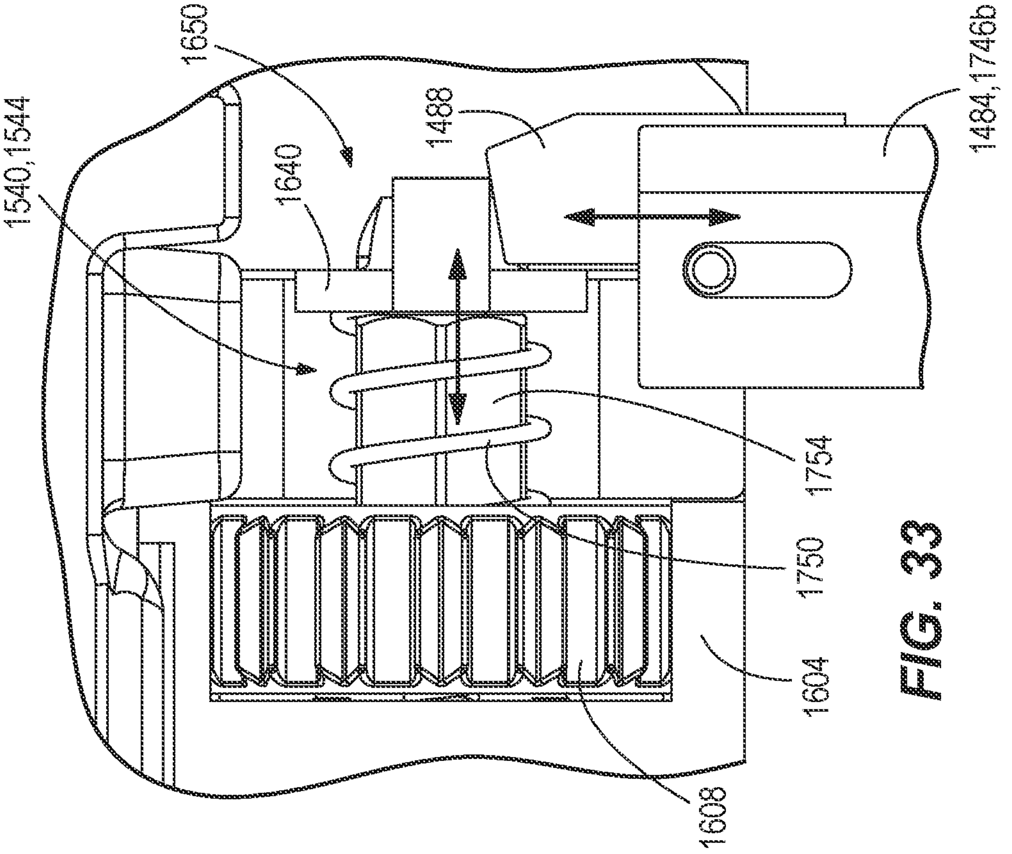
FIG. 33 illustrates a dry-fire lockout link coupled to the workpiece contact assembly of FIG. 1 when there is one more than the predetermined number of fasteners within the magazine.
Figure 32:
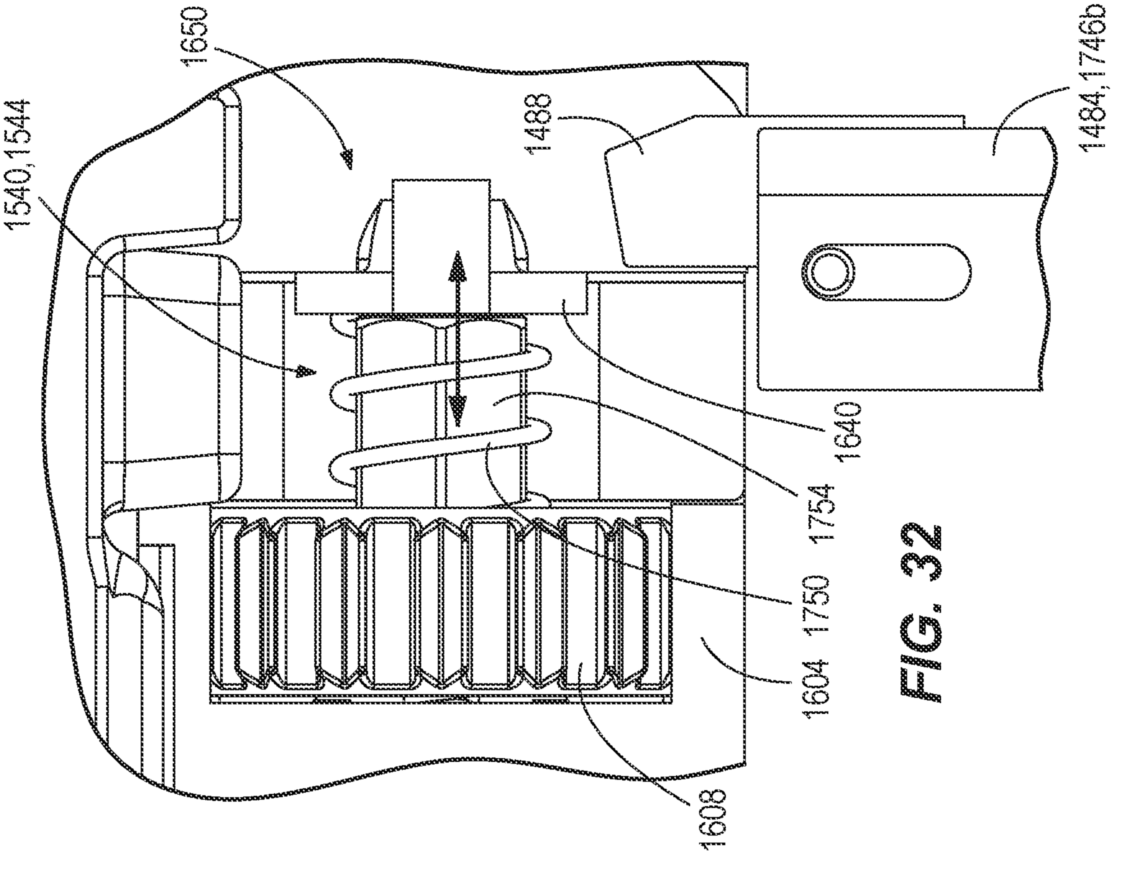
FIG. 32 illustrates a dry-fire lockout link coupled to the workpiece contact assembly of FIG. 24 when there is greater than a predetermined number of fasteners within the magazine.
Figure 34:
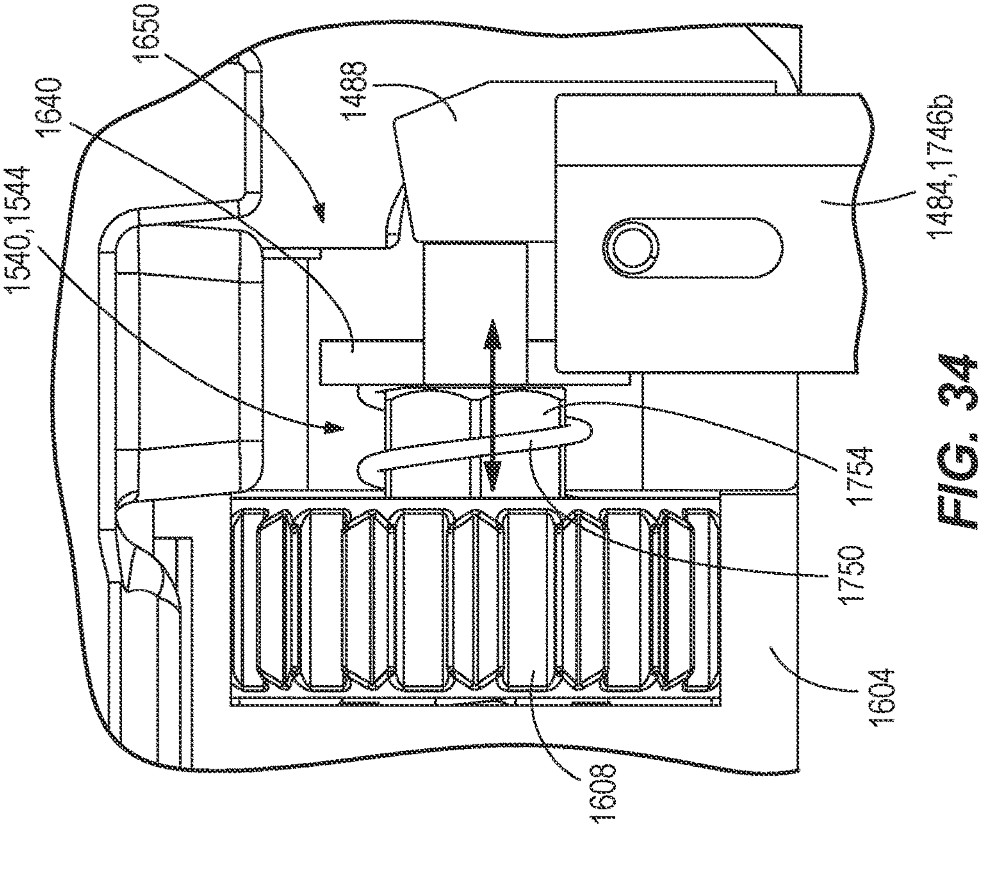
FIG. 34 illustrates a dry-fire lockout link coupled to the workpiece contact assembly of FIG. 1 when there are the predetermined number of fasteners within the magazine.

The dry-fire lockout member 1488 is movable between a first, non-blocking or bypass position (e.g., FIGS. 32-33), and a second, blocking position (FIG. 34). When the dry-fire lockout member 1488 does not extend through the opening 1468 of the magazine 1014, the dry-fire lockout member 1488 is in the bypass position such that the dry-fire lockout link 1640 and the workpiece contact assembly 1540 can move from the extended position toward the retracted position (FIGS. 32-33). That is, in the bypass position, the dry-fire lockout link 1640 is configured to slide into the opening 1468 (and depending on the number of fasteners remining, the dry-fire lockout member 1488) in response to movement toward the retracted position. Also, when the dry-fire lockout member 1488 is in the bypass position, the pusher assembly 1480 is in the first state such that the pusher body 1484 and the dry-fire lockout member 1488 move together in unison. When the dry-fire lockout member 1488 is in the blocking position, at least a portion of the dry-fire lockout member 1488 (FIG. 34) protrudes into the opening 1468 of the magazine 1014 where it interferes with retraction of dry-fire lockout link 1640 and therefore inhibits movement of the workpiece contact assembly 1540 from the extended position toward the retracted position.

In operation, as shown in FIG. 32, with more than the predetermined number of fasteners in the magazine 1014, the first and second portions 1484, 1488 of the pusher assembly 1480 move in unison, biased by the spring assembly 1734, in the direction of arrow 1496 the magazine 1014 in an incremental manner as consecutive fasteners from the collated fastener strip are discharged from the nosepiece assembly 1400. At this time, the opening 1468 remains open and the dry-fire lockout member 1488 remains in the bypass position.

In a scenario when the predetermined number of fasteners remaining in the magazine 1014 is reached, the dry-fire lockout member 1488 is in the blocking position and therefore engages the dry-fire lockout link 1640, as shown in FIG. 34. Upon reaching the blocking position, the dry-fire lockout member 1488 blocks the dry-fire lockout link 1640 of the workpiece contact assembly 1540, and retraction of the workpiece contact assembly 1540 is inhibited to prevent further activation of the powered fastener driver 1010. In this scenario, movement of the pusher assembly 1480 may remain in the first state (i.e., with the first and second portions 1484, 1488 moving together in unison) up until the dry-fire lockout member 1488 is moved to the blocking position.

However, in a scenario in which fasteners of specific sizes (e.g., fasteners having a specific shank length or diameter) are placed in the magazine 1014, when the predetermined number of fasteners remaining in the magazine 1014 is reached, the skewed collated fastener strip within the fastener channel may only permit the dry-fire lockout member 1488 to partially move toward the blocking position. That is, as shown in FIG. 33, the dry-fire lockout member 1488 may be in an intermediate position between the bypass position and the blocking position, in which the dry-fire lockout member 1488 only slightly blocks the dry-fire lockout link 1640 and the workpiece contact assembly 1540. In addition, other tolerances associated with the specific sized fasteners used, and/or associated with the driver 1010 as a whole, may cause the dry-fire lockout member 1488 to move to the intermediate position. In this case, for example, when the number of fasteners remaining is one greater than the predetermined number of fasteners, the dry-fire lockout member 1488 is in the intermediate position. With the dry-fire lockout member 1488 in the intermediate position, it is possible for the workpiece contact assembly 1540 (and specifically, the dry-fire lockout link 1640) to nominally engage the dry-fire lockout member 1488 during retraction and move the dry-fire lockout member 1488 toward the bypass position, permitting continued retraction of the workpiece contact assembly 1540 to enable a final fastener firing cycle. When the dry-fire lockout member 1488 is moved from the intermediate position to the bypass position, the pusher assembly 1480 transitions from the first state to the second state, in which relative movement between the pusher body 1484 and the dry-fire lockout member 1488 has occurred.

That is, the dry-fire lockout link 1640 can nominally engage the dry-fire lockout member 1488 during retraction to move the dry-fire lockout member 1488 toward the bypass position against the bias of the spring second spring 1500 and therefore slide past the dry-fire lockout member 1488 to the retracted position to enable the final firing cycle. In this scenario, movement of the pusher assembly 1480 transitions from the first state to the second state (i.e., the dry-fire lockout member 1488 having moved relative to the pusher body 1484 against the bias of the second spring 1500) after the final fastener firing cycle. Once the final fastener firing cycle is complete and the number of predetermined fasteners remain, the dry-fire lockout member 1488 protrudes into the opening 468 and blocks the dry-fire lockout link 1640, and therefore the workpiece contact assembly 1540, from moving into the retracted position to prevent a "dry-fire" cycle in which a driver blade 1026 is driven from the TDC position to the BDC position without a fastener in the firing channel 1522.

When the predetermined number of fasteners remain and the dry-fire lockout member 1488 is located in the blocking position, the dry-fire lockout member 488 cannot transition from the first state to the second state. Accordingly, when the predetermined number of nails remain, the dry-fire lockout member 1488 is positioned so that there is sufficient engagement between the dry-fire lockout member 1488 and the dry-fire lockout link 1640, and therefore the workpiece contact assembly 1540 to prevent a "dry-fire" cycle.

Although the invention has been described in detail with reference to certain preferred embodiments, variations and modifications exist within the scope and spirit of one or more independent aspects of the invention as described.

What is claimed is:

1. A powered fastener driver comprising:

a housing defining a cylinder support portion, a drive unit support portion, and a handle portion that is spaced apart from the drive unit support portion, the handle portion defining a handle axis;

a cylinder within the cylinder support portion;

a piston movable within the cylinder from a top-dead-center (TDC) position to a driven or bottom-dead-center (BDC) position;

a driver blade attached to the piston for movement therewith along a driving axis from the TDC position toward the BDC position for driving a fastener into a workpiece;

a lifter engageable with the driver blade to move the piston and driver blade, in unison, from the BDC position toward the TDC position; and a drive unit supported by the drive unit support portion and operably coupled to the lifter, the drive unit including a motor having an output shaft that extends along a motor axis, the motor being positioned below the handle portion, wherein the handle axis and the motor axis intersect the driving axis.

2. The powered fastener driver of claim 1, wherein the output shaft is a first output shaft and wherein the drive unit further includes a drive gear operably coupled to the first output shaft, a driven gear enmeshed with the drive gear, and a second output shaft operably coupled to the driven gear and having a rotational axis that is parallel to the motor axis, and wherein the second output shaft is operably coupled to the lifter to provide torque thereto, causing the lifter to rotate about the rotational axis.

3. The powered fastener driver of claim 1, wherein the handle axis, motor axis, and the driving axis are all contained within an imaginary plane bisecting the housing.

4. The powered fastener driver of claim 1, wherein the driver blade includes a plurality of teeth extending along one side thereof and the lifter includes a plurality of drive pins, and wherein each of the plurality of drive pins is engageable with a corresponding one of the plurality of teeth when returning the driver blade from the BDC position to the TDC position.

5. The powered fastener driver of claim 1, further comprising a bumper supported by the housing and configured to stop the piston and the driver blade at the BDC position.

6. The powered fastener driver of claim 1, further comprising a latch assembly for selectively preventing the driver blade from moving to the BDC position, the latch assembly positioned on an opposite side of the driving axis from the lifter.

* * * * *